(12) United States Patent
Robinson et al.

(10) Patent No.: US 10,634,840 B2
(45) Date of Patent: Apr. 28, 2020

(54) WIDE ANGLE IMAGING DIRECTIONAL BACKLIGHTS

(71) Applicant: RealD Spark, LLC, Beverly Hills, CA (US)

(72) Inventors: Michael G. Robinson, Boulder, CO (US); Graham J. Woodgate, Henley-on-Thames (GB); Jonathan Harrold, Leamington Spa (GB); Eric Sommerlade, Oxford (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 16/450,507

(22) Filed: Jun. 24, 2019

(65) Prior Publication Data
US 2019/0369320 A1    Dec. 5, 2019

Related U.S. Application Data

(62) Division of application No. 15/097,750, filed on Apr. 13, 2016, now Pat. No. 10,359,560.
(Continued)

(51) Int. Cl.
*F21V 8/00* (2006.01)
*G02B 5/09* (2006.01)
*B29D 11/00* (2006.01)

(52) U.S. Cl.
CPC ............. *G02B 6/0055* (2013.01); *G02B 5/09* (2013.01); *G02B 6/009* (2013.01); *G02B 6/0038* (2013.01);
(Continued)

(58) Field of Classification Search
CPC .. G02B 6/0055; G02B 6/0038; G02B 6/0048; G02B 6/009; G02B 5/09
(Continued)

(56) References Cited

U.S. PATENT DOCUMENTS 1,128,979 A    2/1915    Hess
1,970,311 A    8/1934    Ives
(Continued)

FOREIGN PATENT DOCUMENTS

CN    1142869 A    2/1997
CN    1377453 A    10/2002
(Continued)

OTHER PUBLICATIONS

PCT/US2013/041697 International search report and written opinion of international searching authority dated Aug. 23, 2013.
(Continued)

*Primary Examiner* — Bryon T Gyllstrom
(74) *Attorney, Agent, or Firm* — Penny L. Lowry; Neil G. J. Mothew

(57) ABSTRACT

An imaging directional backlight apparatus including a waveguide, a light source array, for providing large area directed illumination from localized light sources. The waveguide may include a stepped structure, in which the steps may further include extraction features optically hidden to guided light, propagating in a first forward direction. Returning light propagating in a second backward direction may be refracted, diffracted, or reflected by the features to provide discrete illumination beams exiting from the top surface of the waveguide. Viewing windows are formed through imaging individual light sources and hence defines the relative positions of system elements and ray paths. Lateral non-uniformities of output image are improved by means of adjustment of input aperture shape and reflective aperture shape. Cross talk in autostereoscopic and privacy displays may further be improved by light blocking layers arranged on the input end of the waveguide.

19 Claims, 61 Drawing Sheets

Related U.S. Application Data

(60) Provisional application No. 62/255,248, filed on Nov. 13, 2015, provisional application No. 62/167,185, filed on May 27, 2015, provisional application No. 62/167,203, filed on May 27, 2015, provisional application No. 62/154,932, filed on Apr. 30, 2015, provisional application No. 62/146,648, filed on Apr. 13, 2015.

(52) U.S. Cl.
CPC ...... *G02B 6/0048* (2013.01); *B29D 11/00269* (2013.01); *B29D 11/00596* (2013.01); *G02B 6/0031* (2013.01); *G02B 6/0043* (2013.01); *G02B 6/0061* (2013.01); *G02B 6/0065* (2013.01); *G02B 6/0068* (2013.01)

(58) Field of Classification Search
USPC ........................................................ 362/613
See application file for complete search history.

(56) References Cited

U.S. PATENT DOCUMENTS

| | | |
|---|---|---|
| 2,133,121 A | 10/1938 | Stearns |
| 2,247,969 A | 7/1941 | Lemuel |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,050,946 A | 9/1991 | Hathaway et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,172,723 B1 | 1/2001 | Inoue et al. |
| 6,199,995 B1 | 3/2001 | Umemoto et al. |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 | 9/2004 | Jones et al. |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,001,058 B2 | 2/2006 | Inditsky |
| 7,052,168 B2 | 5/2006 | Epstein et al. |
| 7,058,252 B2 | 6/2006 | Woodgate et al. |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara et al. |
| 7,215,475 B2 | 5/2007 | Woodgate et al. |
| 7,227,567 B1 | 6/2007 | Beck et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,798,698 B2 | 9/2010 | Segawa |
| 7,798,699 B2 | 9/2010 | Laitinen et al. |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,179,361 B2 | 5/2012 | Sugimoto et al. |
| 8,216,405 B2 | 7/2012 | Emerton et al. |
| 8,223,296 B2 | 7/2012 | Lee et al. |
| 8,251,562 B2 | 8/2012 | Kuramitsu et al. |
| 8,325,295 B2 | 12/2012 | Sugita et al. |
| 8,354,806 B2 | 1/2013 | Travis et al. |
| 8,477,261 B2 | 7/2013 | Travis et al. |
| 8,502,253 B2 | 8/2013 | Min |
| 8,534,901 B2 | 9/2013 | Panagotacos et al. |
| 8,556,491 B2 | 10/2013 | Lee |
| 8,651,725 B2 | 2/2014 | Ie et al. |
| 8,684,588 B2 | 4/2014 | Ajichi et al. |
| 8,714,804 B2 | 5/2014 | Kim et al. |

(56) References Cited

U.S. PATENT DOCUMENTS

| | | |
|---|---|---|
| 8,752,995 B2 | 6/2014 | Park |
| 8,760,762 B1 | 6/2014 | Kelly et al. |
| 8,926,112 B2 | 1/2015 | Uchiike et al. |
| 8,942,434 B1 | 1/2015 | Karakotsios et al. |
| 9,188,731 B2 | 11/2015 | Woodgate et al. |
| 9,197,884 B2 | 11/2015 | Lee et al. |
| 9,350,980 B2 | 5/2016 | Robinson et al. |
| 9,519,153 B2 | 12/2016 | Robinson et al. |
| 9,739,928 B2* | 8/2017 | Robinson .............. G02B 6/0068 |
| 9,740,034 B2* | 8/2017 | Woodgate ........... G02F 1/13338 |
| 9,872,007 B2* | 1/2018 | Woodgate ................ H04N 7/15 |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0117790 A1 | 6/2003 | Lee et al. |
| 2003/0133191 A1 | 7/2003 | Morita et al. |
| 2003/0137738 A1 | 7/2003 | Ozawa et al. |
| 2003/0137821 A1* | 7/2003 | Gotoh .................. G02B 6/0016 362/612 |
| 2004/0008877 A1 | 1/2004 | Leppard et al. |
| 2004/0015729 A1 | 1/2004 | Elms et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0105264 A1 | 6/2004 | Spero |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190180 A1 | 9/2005 | Jin et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0002678 A1 | 1/2006 | Weber et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2007/0279554 A1 | 12/2007 | Kowarz et al. |
| 2007/0279727 A1 | 12/2007 | Gandhi et al. |
| 2008/0025046 A1* | 1/2008 | Tsuruta ................ G02B 6/0036 362/612 |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0259643 A1 | 10/2008 | Ijzerman et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0014700 A1 | 1/2009 | Metcalf et al. |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0109705 A1 | 4/2009 | Pakhchyan et al. |
| 2009/0128735 A1 | 5/2009 | Larson et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0168459 A1 | 7/2009 | Holman et al. |
| 2009/0174700 A1 | 7/2009 | Daiku |
| 2009/0174840 A1 | 7/2009 | Lee et al. |
| 2009/0185394 A1* | 7/2009 | Takahashi ............ G02B 6/0068 362/613 |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0091093 A1 | 4/2010 | Robinson |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2010/0321953 A1 | 12/2010 | Coleman et al. |
| 2010/0328438 A1 | 12/2010 | Ohyama et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |

(56) References Cited

U.S. PATENT DOCUMENTS

| | | |
|---|---|---|
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0228562 A1 | 9/2011 | Travis et al. |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Mich et al. |
| 2012/0063166 A1 | 3/2012 | Panagotacos et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0204566 A1* | 8/2012 | Hartzell ............ B29D 11/00269 60/641.15 |
| 2012/0206050 A1 | 8/2012 | Spero |
| 2012/0236484 A1 | 9/2012 | Miyake |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0299913 A1 | 11/2012 | Robinson et al. |
| 2012/0314145 A1 | 12/2012 | Robinson |
| 2012/0327172 A1 | 12/2012 | El-Saban et al. |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0294684 A1 | 11/2013 | Lipton et al. |
| 2013/0307831 A1* | 11/2013 | Robinson ............ G02B 6/0068 345/207 |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1* | 12/2013 | Robinson ............ G02B 6/0023 359/464 |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0036361 A1 | 2/2014 | Woodgate et al. |
| 2014/0041205 A1* | 2/2014 | Robinson ............ G02B 6/0025 29/592.1 |
| 2014/0043323 A1 | 2/2014 | Sumi |
| 2014/0098558 A1 | 4/2014 | Vasylyev |
| 2014/0126238 A1 | 5/2014 | Kao et al. |
| 2014/0240344 A1 | 8/2014 | Tomono et al. |
| 2014/0240828 A1* | 8/2014 | Robinson ............ G02B 27/26 359/465 |
| 2014/0289835 A1 | 9/2014 | Varshavsky et al. |
| 2014/0340728 A1 | 11/2014 | Taheri |
| 2014/0368602 A1 | 12/2014 | Woodgate et al. |
| 2015/0116212 A1 | 4/2015 | Freed et al. |
| 2015/0268479 A1 | 9/2015 | Woodgate et al. |
| 2015/0334365 A1 | 11/2015 | Tsubaki et al. |
| 2015/0339512 A1 | 11/2015 | Son et al. |
| 2016/0299281 A1* | 10/2016 | Robinson ............ G02B 6/0048 |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1588196 A | 3/2005 |
| CN | 1678943 A | 10/2005 |
| CN | 1696788 A | 11/2005 |
| CN | 1769971 A | 5/2006 |
| CN | 1823292 A | 8/2006 |
| CN | 1826553 A | 8/2006 |
| CN | 1866112 A | 11/2006 |
| CN | 1900785 A | 1/2007 |
| CN | 1908753 A | 2/2007 |
| CN | 1910399 A | 2/2007 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 101158763 A | 4/2008 |
| CN | 101266338 A | 9/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 101681060 A | 3/2010 |
| CN | 102147079 A | 8/2011 |
| CN | 202486493 U | 10/2012 |
| CN | 104380177 A | 2/2015 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 0656555 B1 | 3/2003 |
| EP | 1736702 A1 | 12/2006 |
| EP | 2003394 A2 | 12/2008 |
| EP | 1394593 B1 | 6/2010 |
| EP | 2219067 A1 | 8/2010 |
| EP | 2451180 A2 | 5/2012 |
| EP | 1634119 B1 | 8/2012 |
| GB | 2405542 | 2/2005 |
| JP | H07270792 | 10/1995 |
| JP | H08211334 | 8/1996 |
| JP | H08237691 A | 9/1996 |
| JP | H08254617 | 10/1996 |
| JP | H08070475 | 12/1996 |
| JP | H08340556 | 12/1996 |
| JP | H1042315 A | 2/1998 |
| JP | H10142556 A | 5/1998 |
| JP | H11242908 A | 9/1999 |
| JP | 2000048618 A | 2/2000 |
| JP | 2000069504 A | 3/2000 |
| JP | 2000131683 A | 5/2000 |
| JP | 2000200049 A | 7/2000 |
| JP | 2001093321 A | 4/2001 |
| JP | 2002049004 A | 2/2002 |
| JP | 2003215349 A | 7/2003 |
| JP | 2003215705 A | 7/2003 |
| JP | 2004112814 A | 4/2004 |
| JP | 2004265813 A | 9/2004 |
| JP | 2004319364 A | 11/2004 |
| JP | 2005135844 A | 5/2005 |

(56) References Cited

FOREIGN PATENT DOCUMENTS

| | | |
|---|---|---|
| JP | 2005181914 A | 7/2005 |
| JP | 2005183030 A | 7/2005 |
| JP | 2005203182 A | 7/2005 |
| JP | 2005259361 A | 9/2005 |
| JP | 2006004877 A | 1/2006 |
| JP | 2006010935 A | 1/2006 |
| JP | 2006031941 A | 2/2006 |
| JP | 2006310269 A | 11/2006 |
| JP | 2007094035 A | 4/2007 |
| JP | 3968742 B2 | 8/2007 |
| JP | 2007273288 A | 10/2007 |
| JP | 2007286652 | 11/2007 |
| JP | 2008204874 A | 9/2008 |
| JP | 2010160527 A | 7/2010 |
| JP | 2011192468 A | 9/2011 |
| JP | 2011216281 A | 10/2011 |
| JP | 2012060607 A | 3/2012 |
| JP | 2013015619 | 1/2013 |
| JP | 2013502693 | 1/2013 |
| JP | 2013540083 | 10/2013 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| KR | 20120049890 A | 5/2012 |
| KR | 20130002646 A | 1/2013 |
| KR | 20140139730 | 12/2014 |
| TW | 200528780 | 9/2005 |
| WO | 1994006249 B1 | 4/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001027528 A1 | 4/2001 |
| WO | 2001061241 A1 | 8/2001 |
| WO | 2001079923 A1 | 10/2001 |
| WO | 2008038539 A1 | 4/2008 |
| WO | 2008045681 A1 | 4/2008 |
| WO | 2009098809 A1 | 8/2009 |
| WO | 2010021926 A2 | 2/2010 |
| WO | 2011020962 A1 | 2/2011 |
| WO | 2011022342 A2 | 2/2011 |
| WO | 2011068907 A1 | 6/2011 |
| WO | 2011149739 A2 | 12/2011 |
| WO | 2014130860 A1 | 8/2014 |
| WO | 2015200814 A1 | 12/2015 |

OTHER PUBLICATIONS

PCT/US2013/041703 International search report and written opinion of international searching authority dated Aug. 27, 2013.
PCT/US2013/049969 International search report and written opinion of international searching authority dated Oct. 23, 2013.
PCT/US2013/063125 International search report and written opinion of international searching authority dated Jan. 20, 2014.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
PCT/US2014/042721 International search report and written opinion of international searching authority dated Oct. 10, 2014.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/021583 International search report and written opinion of international searching authority dated Sep. 10, 2015.
PCT/US2015/038024 International search report and written opinion of international searching authority dated Dec. 30, 2015.
Robinson et al., U.S. Appl. No. 14/751,878 entitled "Directional privacy display" filed Jun. 26, 2015. The application is available to Examiner on the USPTO database and has not been filed herewith.
Robinson et al., U.S. Appl. No. 15/097,750 entitled "Wide angle imaging directional backlights" filed Apr. 13, 2016. The application is available to Examiner on the USPTO database and has not been filed herewith.
Robinson et al., U.S. Appl. No. 15/098,084 entitled "Wide angle imaging directional backlights" filed Apr. 13, 2016. The application is available to Examiner on the USPTO database and has not been filed herewith.
Robinson, U.S. Appl. No. 13/300,293 entitled "Directional flat illuminators" filed Nov. 18, 2011. The application is available to Examiner on the USPTO database and has not been filed herewith.
RU-2013122560 First office action dated Jan. 1, 2014.
RU-2013122560 Second office action dated Apr. 10, 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
CN-201680029493.9 First office action dated Jul. 8, 2019.
Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].
Lowe, "Distinctive Image Features from Scale-Invariant Keypoints", International Journal of Computer Vision 60 (2), pp. 91-110, 2004.
Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].
Marjanovic, M.,"Interlace, Interleave, and Field Dominance," http://www.mir.com/DMG/interl.html, pp. 1-5 (2001).
Ozuysal et al., "Fast Keypoint recognition in Ten Lines of Code", Computer Vision and Pattern Recognition, pp. 1-8, 2007.
PCT/US2007/85475 International preliminary report on patentability dated May 26, 2009.
PCT/US2014/057860 International Preliminary Report on Patentability dated Apr. 5, 2016.
PCT/US2014/057860 International search report and written opinion of international searching authority dated Jan. 5, 2015.
PCT/US2015/000327 International search report and written opinion of international searching authority dated Apr. 25, 2016.
PCT/US2015/054523 International search report and written opinion of international searching authority dated Mar. 18, 2016.
PCT/US2016/027297 International search report and written opinion of international searching authority dated Jul. 26, 2016.
PCT/US2016/027350 International search report and written opinion of the international searching authority dated Jul. 25, 2016.
PCT/US2016/034418 International search report and written opinion of the international searching authority dated Sep. 7, 2016.
PCT/US2016/056410 International search report and written opinion of the international searching authority dated Jan. 25, 2017.
PCT/US2016/058695 International search report and written opinion of international searching authority dated Feb. 28, 2017.
PCT/US2016/061428 International search report and written opinion of international searching authority dated Jan. 20, 2017.
PCT/US2017/012203 International search report and written opinion of international searching authority dated Apr. 18, 2017.
Robinson et al., U.S. Appl. No. 15/165,960 entitled "Wide Angle Imaging Directional Backlights" filed May 26, 2016. The application is available to Examiner on the USPTO database and has not been filed herewith.

(56) References Cited

OTHER PUBLICATIONS

Robinson et al., U.S. Appl. No. 15/290,543 entitled "Wide angle imaging directional backlights" filed Oct. 11, 2016. The application is available to Examiner on the USPTO database and has not been filed herewith.
RU-201401264 Office action dated Jan. 18, 2017.
Travis, et al. "Collimated light from a waveguide for a display," Optics Express, vol. 17, No. 22, pp. 19714-19719 (2009).
Viola and Jones, "Rapid Object Detection using a Boosted Cascade of Simple Features", pp. 1-9 CVPR 2001.
Zach et al., "A Duality Based Approach for Realtime TV-L1 Optical Flow", Pattern Recognition (Proc. DAGM), 2007, pp. 214-223.
CN-201380026064.2 Chinese First Office Action of Chinese Patent Office dated Jun. 9, 2017.
Extended European Search Report from European Patent Application No. 16780629.8 dated Oct. 18, 2018.
AU-2013262869 Australian Office Action of Australian Patent Office dated Feb. 22, 2016.
Bahadur, "Liquid crystals applications and uses," World Scientific, vol. 1, pp. 178 (1990).
CN-201180065590.0 Office first action dated Dec. 31, 2014.
CN-201180065590.0 Office second action dated Oct. 21, 2015.
CN-201180065590.0 Office Third action dated Jun. 6, 2016.
CN-201380026047.9 Chinese 1st Office Action of the State Intellectual Property Office of P.R. dated Dec. 18, 2015.
CN-201380026050.0 Chinese 1st Office Action of the State Intellectual Property Office of P.R. dated Jun. 3, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
EP-07864751.8 European Search Report dated Jun. 1, 2012.
EP-07864751.8 Supplementary European Search Report dated May 29, 2015.
EP-11842021.5 Office Action dated Oct. 2, 2015.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Feb. 1, 2016.
EP-13843659.7 European Extended Search Report of European Patent Office dated May 10, 2016.
EP-13844510.1 European Extended Search Report of European Patent Office dated May 13, 2016.
PCT/US2013/041683 International search report and written opinion of international searching authority dated Aug. 27, 2013.
JP-2013540083 Notice of reasons for rejection dated Jun. 30, 2015.
PCT/US2013/041655 International search report and written opinion of international searching authority dated Aug. 27, 2013.
PCT/US2013/041619 International search report and written opinion of international searching authority dated Aug. 27, 2013.
Kalantar, et al. "Backlight Unit With Double Surface Light Emission," J. Soc. Inf. Display, vol. 12, Issue 4, pp. 379-387 (Dec. 2004).
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
PCT/US2013/041548 International search report and written opinion of international searching authority dated Aug. 27, 2013.
PCT/US2007/85475 International search report and written opinion dated Apr. 10, 2008.
PCT/US2013/041237 International search report and written opinion of international searching authority dated May 15, 2013.
PCT/US2009/060686 international search report and written opinion of international searching authority dated Dec. 10, 2009.
PCT/US2011/061511 International search report and written opinion of international searching authority dated Jun. 29, 2012.
PCT/US2011/061511 International Preliminary Report on Patentability dated May 21, 2013.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
AU-2011329639 Australia Patent Examination Report No. 1 dated Mar. 6, 2014.
AU-2014218711 Examination report No. 1 dated Mar. 20, 2017.
AU-2015258258 Australian Office Action of Australian Patent Office dated Jun. 9, 2016.
Beato: "Understanding Comfortable stereography", Dec. 31, 2011 (Dec. 31, 2011), XP055335952, Retrieved from the Internet: URL:http://64.17.134.112/Affonso Beatol/Understanding Comfortable Stereography.html [retrieved-on Jan. 17, 2017].
Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].
CA-2817044 Canadian office action dated Jul. 14, 2016.
CN-201180065590.0 Office fourth action dated Jan. 4, 2017.
CN-201280034488.9 2d Office Action from the State Intellectual Property Office of P.R. China dated Mar. 22, 2016.
CN-201280034488.9 1st Office Action from the State Intellectual Property Office of P.R. China dated Jun. 11, 2015.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
CN-201380026047.9 Chinese 2d Office Action of the State Intellectual Property Office of P.R. dated Jul. 12, 2016.
CN-201380026050.0 Chinese 2nd Office Action of the State Intellectual Property Office of P.R. dated Apr. 1, 2017.
CN-201380026058.7 Chinese 1st Office Action of the State Intellectual Property Office of P.R. China dated Nov. 2, 2016.
CN-201380026059.1 Chinese 2nd Office Action of the State Intellectual Property Office of P.R. dated Feb. 22, 2017.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.

(56) References Cited

OTHER PUBLICATIONS

CN-201380073381.X Chinese Office Action of the State Intellectual Property Office of P.R. China dated Nov. 16, 2016.
CN-201480023023.2 Office first action dated Aug. 12, 2016.
CN-201480023023.2 Office second action dated May 11, 2017.
Cootes et al., "Active Appearance Models", IEEE Trans. Pattern Analysis and Machine Intelligence, 23(6):681-685, 2001.
Cootes et al., "Active Shape Models-Their Training and Application" Computer Vision and Image Understanding 61 (1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
EP-09817048.3 European Search Report dated Apr. 29, 2016.
EP-11842021.5 Office Action dated Sep. 2, 2016.
EP-13790775.4 Office Action dated Aug. 29, 2016.
EP-13791437.0 European first office action dated Aug. 30, 2016.
EP-13822472.0 European Extended Search Report of European Patent Office dated Mar. 2, 2016.
EP-13865893.5 European Extended Search Report of European Patent Office dated Oct. 6, 2016.
EP-14754859.8 European Extended Search Report of European Patent Office dated Oct. 14, 2016.
EP-14813739.1 European Extended Search Report of European Patent Office dated Jan. 25, 2017.
EP-14853532.1 European Extended Search Report of European Patent Office dated May 23, 2017.
Ho, "Random Decision Forests", Proceedings of the 3rd International Conference on Document Analysis and Recognition, Montreal, QC, pp. 278-282, Aug. 14-16, 1995.
Ian Sexton et al: "Stereoscopic and autostereoscopic display-systems", —IEEE Signal Processing Magazine, May 1, 1999 (May 1, 1999), pp. 85-99, XP055305471, Retrieved from the Internet: RL:http://ieeexplore.ieee.org/iel5/79/16655/00768575.pdf [retrieved on Sep. 26, 2016].
JP-200980150139.1 1st Office Action dated Nov. 2, 2014.
JP-200980150139.1 2d Office Action dated May 4, 2015.
JP-2015-512794 1st Office Action (translated) dated Feb. 14, 2017.
JP-2015-512809 1st Office Action dated Mar. 28, 2017.
JP-2015-512810 1st Office Action (translated) dated Feb. 7, 2017.
JP-2015-512879 1st Office Action (translated) dated Apr. 11, 2017.
JP-2015-512887 1st Office Action (translated) dated Feb. 7, 2017.
JP-2015-512896 1st Office Action (translated) dated May 9, 2017.
JP-2015-512901 1st Office Action dated Mar. 28, 2017.
JP-2015-512905 1st Office Action (translated) dated Feb. 7, 2017.
Kononenko et al., "Learning to Look Up: Realtime Monocular Gaze Correction Using Machine Learning", Computer Vision and Pattern Recognition, pp. 4667-4675, 2015.
KR-20117010839 1st Office action (translated) dated Aug. 28, 2015.
KR-20117010839 2d Office action (translated) dated Apr. 28, 2016.
KR-20137015775 Office action (translated) dated Oct. 18, 2016.

\* cited by examiner $$\frac{a}{A} \approx \frac{\cos(\theta i)}{\cos(\theta i - 2 \cdot \theta f)} \equiv \text{Efficiency}$$

WIDE ANGLE IMAGING DIRECTIONAL BACKLIGHTS

CROSS-REFERENCE TO RELATED APPLICATIONS

This application claims priority to U.S. Provisional Patent Application No. 62/146,648, entitled "Wide Angle Imaging Directional Backlights" filed Apr. 13, 2015, U.S. Provisional Patent Application No. 62/154,932, entitled "Wide Angle Imaging Directional Backlights" filed Apr. 30, 2015, U.S. Provisional Patent Application No. 62/167,185, entitled "Wide Angle Imaging Directional Backlights" filed May 27, 2015, U.S. Provisional Patent Application No. 62/255,248, entitled "Wide Angle Imaging Directional Backlights" filed Nov. 13, 2015, and U.S. Provisional Patent Application No. 62/167,203, entitled "Wide Angle Imaging Directional Backlights" filed May 27, 2015, all of which are herein incorporated by reference in their entirety.

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to the present disclosure, a directional illumination apparatus may include an imaging directional backlight for directing light, an illuminator array for providing light to the imaging directional backlight. The imaging directional backlight may include a waveguide for guiding light. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Patent Publication No. 2012/0127573, which is herein incorporated by reference in its entirety.

Directional backlights provide illumination through a waveguide with directions within the waveguide imaged to viewing windows. Diverging light from light sources at the input end and propagating within the waveguide is provided with reduced divergence, and typically collimated, by a curved reflecting mirror at a reflecting end of the waveguide and is imaged towards a viewing window by means of curved light extraction features or a lens such as a Fresnel lens. For the on-axis viewing window, the collimated light is substantially parallel to the edges of a rectangular shaped waveguide and so light is output across the entire area of the waveguide towards the viewing window. For off-axis positions, the direction of the collimated light is not parallel to the edges of a rectangular waveguide but is inclined at a non-zero angle. Thus a non-illuminated (or void) outer portion (that may be triangular in shape) is formed between one edge of the collimated beam and the respective edge of the waveguide. Ideally, no light is directed to the respective viewing window from within the outer portion and the display will appear dark in this region. It would be desirable to reduce the appearance of the dark outer portions for off-axis viewing positions so that more of the area of the waveguide can be used to illuminate a spatial light modulator, advantageously reducing system size and cost.

In general with this and related imaging directional backlight systems, not all the backlight area may be useable due to vignetting at high angles. Modification of the system may overcome this limitation by introducing light into regions that are void. Such modified illumination apparatus embodiments may lead to increased brightness, local independent illumination and directional capabilities.

According to a first aspect of the present disclosure a directional waveguide may comprise: an input end; first and second opposed, laterally extending guide surfaces for guiding light along the waveguide; and a reflective end facing the input end for reflecting the input light back along the waveguide, the second guide surface being arranged to deflect the reflected input light through the first guide surface as output light, and the waveguide being arranged to direct the output light into optical windows in output directions that are distributed in a lateral direction in dependence on the input position of the input light, wherein the reflective end is a Fresnel reflector comprising alternating reflective facets and draft facets, the reflective facets providing the Fresnel reflector with positive optical power laterally, and the ratio between (a) height of the input end between the first and second guide surfaces and (b) the height of the reflective end between the first and second guide surfaces has a profile across the lateral direction that is greatest at the optical axis of the Fresnel reflector and reduces towards each side of the optical axis. Said profile of said ratio may compensate for reduction with lateral position in the efficiency of reflection of light by the Fresnel reflector. The height of the input end between the first and second guide surfaces may have a profile across the lateral direction that is highest at the optical axis of the Fresnel reflector and reduces towards each side of the optical axis. Advantageously the spatial uniformity of the display in the lateral direction may be improved for on-axis and off-axis viewing positions in comparison to arrangements with a uniform ratio in the lateral direction.

The edge of the input end at the first guide surface may be straight and the edge of the input end at the second guide surface may be curved to provide said profile. The edges of the input end at the first guide surface and at the second guide surface may each be curved to provide said profile. The height of the reflective end between the first and second guide surfaces may have a profile that is flat. The first guide surface may be arranged to guide light by total internal reflection and the second guide surface comprises a plurality of light extraction features oriented to direct light guided along the waveguide in directions allowing exit through the first guide surface as the output light and intermediate regions between the light extraction features that may be arranged to guide light along the waveguide. The second guide surface may have a stepped shape in which said light extraction features may be facets between the intermediate regions. The light extraction features may have positive optical power in the lateral direction.

Advantageously the tool can be conveniently formed to provide such curved first and second guide surfaces, providing low cost waveguides with appropriate shape.

Further according to a first aspect of the present disclosure, there is provided a directional waveguide comprising: an input end; first and second opposed, laterally extending guide surfaces for guiding light along the waveguide; and a reflective end facing the input end for reflecting the input light back along the waveguide, the second guide surface being arranged to deflect the reflected input light through the first guide surface as output light, and the waveguide being arranged to direct the output light into optical windows in output directions that are distributed in a lateral direction in dependence on the input position of the input light, wherein the reflective end is a Fresnel reflector comprising alternating reflective facets and draft facets, the reflective facets providing the Fresnel reflector with positive optical power laterally, and the height of the input end between the first and second guide surfaces has a profile that is highest at the optical axis of the Fresnel reflector and reduces towards each side of the optical axis. Said profile of the height of the input end may compensate for reduction with lateral position in the efficiency of reflection of light by the Fresnel reflector. The edge of the input end at the first guide surface may be curved and the edge of the input end at the second guide surface may be straight to provide said profile.

According to a second aspect of the present disclosure a directional backlight may comprise: a directional waveguide according to the first aspect; and an array of input light sources arranged at different input positions in a lateral direction across the input end of the waveguide and arranged to input light into the waveguide.

According to a third aspect of the present disclosure a directional display device may comprise a directional backlight according to the second aspect; and a transmissive spatial light modulator arranged to receive the output light from the waveguide and to modulate it to display an image.

According to a fourth aspect of the present disclosure a directional display apparatus may comprise a directional display device according to the third aspect; and a control system arranged to control the light sources.

Advantageously an array of optical windows can be formed, to provide a controllable directionality of optical output. The optical windows can be arranged to provide modes of operation that may be switched between (i) wide viewing angle mode that has similar spatial and angular uniformity to conventional non-imaging backlights, (ii) autostereoscopic 3D mode, (iii) privacy mode, (iv) dual view mode, (v) power savings mode, and (vi) efficient high luminance mode for outdoors operation.

According to a fifth aspect of the present disclosure a directional backlight may comprise: a waveguide comprising an input end; an array of input light sources arranged at different input positions in a lateral direction across the input end of the waveguide and arranged to input input light into the waveguide, the waveguide further comprising first and second opposed, laterally extending guide surfaces for guiding light along the waveguide, side surfaces extending between the first and second guide surfaces, and a reflective end facing the input end for reflecting the input light back along the waveguide and having positive optical power laterally, the second guide surface being arranged to deflect the reflected input light through the first guide surface as output light, and the waveguide being arranged to direct the output light into optical windows in output directions that are distributed in a lateral direction in dependence on the input position of the input light; and additional light sources arranged to direct additional light into the waveguide in a direction in which the additional light is reflected by the reflective end onto the opposite side surface and by the opposite side surface into a segment of the waveguide adjacent the opposite side surface extending from a corner between the reflective surface and the side surface.

Advantageously the spatial uniformity of the output of the backlight can be improved for off-axis viewing positions by means of filling of illumination voids.

The additional light sources may be disposed along at least a part of each side surface adjacent the input end, the additional light sources being arranged to direct additional light into the waveguide through one of the side surfaces.

Advantageously the efficiency of filling of illumination voids may be optimized, reducing power consumption while maintaining high spatial uniformity.

The additional light sources may be disposed along only said part of each side surface. Said part of each side surface along which the additional light sources are disposed may be at least 20% of the side surface. Said part of each side surface along which the additional light sources are disposed may be at most 80% of the side surface.

The device may further comprise a reflector element arranged along at least a part of each side surface adjacent the input end, the additional light sources may be disposed along the input end of the waveguide on each side of the array of input light sources, and may be arranged to direct additional light into the waveguide through the input end onto the reflector element, and the reflector element is arranged to reflect the additional light towards the reflective end so that the additional light is reflected by the reflective end onto the opposite side surface and by the opposite side surface into a segment of the waveguide adjacent the opposite side surface extending from a corner between the reflective surface and the side surface. The reflector element may be disposed along only said part of each side surface. Said part of each side surface along which the reflector element disposed may be at least 20% of the side surface.

Said part of each side surface along which the reflector element is disposed may be at most 80% of the side surface. Said reflector element may comprise an array of facets that are arranged to reflect light in a different direction from light rays of the additional light that are reflected from the side surface. The input end may have facets against which the additional light sources are disposed, which facets face the reflector element.

Advantageously a single light bar may be provided, reducing complexity of assembly and cost. Further hot spots in regions adjacent to the sides may be reduced.

The first guide surface may be arranged to guide light by total internal reflection and the second guide surface may comprise a plurality of light extraction features oriented to direct light guided along the waveguide in directions allowing exit through the first guide surface as the output light and intermediate regions between the light extraction features that are arranged to guide light along the waveguide. The second guide surface may have a stepped shape in which said light extraction features are facets between the intermediate regions. The light extraction features may have positive optical power in the lateral direction. The reflective end may be a Fresnel reflector comprising alternating reflective facets and draft facets, the reflective facets may provide the Fresnel reflector with positive optical power.

Advantageously the number of additional light sources provided may be minimized, reducing cost and complexity.

According to a sixth aspect of the present disclosure, a directional display device may comprise a directional backlight according to the fifth aspect; and a transmissive spatial light modulator arranged to receive the output light from the waveguide and to modulate it to display an image.

According to a seventh aspect of the present disclosure, a directional display apparatus may comprise said directional display device according to the sixth aspect and a control system arranged to control the light sources. Advantageously an array of optical windows can be formed, to provide a controllable directionality of optical output. The optical windows can be arranged to provide modes of operation that may be switched between (i) wide viewing angle mode that has similar spatial and angular uniformity to conventional non-imaging backlights, (ii) autostereoscopic 3D mode, (iii) privacy mode, (iv) dual view mode, (v) power savings mode, and (vi) efficient high luminance mode for outdoors operation.

The control system may be arranged to control input light sources selected to direct output light into desired optical windows, and may be further arranged to control at least one additional light source selected to provide additional light that is output from the directional backlight in the same output directions as the desired optical windows. The control system may be arranged, when a selected input light source is off-center of the array of input light surfaces, to control at least one additional light source that is on the opposite side of the directional backlight from the selected input light source.

Advantageously illumination voids that are not illuminated by at least a first light source may be illuminated by a second light source, achieving increased illumination uniformity, while achieving directional viewing.

According to an eighth aspect of the present disclosure a directional waveguide is provided comprising: an input end for receiving input light at different input positions in a lateral direction across the input end; first and second opposed guide surfaces for guiding input light along the waveguide; and a reflective end for reflecting input light back along the waveguide, wherein the second guide surface is arranged to deflect light reflected from the reflective end through the first guide surface as output light, and the waveguide is arranged to direct the output light into respective optical windows in output directions that are distributed laterally in dependence on the position of the input light, and further comprising a light blocking layer disposed across at least one of the first and second opposed guide surfaces adjacent the input end and arranged to absorb light incident thereon.

Said light blocking layer may be disposed across each of the first and second opposed guide surfaces adjacent the input end. The light blocking layer may comprise tape attached to said at least one of the first and second opposed guide surfaces. The light blocking layer may comprise paint on said at least one of the first and second opposed guide surfaces. The directional waveguide may be mounted to a mounting element, in which case the light blocking layer may be provided on the mounting element. The light blocking layer may extend along the entire extent of the input end.

According to a ninth aspect of the present disclosure a directional display device may comprising a directional backlight according to the eighth aspect, and a transmissive spatial light modulator arranged to receive the output light from the waveguide and to modulate it to display an image, the light blocking layer being arranged outside the area of the spatial light modulator.

Advantageously stray light near the input of the waveguide may be reduced. Further reflections at the input side may be reduced, so that cross talk is improved for modes of operation of the directional display device including autostereoscopic 3D and off-axis observers of a privacy display.

Any of the aspects of the present disclosure may be applied in any combination.

Embodiments herein may provide an autostereoscopic display that provides wide angle viewing which may allow for directional viewing and conventional 2D compatibility. The wide angle viewing mode may be for observer tracked autostereoscopic 3D display, observer tracked 2D display (for example for privacy or power saving applications), for wide viewing angle 2D display or for wide viewing angle stereoscopic 3D display. Further, embodiments may provide a controlled illuminator for the purposes of an efficient autostereoscopic display. Such components can be used in directional backlights, to provide directional displays including autostereoscopic displays. Additionally, embodiments may relate to a directional backlight apparatus and a directional display which may incorporate the directional backlight apparatus. Such an apparatus may be used for autostereoscopic displays, privacy displays, multi-user displays and other directional display applications that may achieve for example power savings operation and/or high luminance operation.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices.

Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
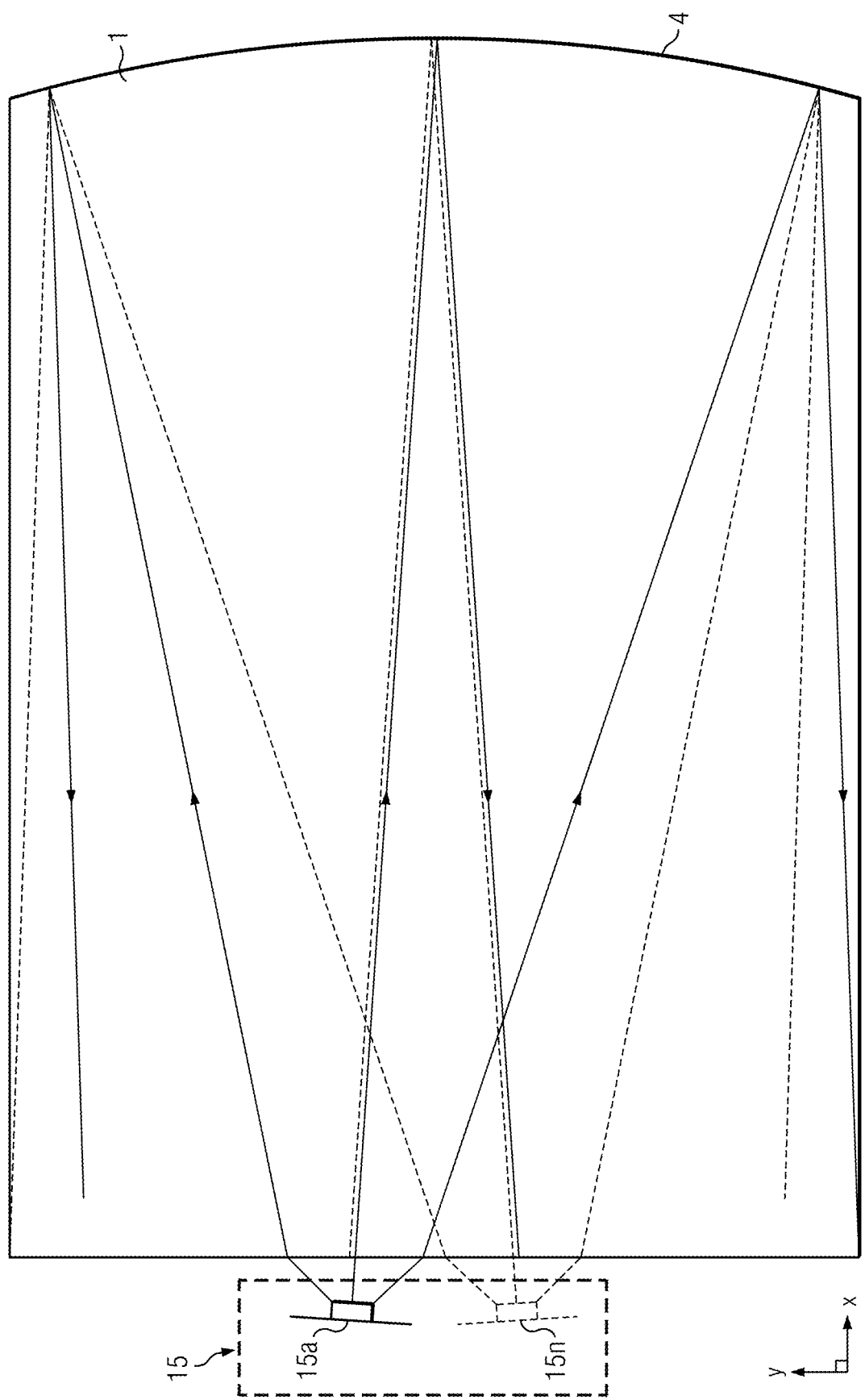
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 (U.S. Patent Publication No. 2012/0127573), herein incorporated by reference in its entirety, advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See. e.g., Käliä Kälintär et al., *Backlight Unit*

*With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293 (U.S. Pat. Publ. No. 2012/0127573), which is herein incorporated by reference in its entirety.

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893, by Microsoft, for example U.S. Pat. No. 7,970,246 which may be referred to herein as a "wedge type directional backlight;" by RealD, for example U.S. patent application Ser. No. 13/300,293 (U.S. Patent Publication No. 2012/0127573) which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
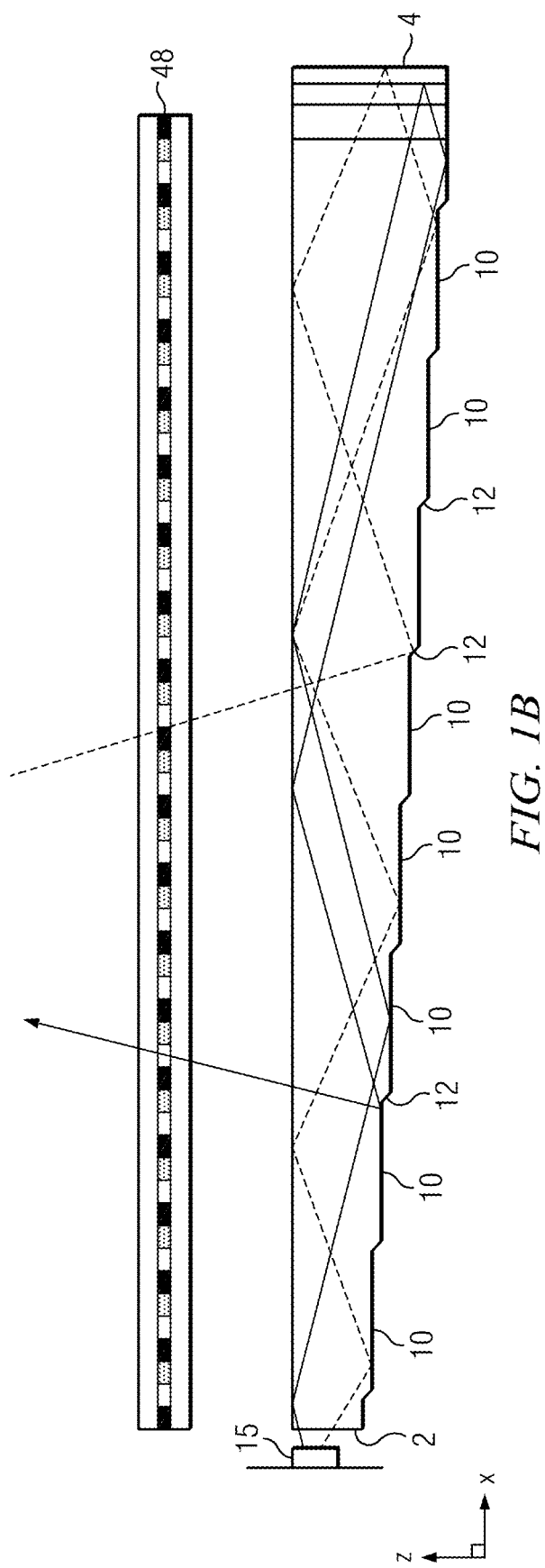
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1. The second guide surface has a plurality of light extraction features 12 facing the reflective end 4 and arranged to reflect at least some of the light guided back through the waveguide 1 from the reflective end from different input positions across the input end in different directions through the first guide surface that are dependent on the input position.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape which may include the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide and modulates the light output therefrom. Although the SLM 48 may a liquid crystal display (LCD), this is merely by way of example and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
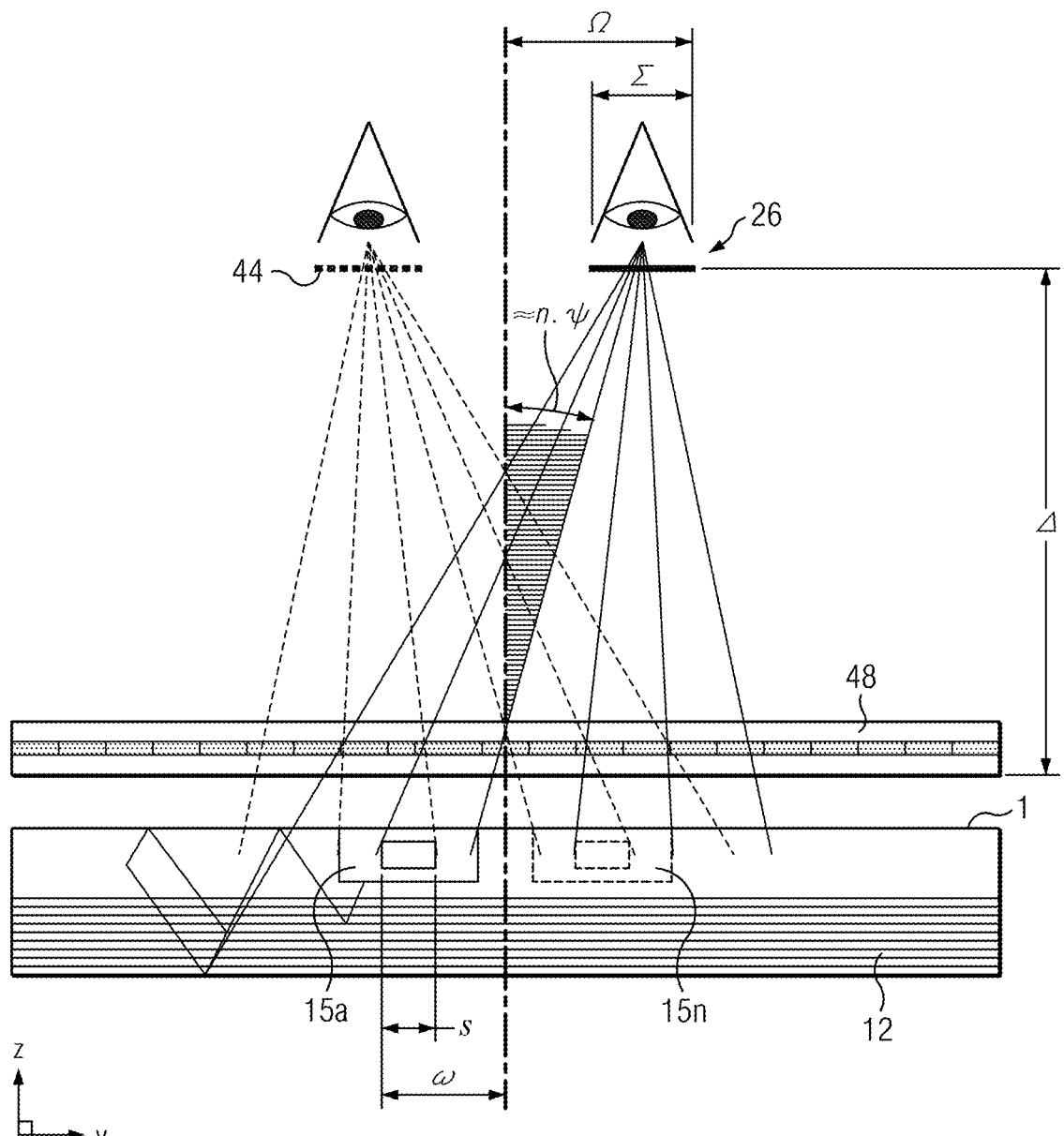
FIG. 2A is a schematic diagram illustrating in a top view of light propagation in another embodiment of a directional display device, in accordance with the present disclosure.
Figure 2B:
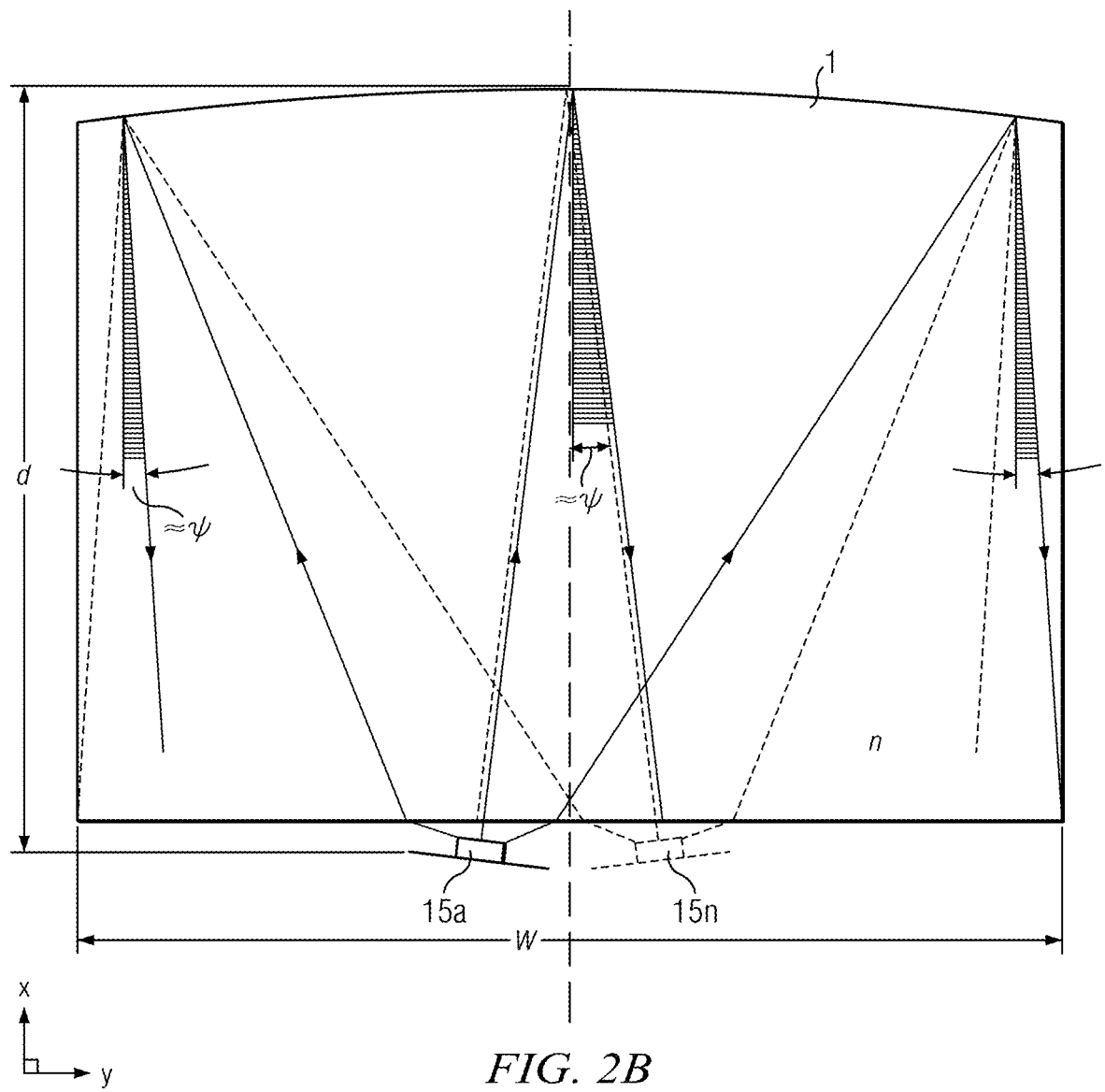
FIG. 2B is a schematic diagram illustrating light propagation in a front view of the directional display device of FIG. 2A, in accordance with the present disclosure.
Figure 2C:
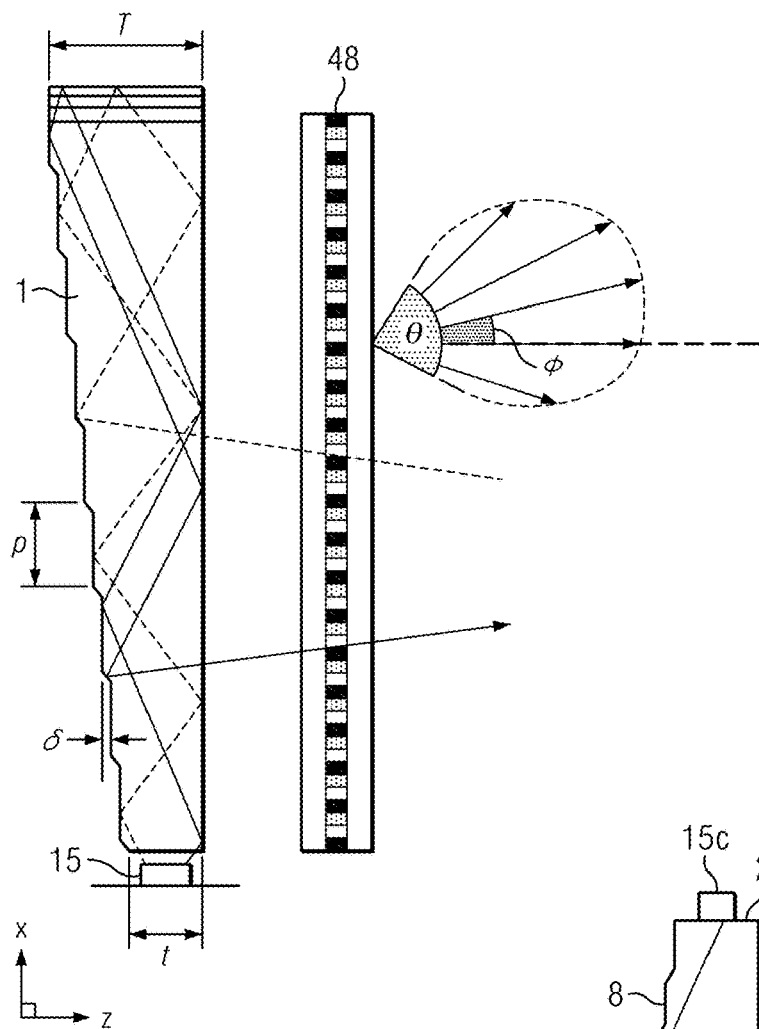
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
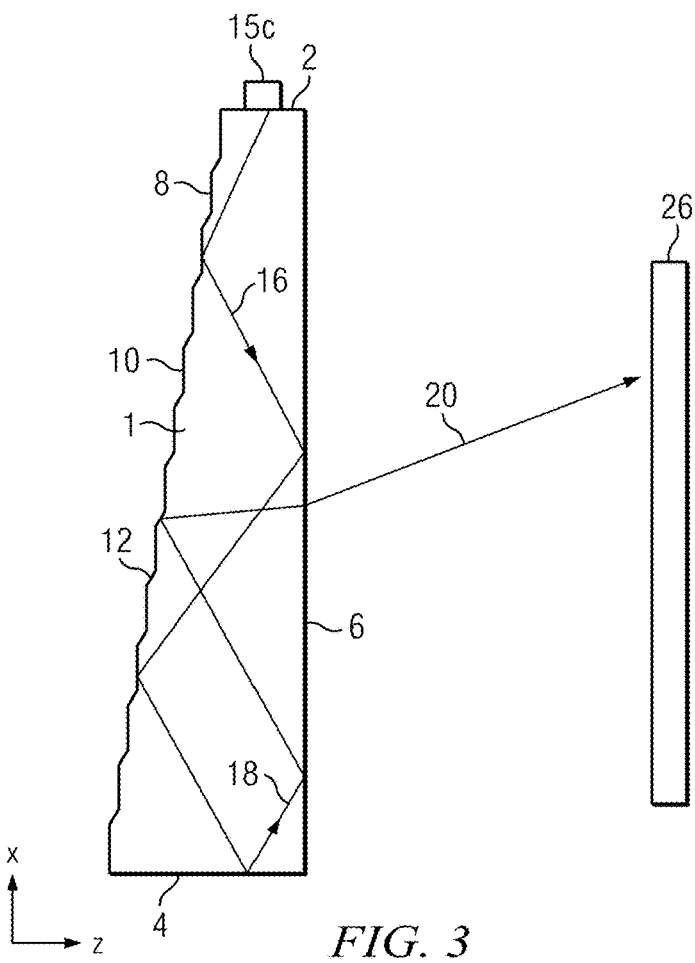
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
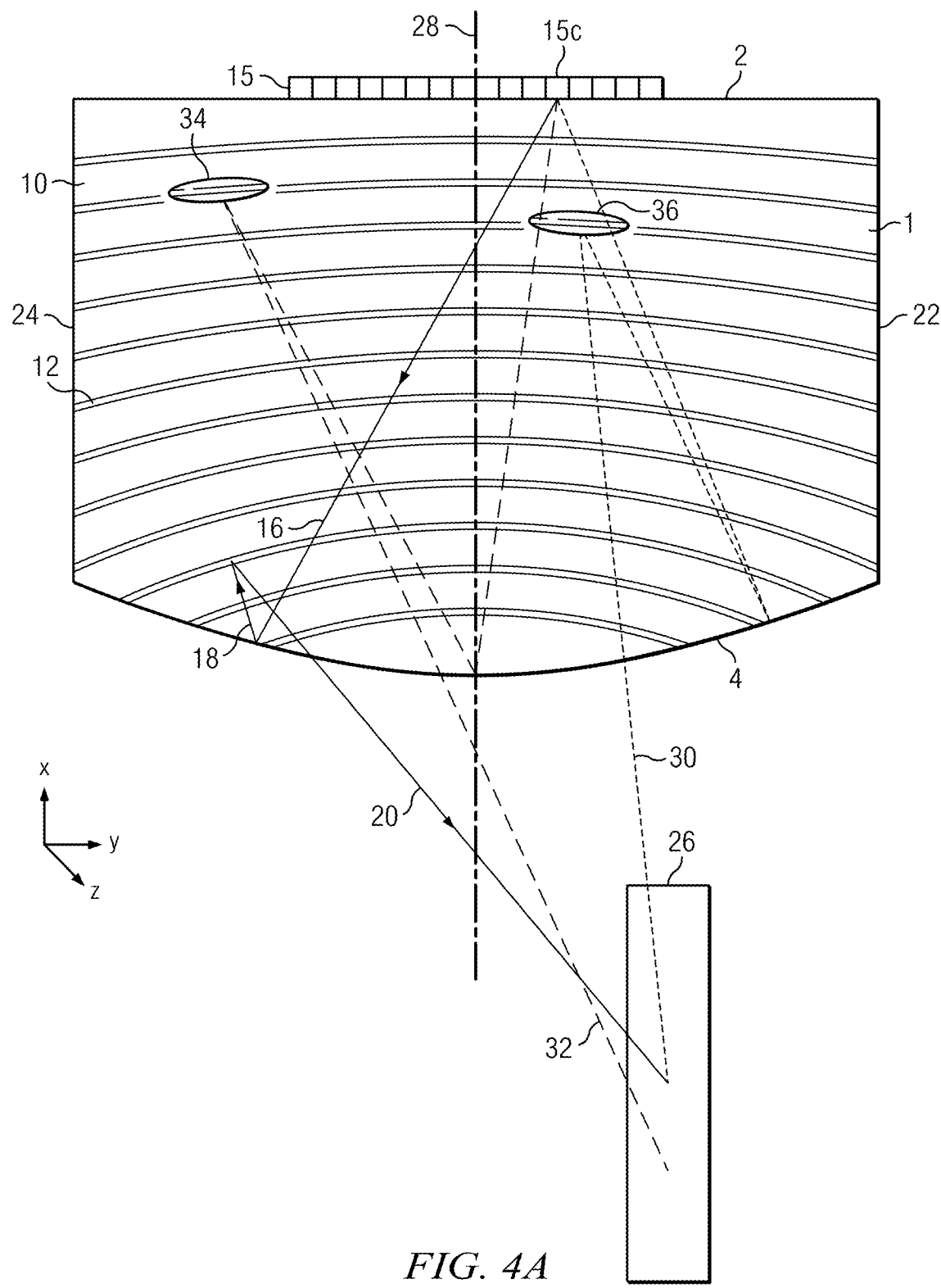
FIG. 4A is a schematic diagram illustrating in a front view, generation of a viewing window in a directional display device including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
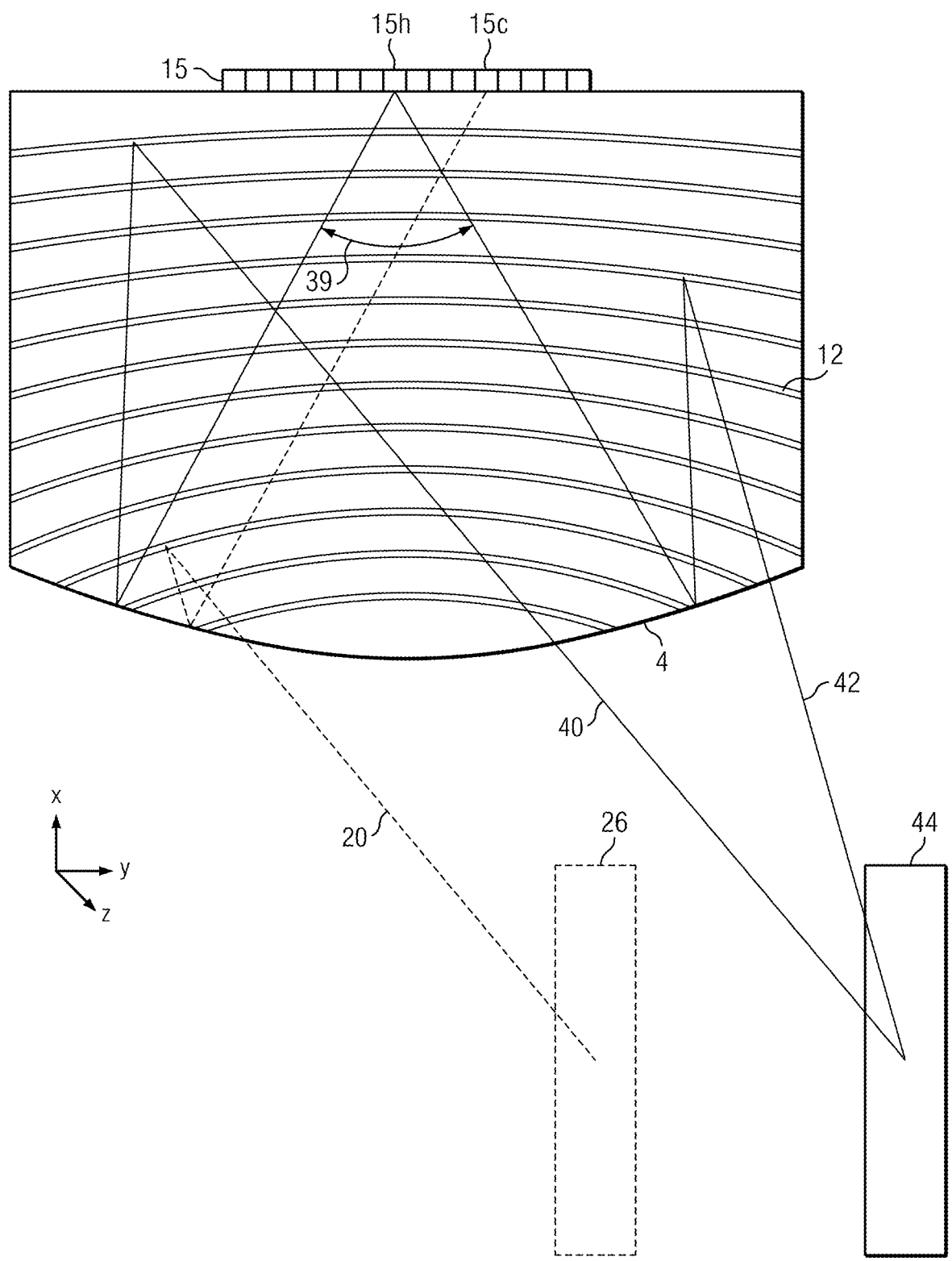
FIG. 4B is a schematic diagram illustrating in a front view, generation of a first and a second viewing window in a directional display device including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15h of the illuminator array 15. The curvature of the reflective end on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
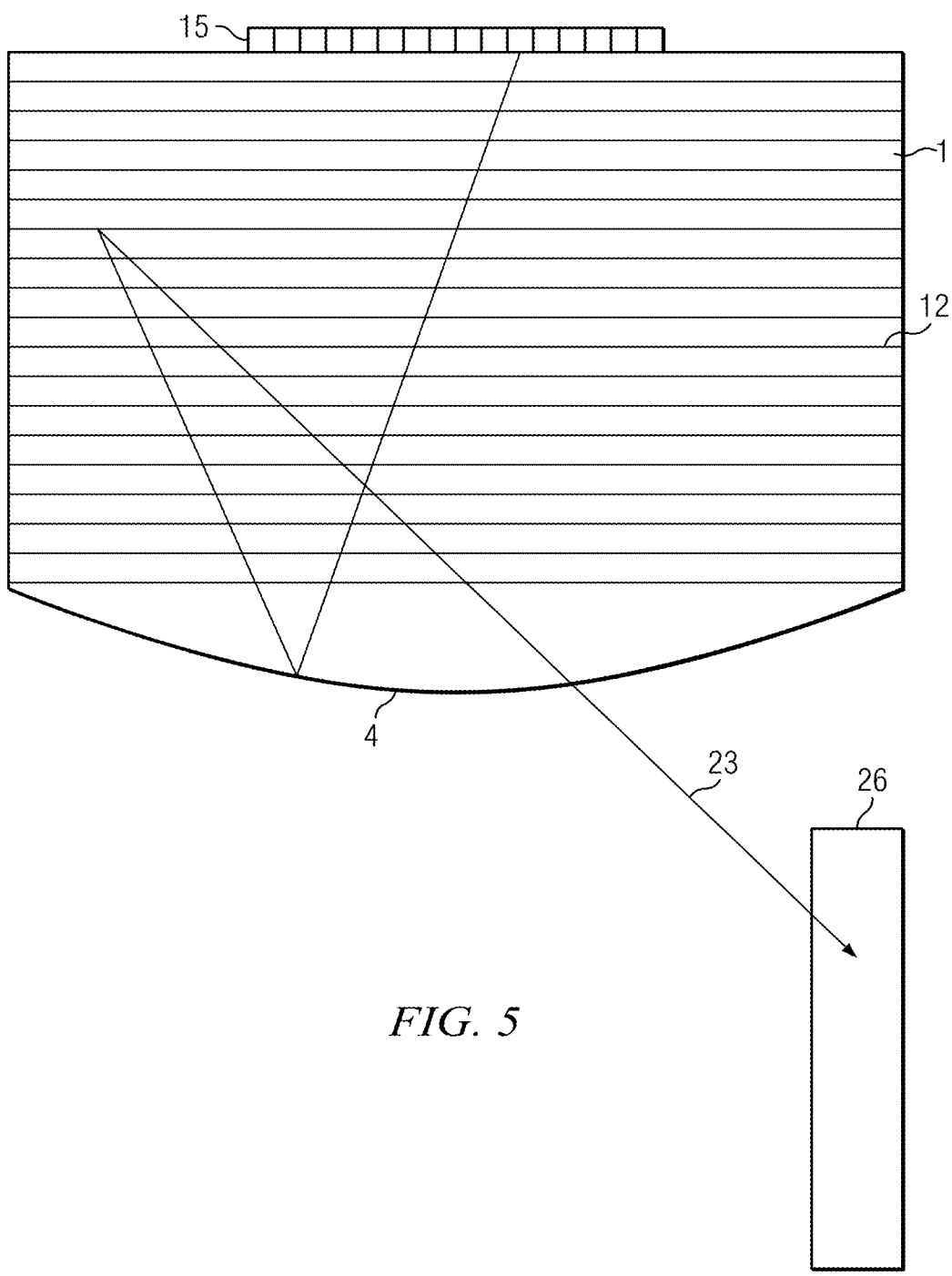
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
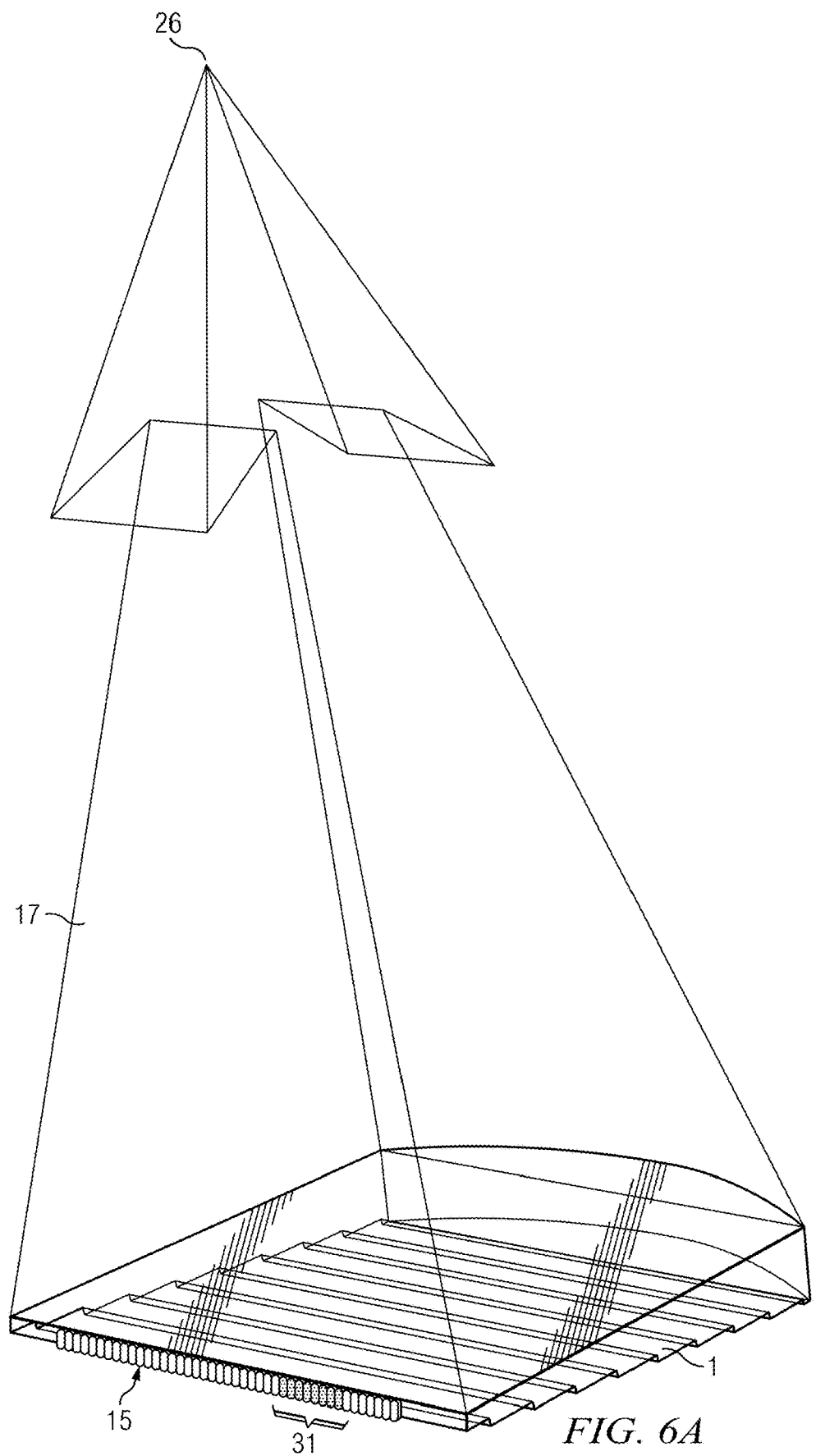
FIG. 6A is a schematic diagram illustrating one embodiment of the generation of a first viewing window in a time multiplexed directional display device in a first time slot, in accordance with the present disclosure.
Figure 6B:
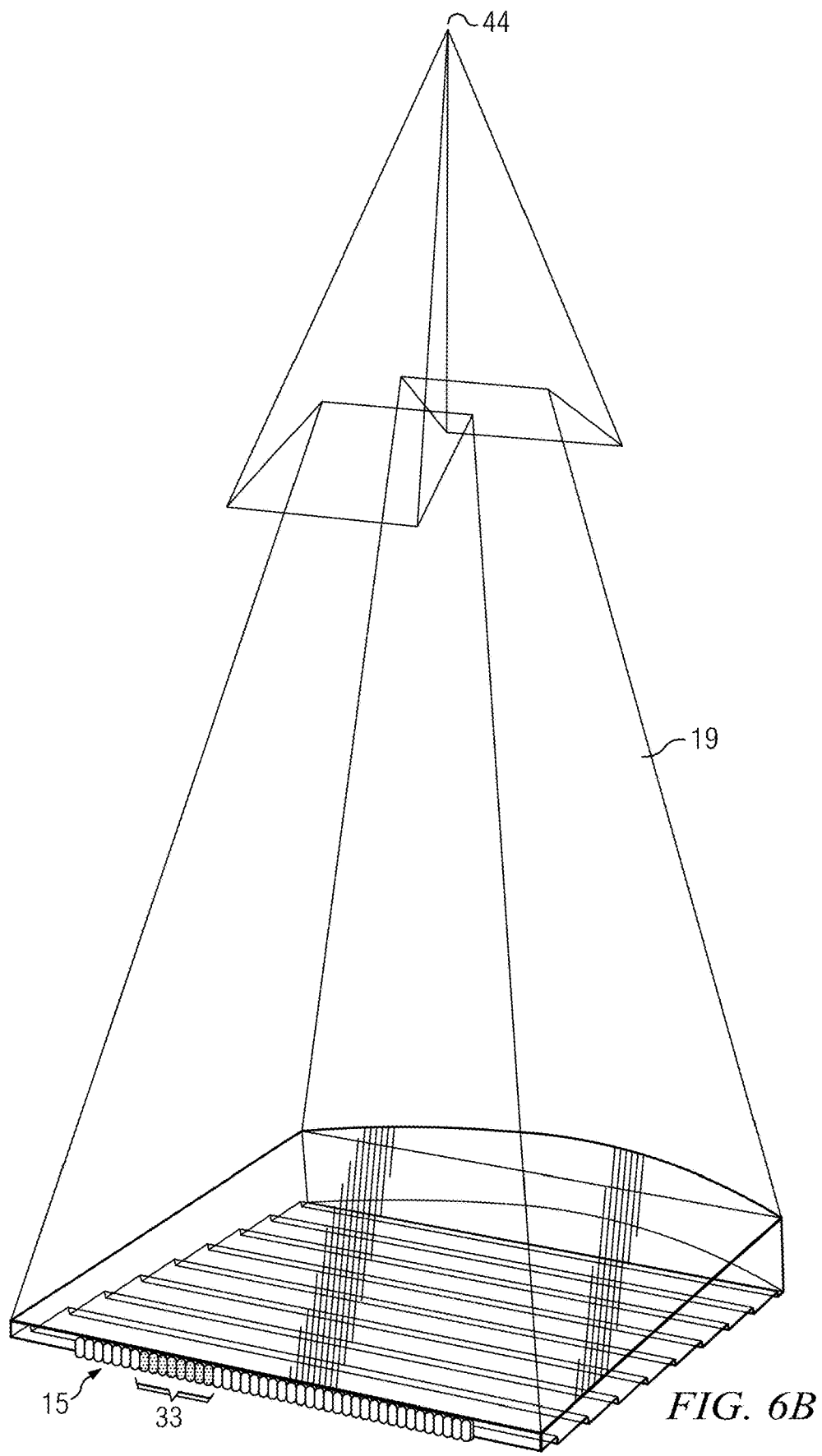
FIG. 6B is a schematic diagram illustrating another embodiment of the generation of a second viewing window in a time multiplexed directional display device in a second time slot, in accordance with the present disclosure.
Figure 6C:
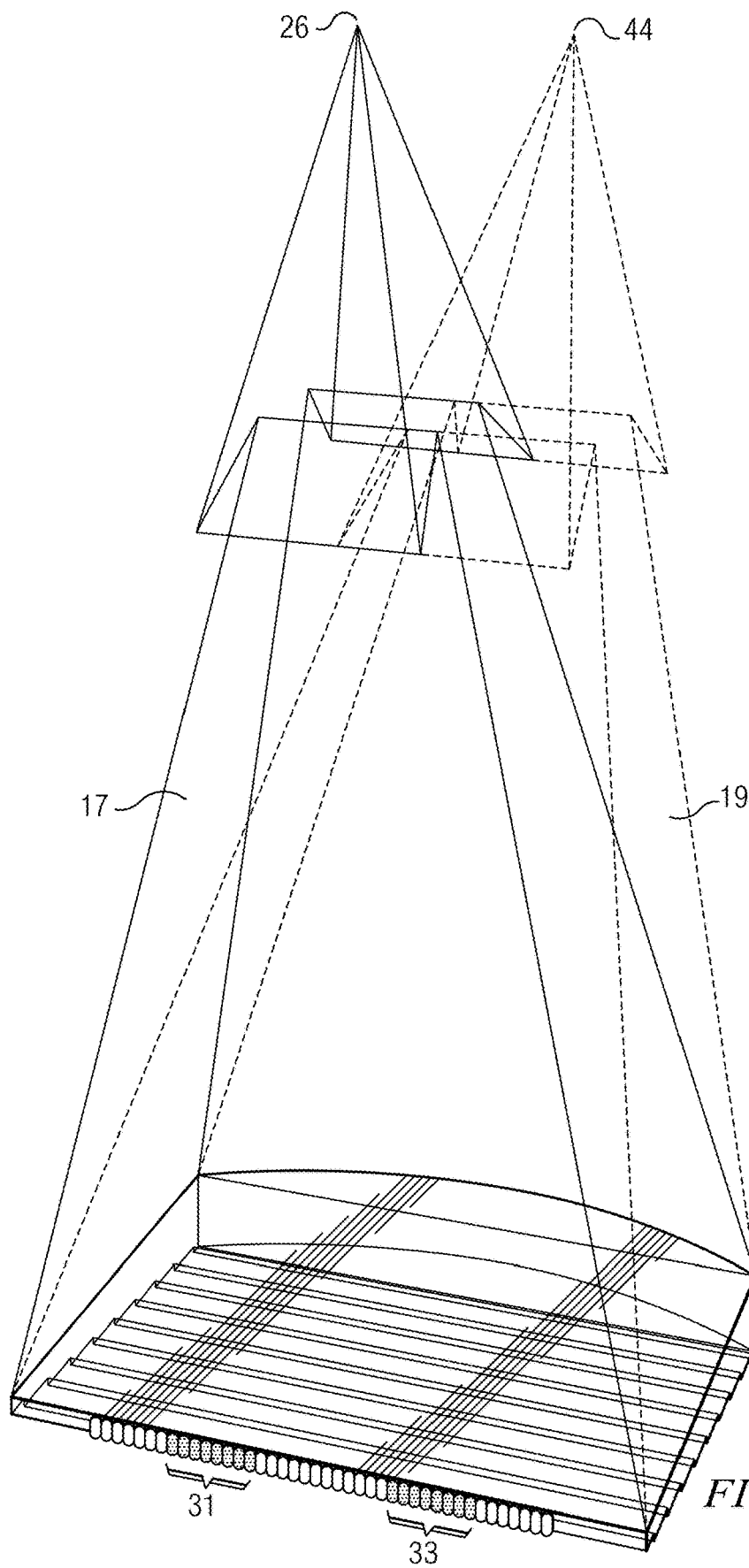
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights described herein. Note that illuminator element groups 31, 33 each include one or more illumination elements from illumination elements 15a to 15n, where n is an integer greater than one.

Figure 7:
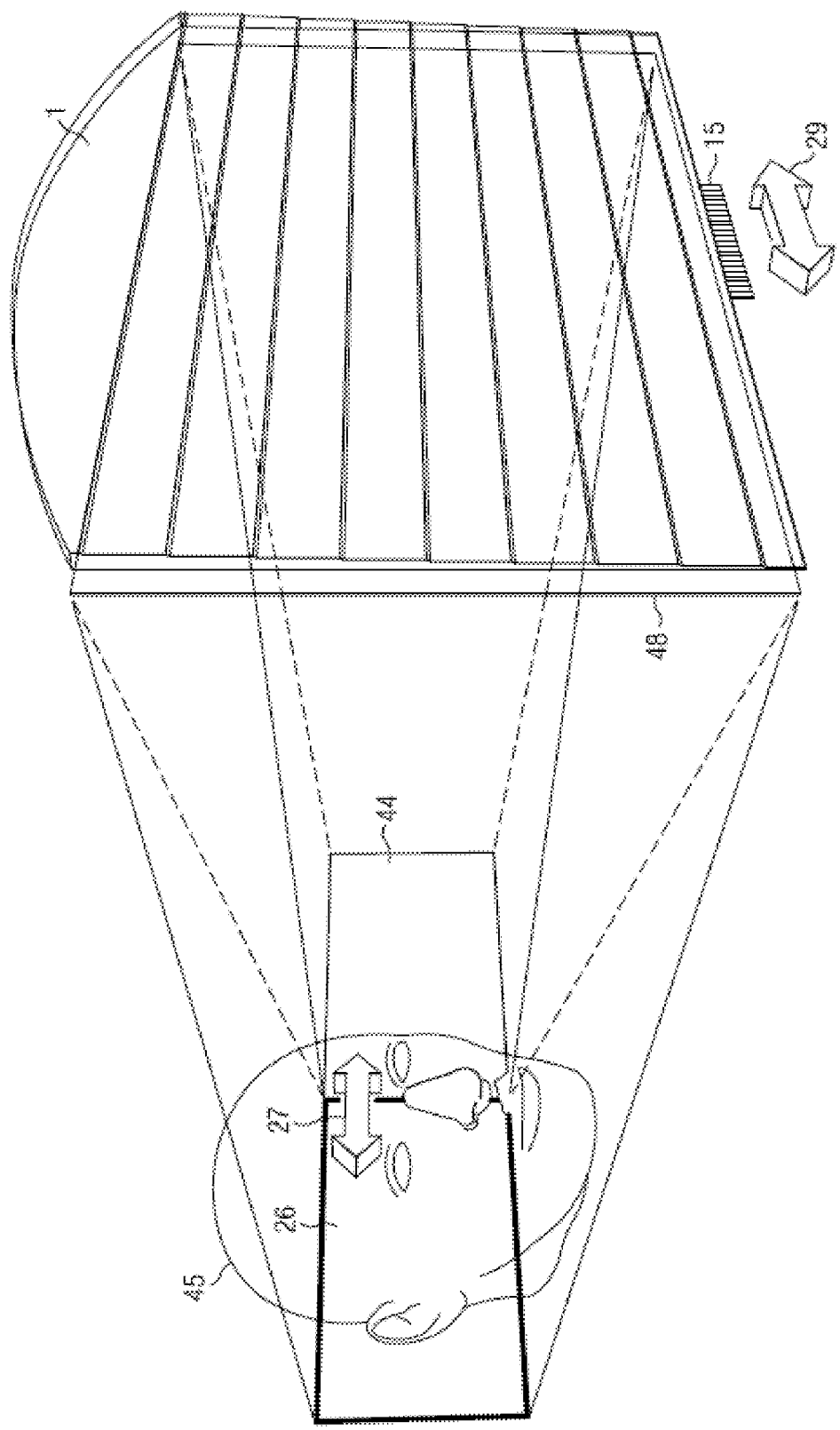
FIG. 7 is a schematic diagram illustrating an observer tracking autostereoscopic directional display device, in accordance with the present disclosure.

FIG. 7 is a schematic diagram illustrating one embodiment of an observer tracking autostereoscopic directional display device. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights described herein.

Figure 8:
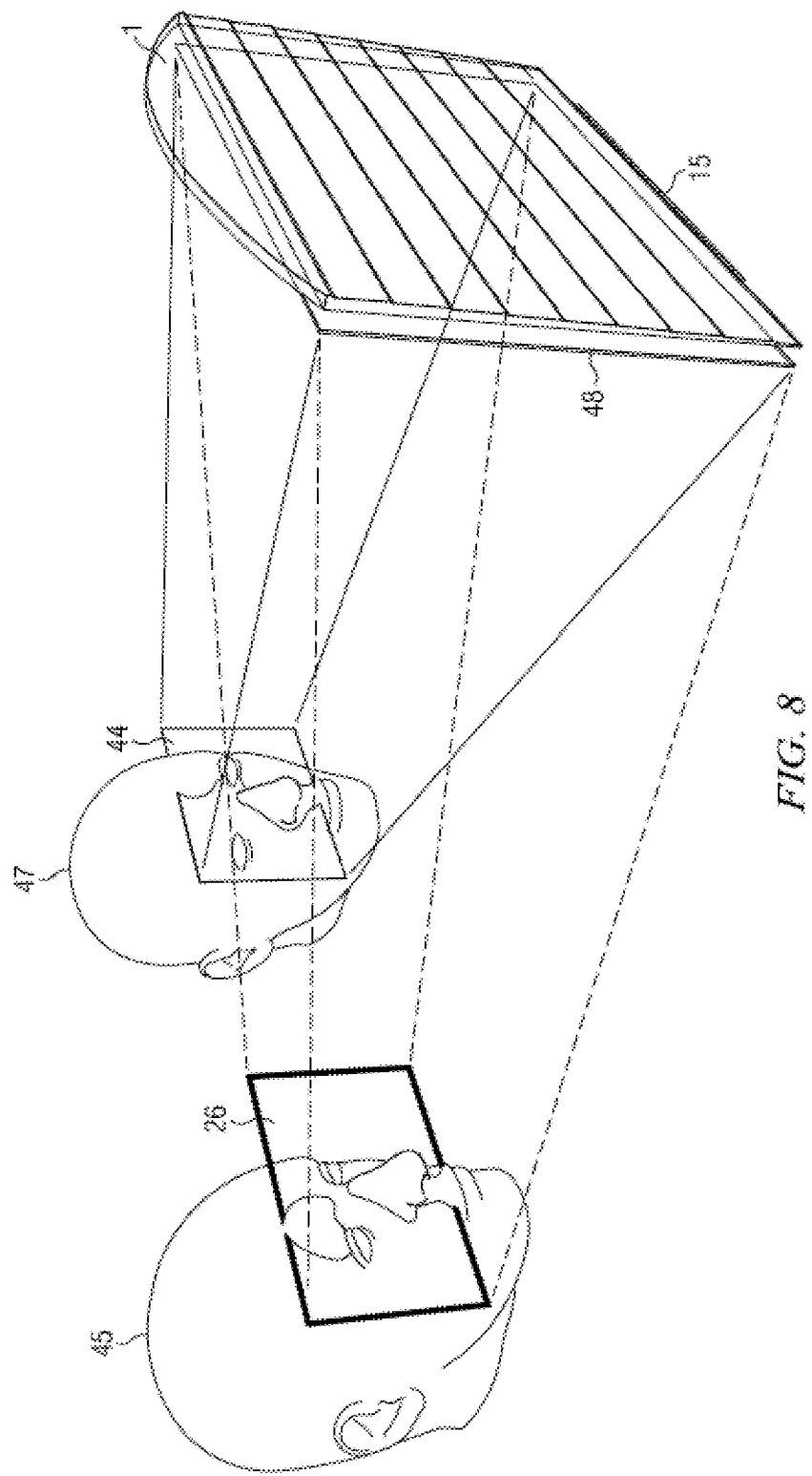
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
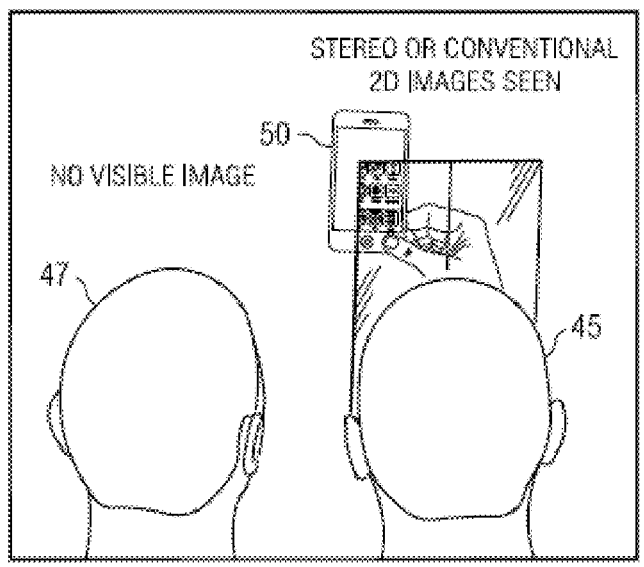
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
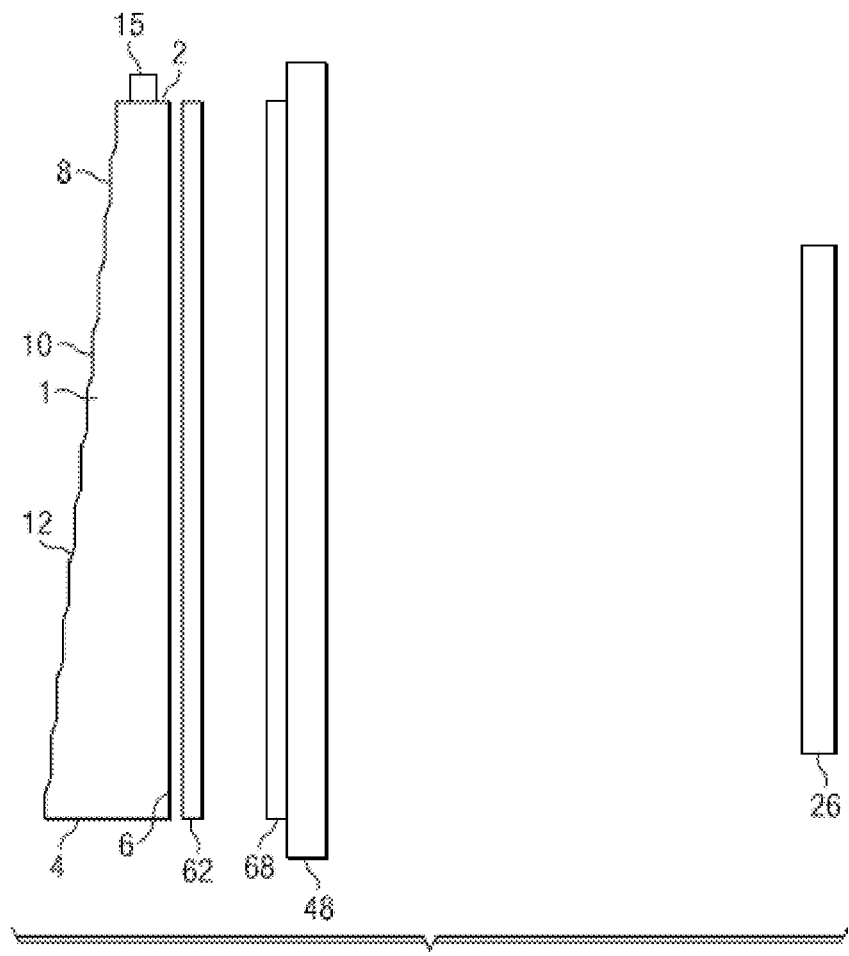
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 in a window plane 106 at a nominal viewing distance from the spatial light modulator for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

A further wedge type directional backlight is generally discussed by U.S. Pat. No. 7,660,047 which is herein incorporated by reference in its entirety. The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light redirection films to extract light towards an observer and angular non-uniformities of input may not provide non-uniformities across the display surface.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

Figure 11:
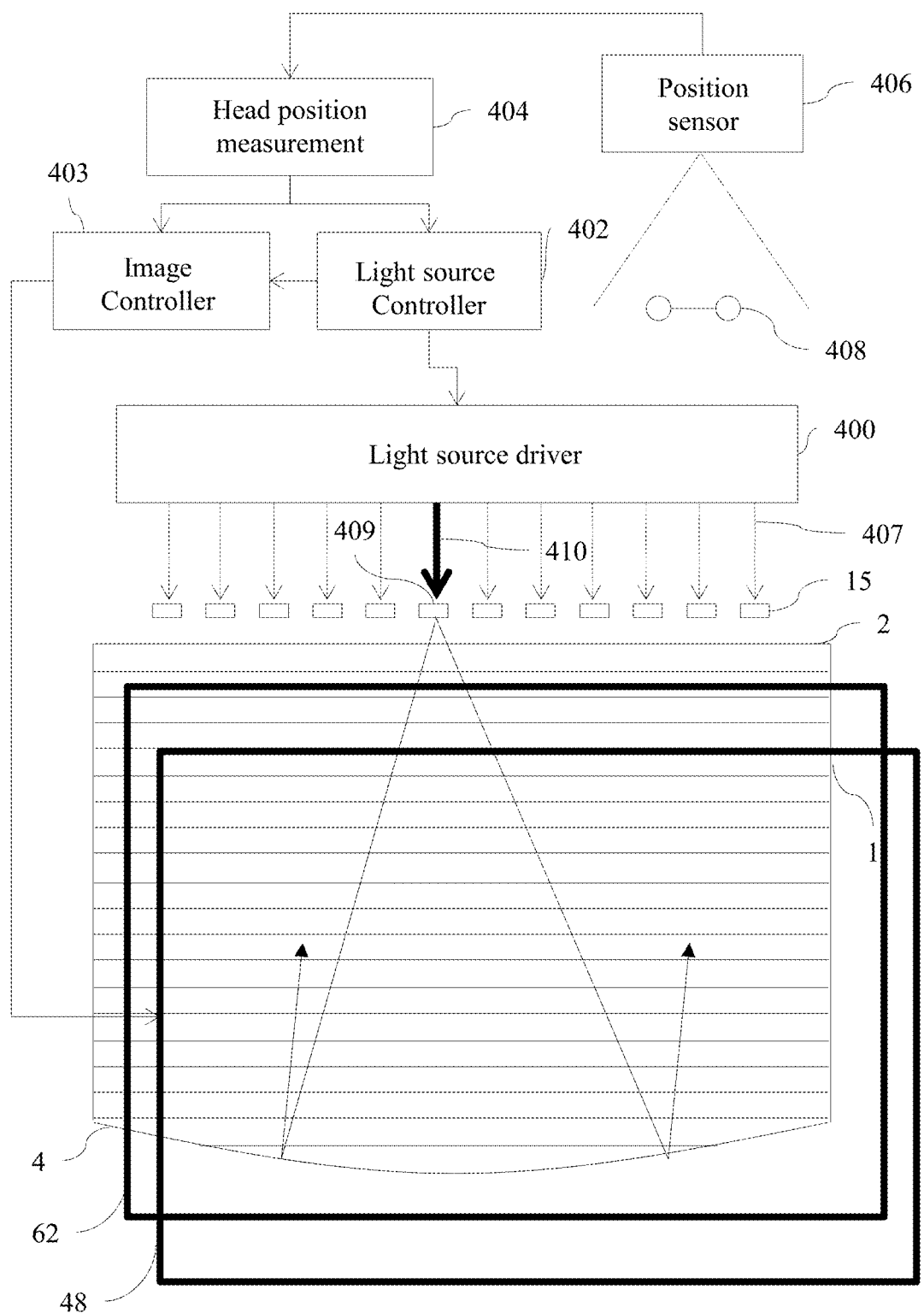
FIG. 11 is a schematic diagram illustrating a directional display apparatus comprising a directional display device and a control system, in accordance with the present disclosure.

FIG. 11 is a schematic diagram illustrating a directional display apparatus comprising a directional display device and a control system. The arrangement and operation of the control system will now be described and may be applied, with changes as necessary, to each of the display devices disclosed herein. The directional backlight comprises a waveguide 1 and an array 15 of illumination elements 15a-15n arranged as described above. The control system is arranged to selectively operate the illumination elements 15a-15n to direct light into selectable viewing windows.

The reflective end 4 converges the reflected light. Fresnel lens 62 may be arranged to cooperate with reflective end 4 to achieve viewing windows at a viewing plane. Transmissive spatial light modulator 48 may be arranged to receive the light from the directional backlight. The image displayed on the SLM 48 may be presented in synchronization with the illumination of the light sources of the array 15.

The control system may comprise a sensor system arranged to detect the position of the observer 99 relative to the display device 100. The sensor system comprises a position sensor 406, such as a camera arranged to determine the position of an observer 408; and a head position measurement system 404 that may for example comprise a computer vision image processing system. The position sensor 406 may comprise known sensors including those comprising cameras and image processing units arranged to detect the position of observer faces. Position sensor 406 may further comprise a stereo sensor arranged to improve the measure of longitudinal position compared to a monoscopic camera. Alternatively position sensor 406 may comprise measurement of eye spacing to give a measure of required placement of respective arrays of viewing windows from tiles of the directional display.

The control system may further comprise an illumination controller and an image controller 403 that are both supplied with the detected position of the observer supplied from the head position measurement system 404.

The illumination controller comprises an LED controller 402 arranged to determine which light sources of array 15 should be switched to direct light to respective eyes of observer 408 in cooperation with waveguide 1; and an LED driver 400 arranged to control the operation of light sources of light source array 15 by means of drive lines 407. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 403 is arranged to control the SLM 48 to display images. To provide an autostereoscopic display, the image controller 403 and the illumination controller may operate as follows. The image controller 403 controls the SLM 48 to display temporally multiplexed left and right eye images and the LED controller 402 operates the light sources 15 to direct light into viewing windows in positions corresponding to the left and right eyes of an observer synchronously with the display of left and right eye images. In this manner, an autostereoscopic effect is achieved using a time division multiplexing technique. In one example, a single viewing window may be illuminated by operation of light source 409 (which may comprise one or more LEDs) by means of drive line 410 wherein other drive lines are not driven as described elsewhere.

The head position measurement system 404 detects the position of an observer relative to the display device 100. The LED controller 402 selects the light sources 15 to be operated in dependence on the position of the observer detected by the head position measurement system 404, so that the viewing windows into which light is directed are in positions corresponding to the left and right eyes of the observer. In this manner, the output directionality of the waveguide 1 may be achieved to correspond with the viewer position so that a first image may be directed to the observer's right eye in a first phase and directed to the observer's left eye in a second phase.

Figure 12:
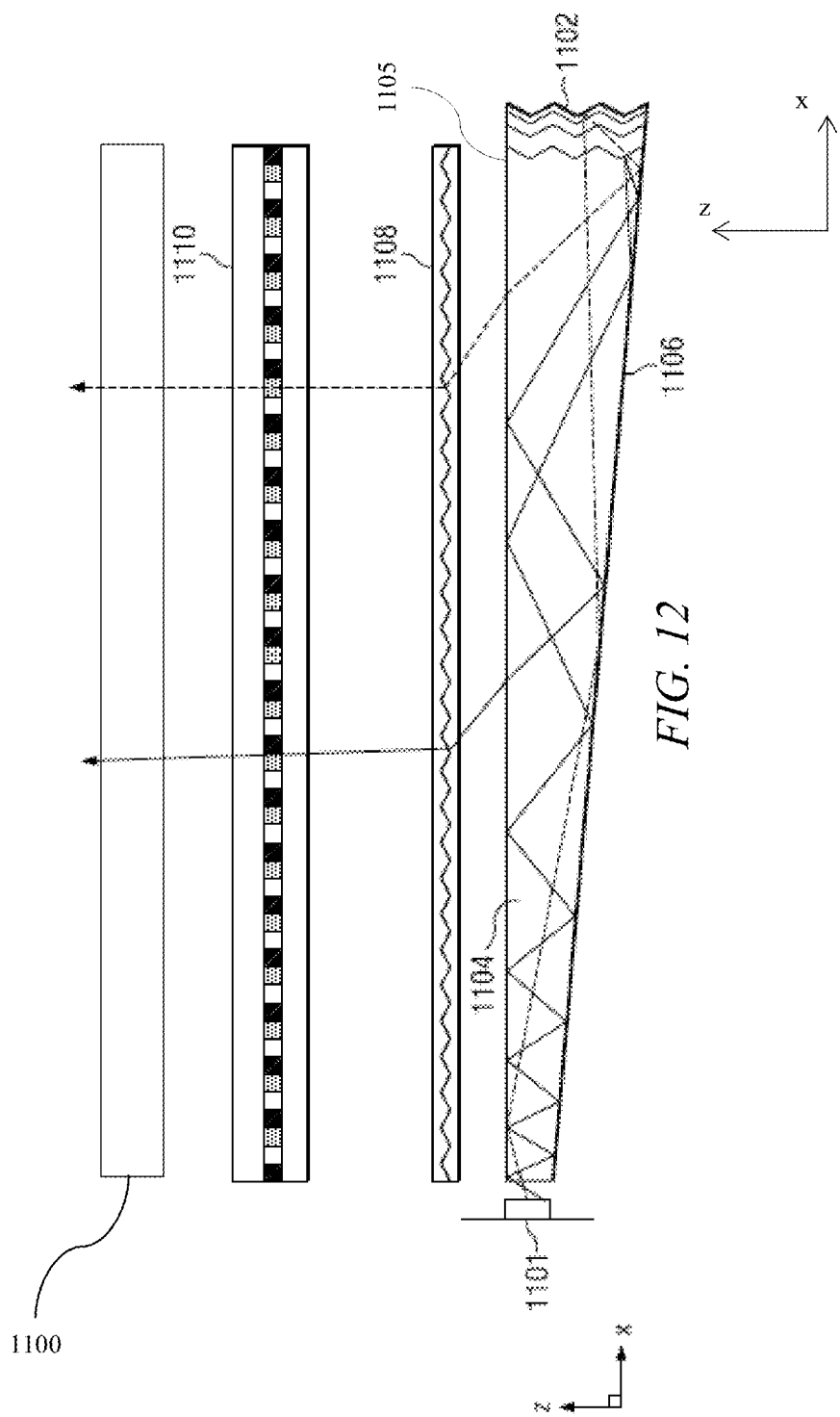
FIG. 12 is a schematic diagram illustrating in side view, the structure of a directional display device comprising a wedge waveguide, in accordance with the present disclosure.

FIG. 12 is a schematic diagram illustrating in side view, the structure of a directional display device comprising a wedge directional backlight comprising a wedge waveguide 1104 with faceted mirror end 1102. The first guide surface 1105 of the waveguide 1104 is arranged to guide light by total internal reflection and the second guide surface 1106 is substantially planar and inclined at an angle to direct light in directions that break the total internal reflection for outputting light through the first guide surface 1105. The display device further comprises a deflection element 1108 extending across the first guide surface 1105 of the waveguide 1104 for deflecting light from array 1101 of light sources towards the normal to the first guide surface 1105. Further the waveguide 1104 may further comprise a reflective end 1102 for reflecting input light back through the waveguide 1104, the second guide 1106 surface being arranged to deflect light as output light through the first guide surface 1105 after reflection from the reflective end 1102. The reflective end has positive optical power in the lateral direction (y-axis) in a similar manner to the reflective end shown in FIG. 5 for example. Further facets in the reflective end 1102 deflect the reflected light cones within the waveguide 1104 to achieve output coupling on the return path. Thus viewing windows are produced in a similar manner to that shown in FIG. 11. Further the directional display may comprise a spatial light modulator 1110 and parallax element 1100 aligned to the spatial light modulator 1110 that is further arranged to provide optical windows. A control system 72 similar to that shown in FIG. 11 may be arranged to provide control of directional illumination providing viewing windows 26 and windows 109 from the parallax element and aligned spatial light modulator.

Thus a first guide surface may be arranged to guide light by total internal reflection and the second guide surface may be substantially planar and inclined at an angle to direct light in directions that break that total internal reflection for outputting light through the first guide surface, and the display device may further comprise a deflection element extending across the first guide surface of the waveguide for deflecting light towards the normal to the first guide surface.

Figure 13:
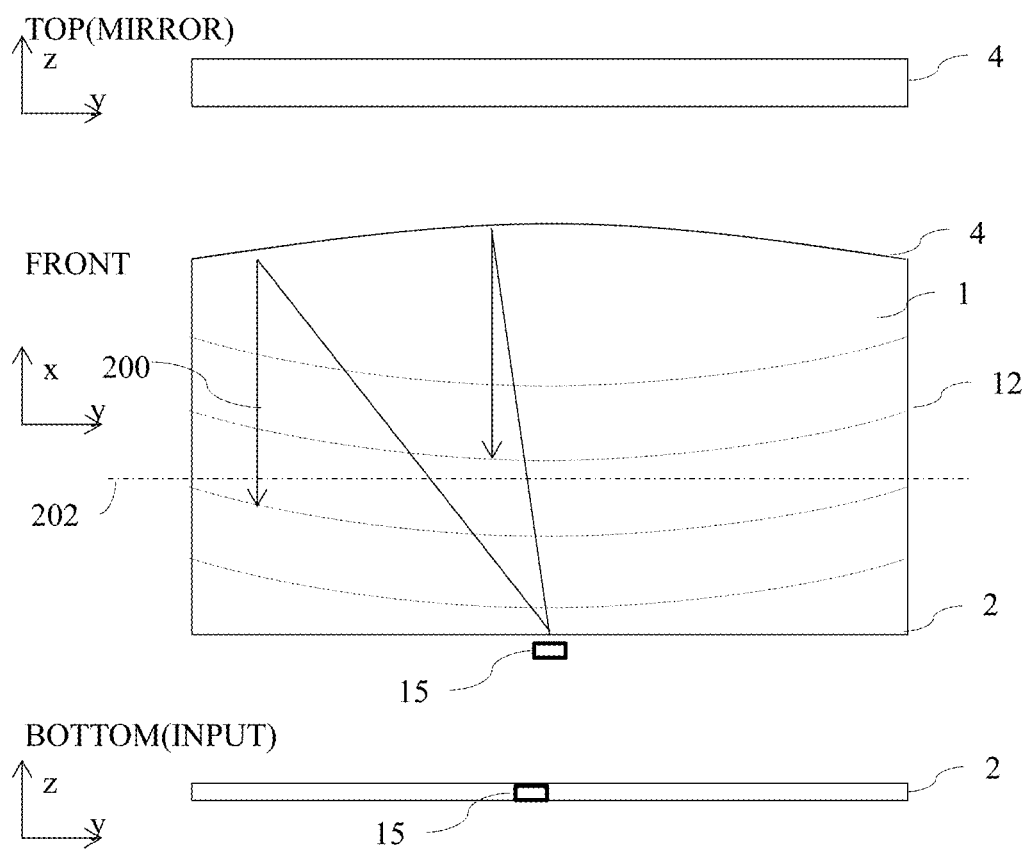
FIG. 13 is a schematic diagram illustrating in top, front and bottom views a stepped imaging waveguide comprising a continuously curved mirror end and rectangular mirror and input ends, in accordance with the present disclosure.

FIG. 13 is a schematic diagram illustrating in top, front and bottom views a stepped imaging waveguide comprising a continuously curved mirror end 4 and rectangular mirror end 4 and input end 2. Light source 15 illuminates the input aperture of the directional imaging waveguide such as stepped waveguide 1. Light rays 200 are reflected by curved mirror 4 and are collimated. Across line 202, the output light reflected by facets 12 may have a luminance profile with respect to position across the width of the waveguide 1.

Figure 14:
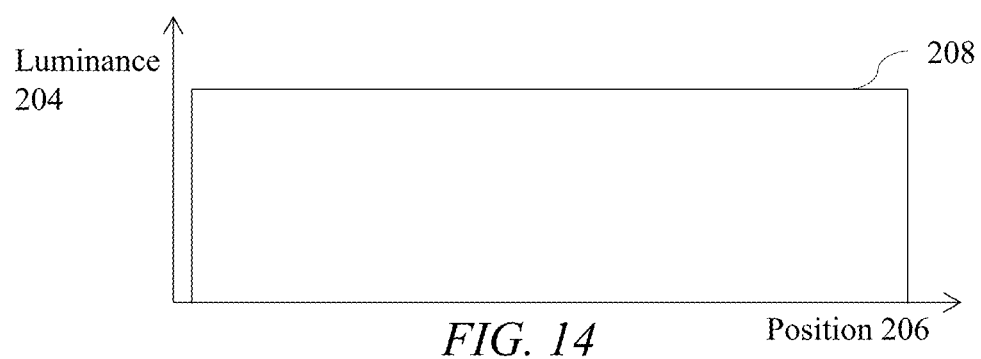
FIG. 14 is a graph illustrating variation of luminance with lateral position for the waveguide arrangements of FIG. 13, in accordance with the present disclosure.

FIG. 14 is a graph illustrating variation of luminance 204 with lateral position 206 across the waveguide 1 for the waveguide arrangements of FIG. 13. Profile 208 that is substantially flat is achieved. Advantageously, high lateral uniformity is provided for a central light source 15 of array of light sources 15*a-n*.

The continuous curve to the mirror end 4 increases the footprint of the waveguide in comparison to conventional scattering waveguides, increasing bezel size. It would be desirable to reduce the bezel of the waveguide 1 while maintaining lateral uniformity of profile 208.

In the present embodiments, the uniformity profile 208 across the line 202 represents the spatial uniformity across the waveguide 1. This is separate to the angular uniformity across the array of optical windows. Desirably a backlight is arranged to provide high spatial uniformity, typically greater than 70% across the display area. However, the same backlight may provide angular uniformity in wide angle mode that may be greater than 20% across a +/−45 degrees angular range. In Privacy, 3D, high efficiency and outdoors operation modes, the angular uniformity may be greater than 2% across a +/−45 degrees. Thus spatial and angular uniformity are different properties. The present embodiments are arranged to provide desirable spatial uniformity for directional backlight with controllable angular uniformity in a lateral direction.

Figure 15:
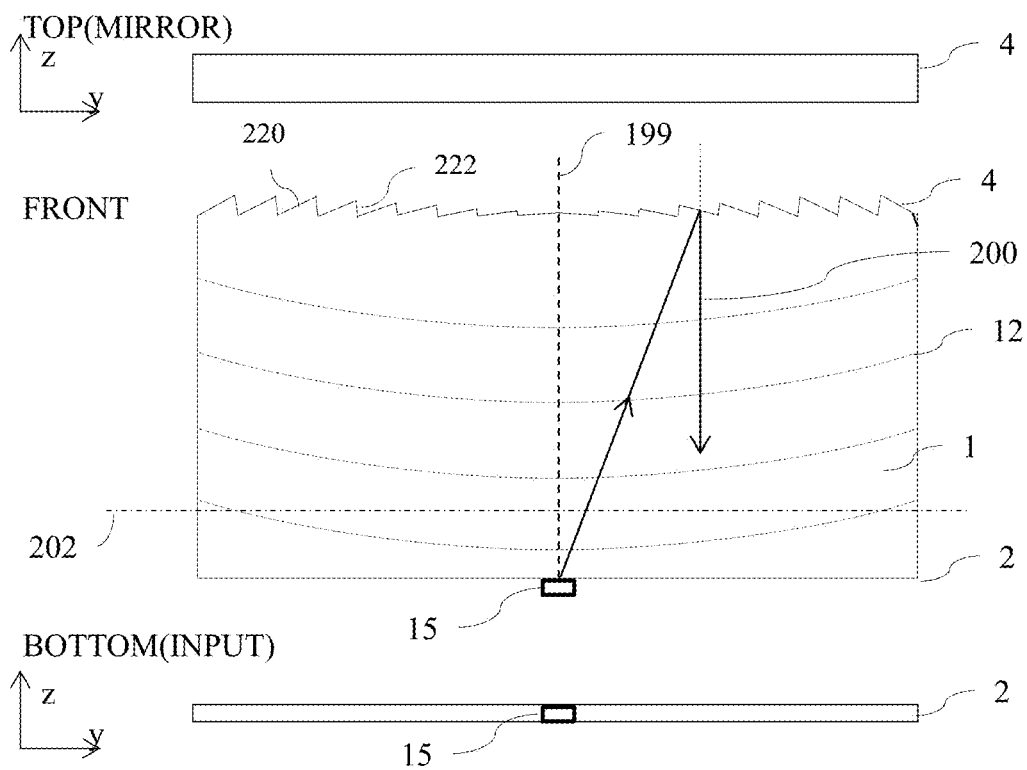
FIG. 15 is a schematic diagram illustrating in top, front and bottom views a stepped imaging waveguide comprising a Fresnel reflector end and rectangular mirror and input ends, in accordance with the present disclosure.

FIG. 15 is a schematic diagram illustrating in top, front and bottom views a stepped imaging waveguide 1 comprising a Fresnel reflector end 4 and rectangular mirror end 4 and input end 2. Fresnel reflector has an optical axis 199. Fresnel reflector may comprise facets 220 arranged to achieve a collimating function to light rays 200 and drafts 222. After reflection from curved facets 12, optical windows 26 are provided as described elsewhere herein.

Thus a directional waveguide 1 comprising: an input end 2; first and second opposed, laterally extending guide surfaces 6, 8 for guiding light along the waveguide 1; and a reflective end 4 facing the input end 2 for reflecting the input light back along the waveguide 1, the second guide surface 8 being arranged to deflect the reflected input light through the first guide surface 6 as output light, and the waveguide 1 being arranged to direct the output light into optical windows 26 in output directions that are distributed in a lateral direction (y-axis) in dependence on the input position of the input light.

Figure 16:
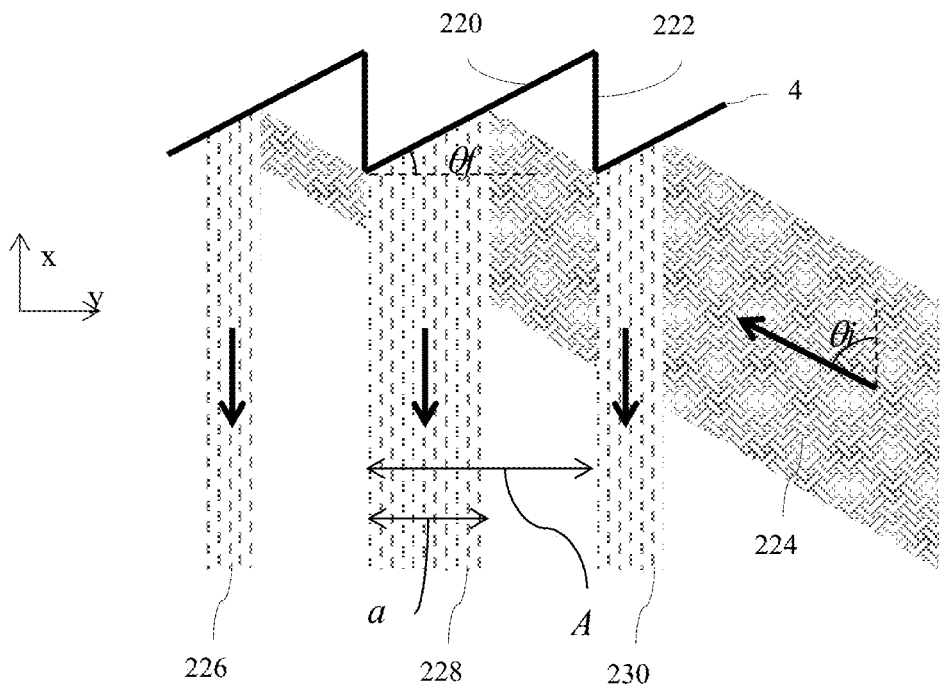
FIG. 16 is a schematic diagram illustrating in front view reflection efficiency at the facets of a Fresnel reflector, in accordance with the present disclosure.

FIG. 16 is a schematic diagram illustrating in front view light loss at the facets of a Fresnel reflector end 4. The reflective end 4 is thus a Fresnel reflector comprising alternating reflective facets 220 and draft facets 222, the reflective facets providing the Fresnel reflector with positive optical power. Thus substantially collimated light rays 200 may be provided for source 15 by the Fresnel reflector. Off-axis light beam 224 is incident on the facets 220 that are shadowed by drafts 222. Thus across pitch A of the facets 220, reflected beam 228 of width a is provided. The reflection efficiency may then be given by the ratio a/A:

$$\frac{a}{A} = \frac{\cos(\theta i)}{\cos(\theta i - 2 \cdot \theta f)} \quad \text{eqn. 1}$$

where $\theta_i$ is the incident angle and $\theta_f$ is the facet 220 angle. Thus for a central light source 15 the efficiency reduces with lateral position 206.

Figure 17A:
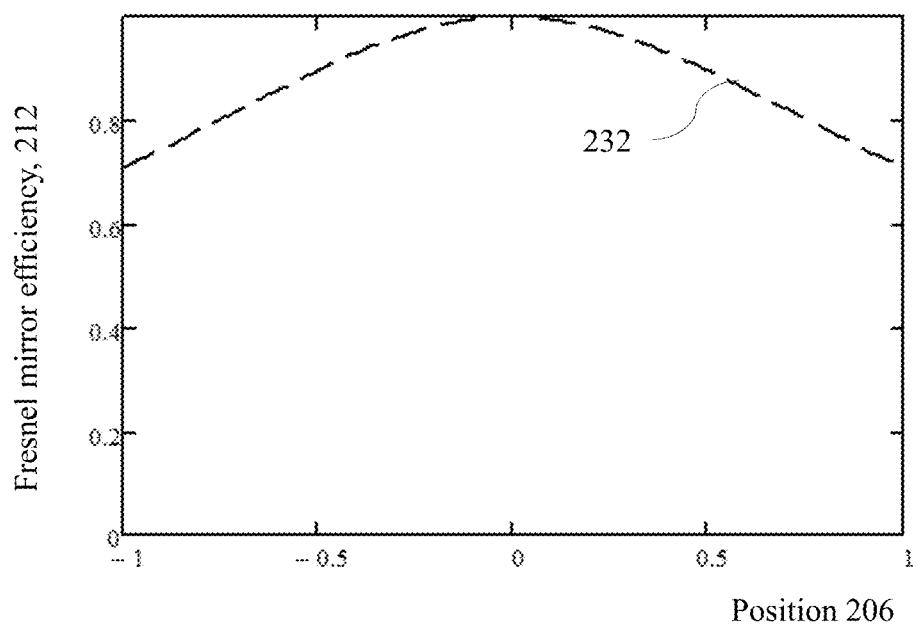
FIG. 17A is a graph illustrating variation of Fresnel reflector reflection efficiency with lateral position for the waveguide arrangement of FIG. 15 comprising a substantially rectangular input aperture shape, in accordance with the present disclosure.
Figure 17B:
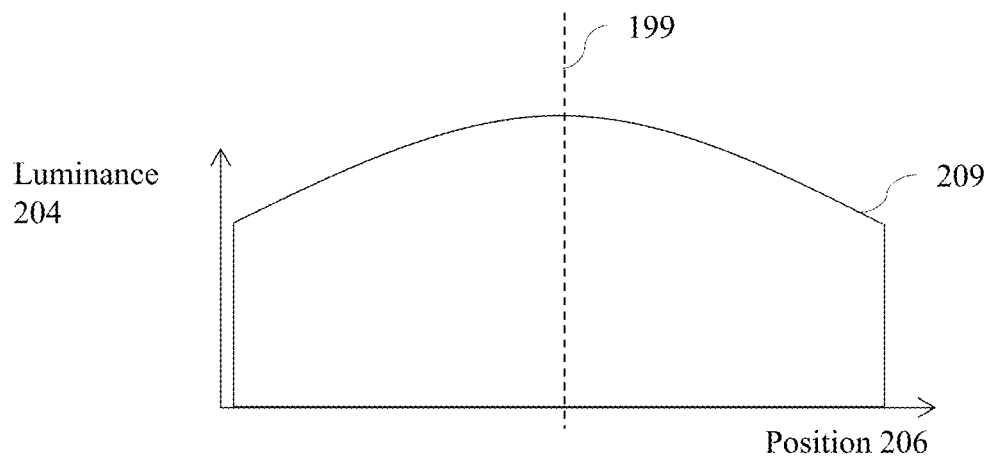
FIG. 17B is a graph illustrating variation of luminance with lateral position for the waveguide arrangements of FIG. 15, in accordance with the present disclosure.

FIG. 17A is a graph illustrating profile 232 of Fresnel reflector reflection efficiency 212 with lateral position 206 for the Fresnel reflector waveguide arrangement of FIG. 15 comprising a substantially rectangular input aperture shape. FIG. 17B is a graph illustrating the corresponding variation of luminance 204 with lateral position for the waveguide 1 arrangement of FIG. 15. Thus the shading of the facets 220 by the drafts 222 of the Fresnel reflector provides a lateral roll off in luminance 204 with position 206 across line 202 for a central light source 15.

It would be desirable to achieve high lateral uniformity with the small bezel size achieved by a Fresnel reflector.

Figure 18A:
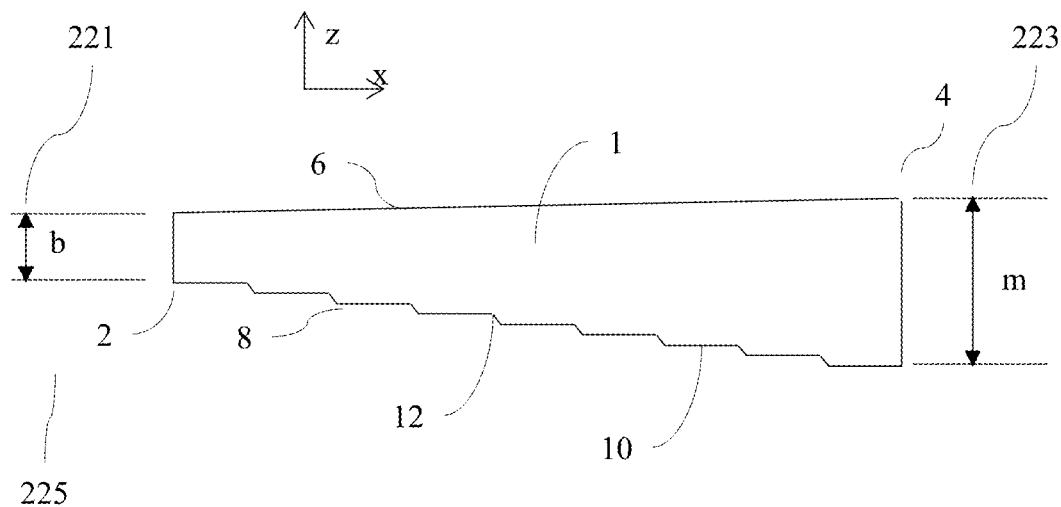
FIG. 18A and FIG. 18B are schematic diagrams illustrating stepped imaging waveguides with different efficiencies, in accordance with the present disclosure.
Figure 18B:
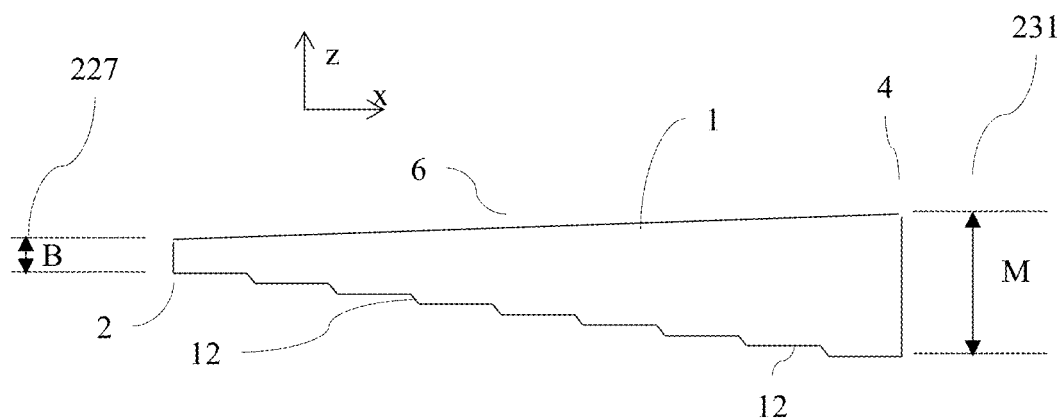

FIGS. 18A-18B are schematic diagrams illustrating stepped imaging waveguides with different efficiencies, being cross sections in the x-direction. FIG. 18A illustrates a first cross section with input side 2 height 221, b and Fresnel reflector end 4 height 223, m and FIG. 18B illustrates a second cross section with input end 2 height 227, B and mirror end 4 height 231, M. Thus sides 6 are not generally parallel to elements 10 of the stepped side 8. The relative geometric efficiency of the waveguide 1 of the two cross sections is approximately given by:

Relative Geometric Efficiency=(1−b/m)/(1−B/M)     eqn.2

Height difference may arise from regions 10 that are not typically not parallel to side 6. Further height difference 225 is provided by steps 12 of the stepped waveguide. Desirably the step height may be at least 0.5 micrometers, preferably at least 1.0 micrometers and more preferably at least 1.5 micrometers to minimize facet rounding during tooling and molding of the waveguide 1. To minimize Moiré visibility the pitch of the facets 12 may be desirably less than 500 micrometers, more preferably less than 350 micrometers and most preferably less than 200 micrometers. Thus the range of height difference 225 may be determined by fabrication and image appearance characteristics of the light guide.

It would be desirable to control the lateral geometric efficiency to compensate for the Fresnel reflector efficiency roll-off shown in FIG. 17A.

Figure 19:
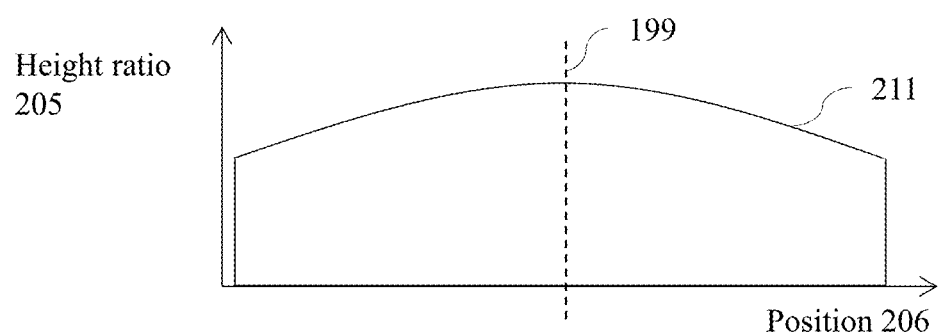
FIG. 19 is a schematic diagram illustrating a graph in which the ratio between (a) height of the input end between the first and second guide surfaces and (b) the height of the reflective end between the first and second guide surfaces has a profile across the lateral direction that is greatest at the optical axis of the Fresnel reflector and reduces towards each side of the optical axis, in accordance with the present disclosure.

FIG. 19 is a schematic diagram illustrating a graph in which the ratio 205 between (a) height of the input end 2 between the first and second guide surfaces 6, 8 and (b) the height of the reflective end 4 between the first and second guide surfaces 6, 8 has a profile 211 across the lateral direction that is greatest at the optical axis 199 of the Fresnel reflector and reduces towards each side of the optical axis 199.

Figure 20:
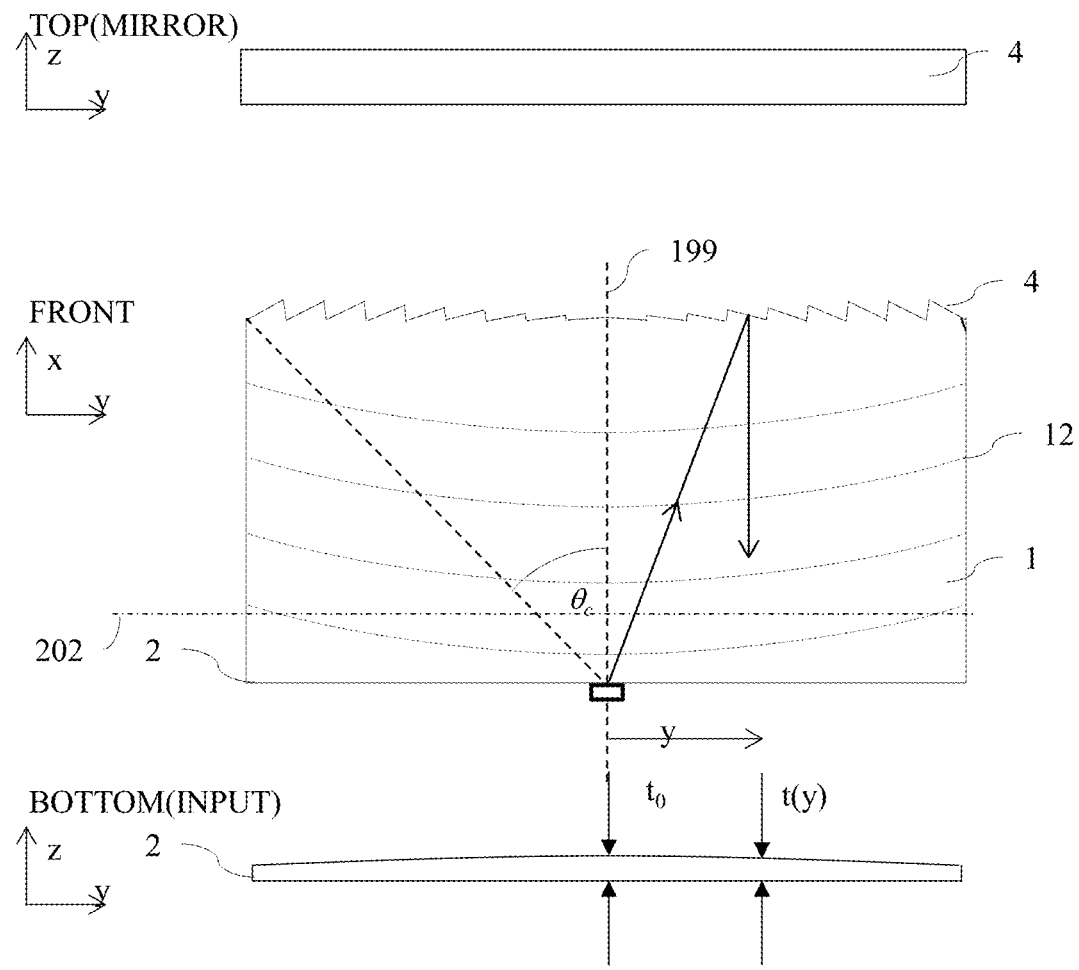
FIG. 20 is a schematic diagram illustrating in top, front and bottom views a stepped imaging waveguide comprising a rectilinear Fresnel reflector end and variable height input end, in accordance with the present disclosure.

FIG. 20 is a schematic diagram illustrating in top, front and bottom views a stepped imaging waveguide comprising a rectilinear Fresnel reflector end and variable height input end. In an illustrative embodiment, a waveguide of height 180 mm in the x direction and width in the 7 direction of 300 mm may comprise a mirror end of uniform height 223 of 1.5 mm. An input aperture may have a thickness variation with lateral position t(y) given by:

$$t(y) = t_0 - \delta * y^2 \quad \text{eqn.3}$$

where $t_0$ is the thickness of the input aperture aligned with the optical axis 199 which may be for example 0.7 mm and δ is the variation parameter which may be for example 0.000008 mm$^{-1}$. The height of the input end 2 between the first and second guide surfaces 6,8 thus has a profile that is highest at the optical axis 199 of the Fresnel reflector and reduces towards each side of the optical axis 199.

Figure 21:
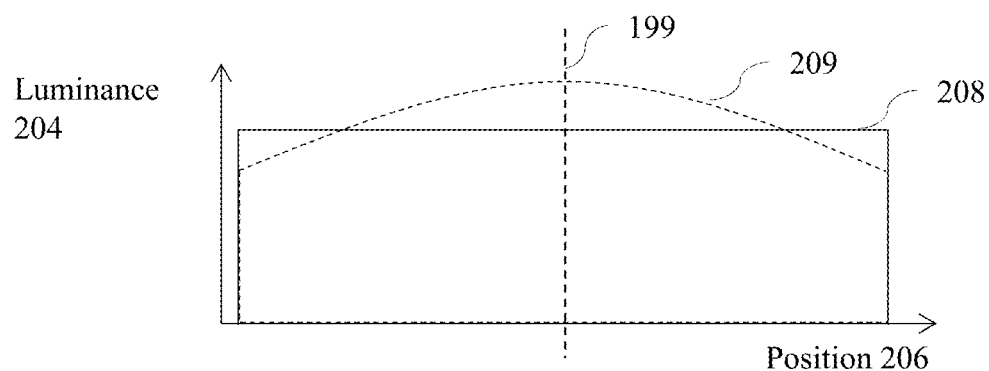
FIG. 21 is a graph illustrating variation of luminance with lateral position for the waveguide arrangements of FIG. 20, in accordance with the present disclosure.

FIG. 21 is a graph illustrating variation of uniformity with lateral position for the waveguide arrangements of FIG. 20. Said profile t(y) of the height of the input end 2 thus compensates for reduction with lateral position 206 in the efficiency 212 of reflection of light by the Fresnel reflector. By means of comparison profile 209 is also shown, the peak luminance being dependent on the relative central efficiencies of the two arrangements of FIGS. 15 and 20 respectively.

Advantageously the output from waveguide 1 may be provided with a substantially uniform profile 208 while maintaining the small footprint of the Fresnel reflector end 4.

Figure 22:
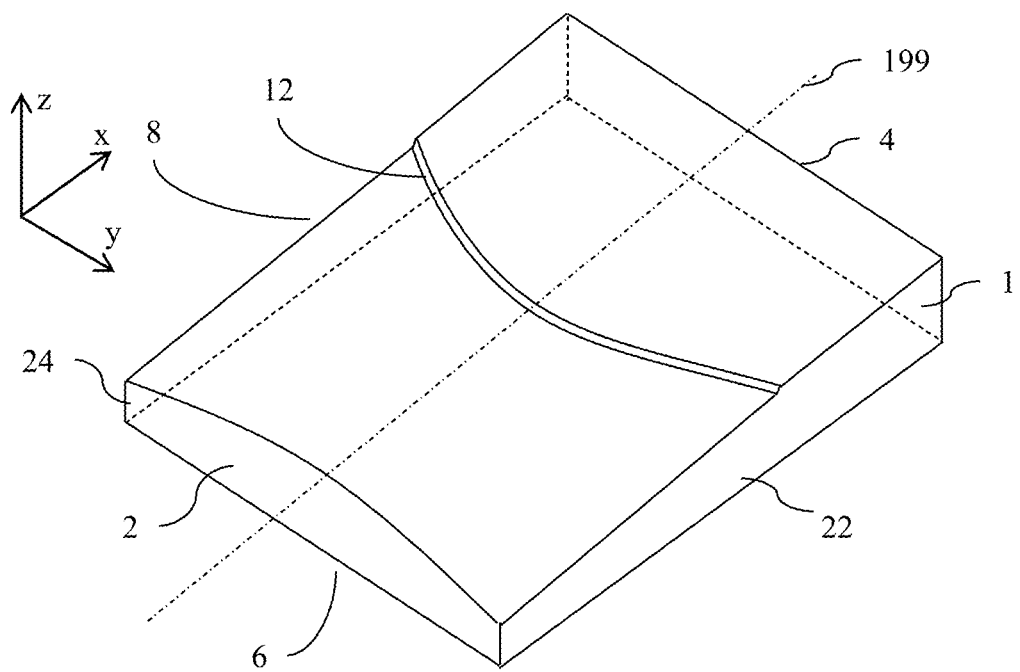
FIG. 22, FIG. 23, FIG. 24, FIG. 25, FIG. 26, FIG. 27, FIG. 28, FIG. 29, FIG. 30, and FIG. 31 are schematic diagrams illustrating stepped imaging waveguides with different combinations of input and mirror aperture shapes, in accordance with the present disclosure.
Figure 23:
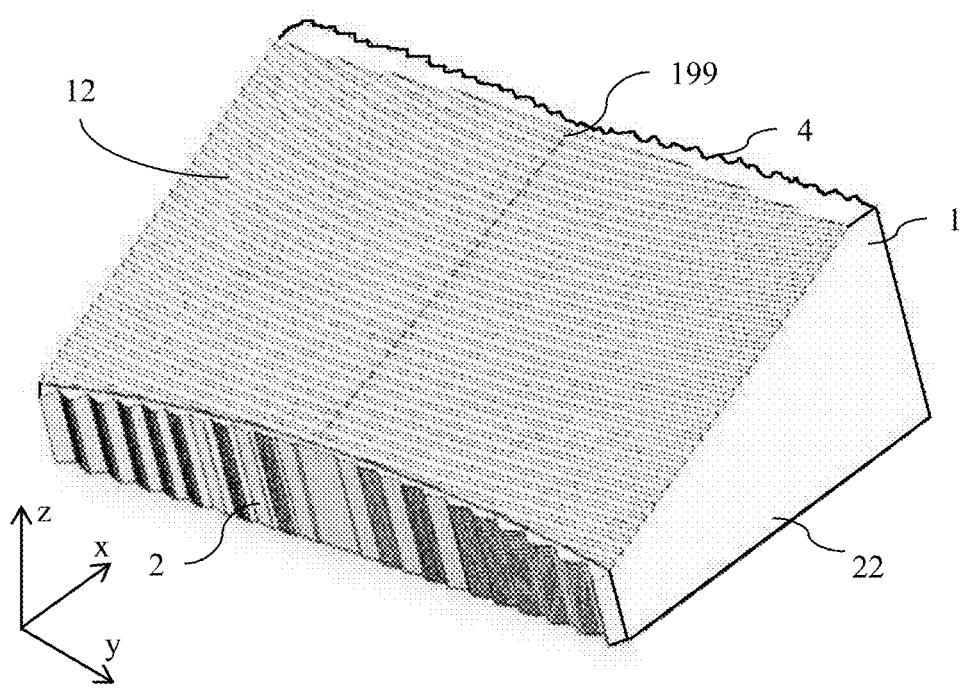
Figure 24:
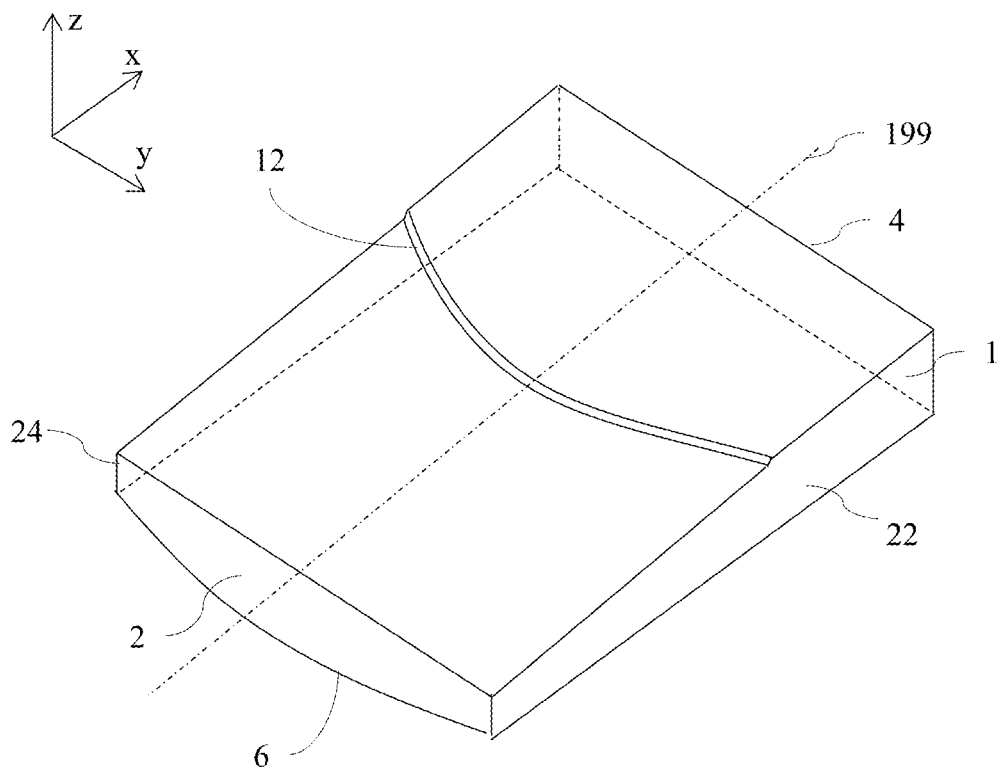
Figure 25:
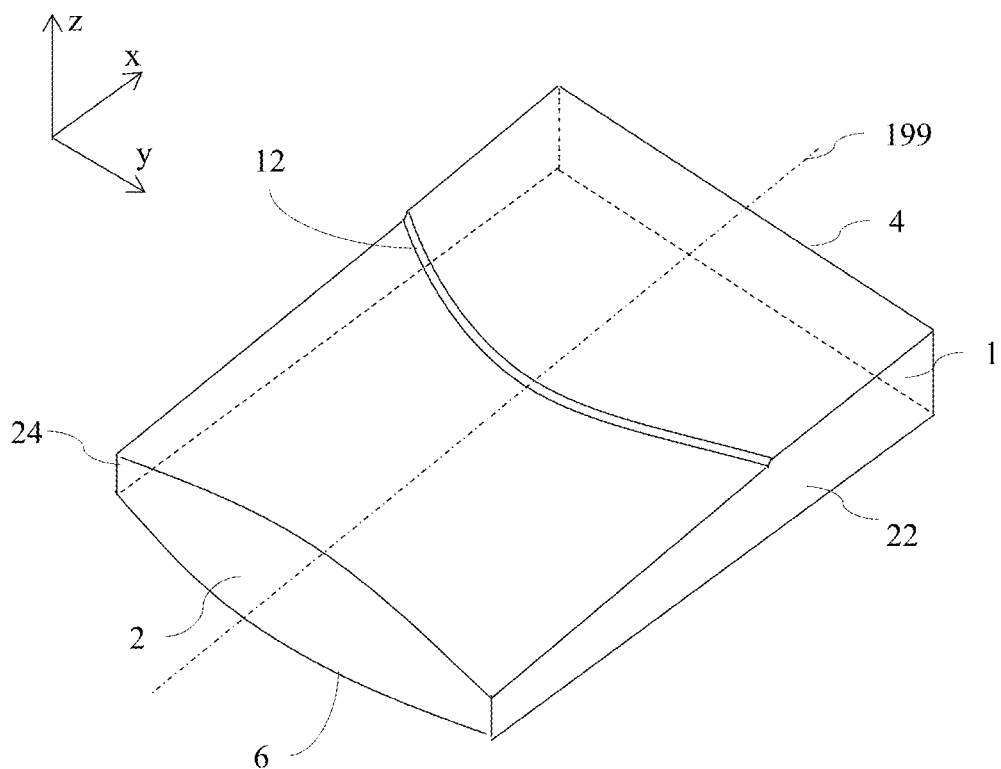

FIGS. 22-25 are schematic diagrams illustrating stepped imaging waveguides with varying input aperture height with lateral position. In FIG. 24 the edge of the input end 2 at the first guide surface 6 is curved, for example convex (concave in the air around the guide) and the edge of the input end at the second guide surface 8 is straight to provide said profile t(y). In FIGS. 22-23 the edge of the input end 2 at the first guide surface 6 is straight and the edge of the input end 2 at the second guide surface 8 is curved to provide said profile t(y). In FIG. 25 the edges of the input end 2 at the first guide surface 6 and at the second guide surface 8 are each curved to provide said profile t(y).

In the above embodiments, the height of the reflective end 4 between the first and second guide surfaces 6, 8 has a profile across the lateral direction that may be flat.

The first guide surface 6 is arranged to guide light by total internal reflection and the second guide surface 8 comprises a plurality of light extraction features 12 oriented to direct light guided along the waveguide 1 in directions allowing exit through the first guide surface 6 as the output light and intermediate regions 10 between the light extraction features 12 that are arranged to guide light along the waveguide 1. The second guide surface 8 has a stepped shape in which said light extraction features are facets 12 between the intermediate regions 10.

The light extraction features 12 may have positive optical power in the lateral direction (y-axis).

A directional waveguide 1 may be arranged wherein the height of the input end 2 between the first and second guide surfaces 6, 8 has a profile 205 across the lateral direction that is flat. The height of the reflective end 2 between the first and second guide surfaces 6,8 may have a profile 205 across the lateral direction that is lowest at the optical axis 199 of the Fresnel reflector and increases towards each side of the optical axis 199.

A directional backlight may comprise: a directional waveguide 1 arranged to achieve small footprint and high lateral uniformity for central light sources of array 15, as described herein; and an array 15 of input light sources 15*a-n* arranged at different input positions in a lateral direction across the input end 2 of the waveguide 1 and arranged to input input light into the waveguide 1. As shown in FIG. 10, a directional display device comprising: a directional backlight; and a transmissive spatial light modulator arranged to receive the output light from the waveguide and to modulate it to display an image. As shown in FIG. 11, a directional display apparatus comprising: a directional display device; and a control system arranged to control the light sources.

It may further be desirable in manufacture to adjust the shape of the reflective end to increase yield and/or device uniformity.

Figure 26:
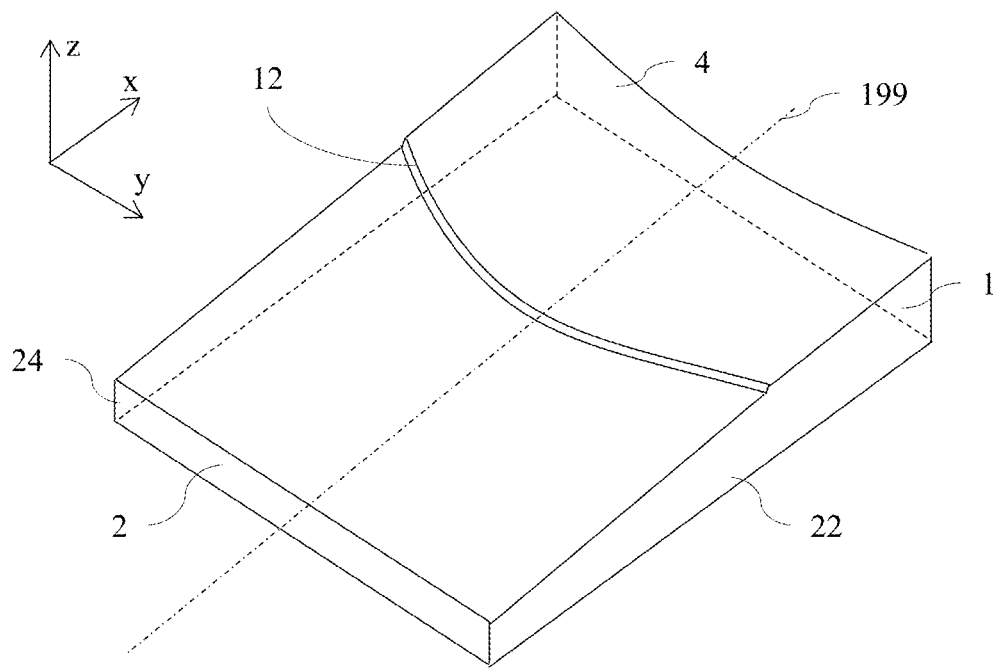
Figure 27:
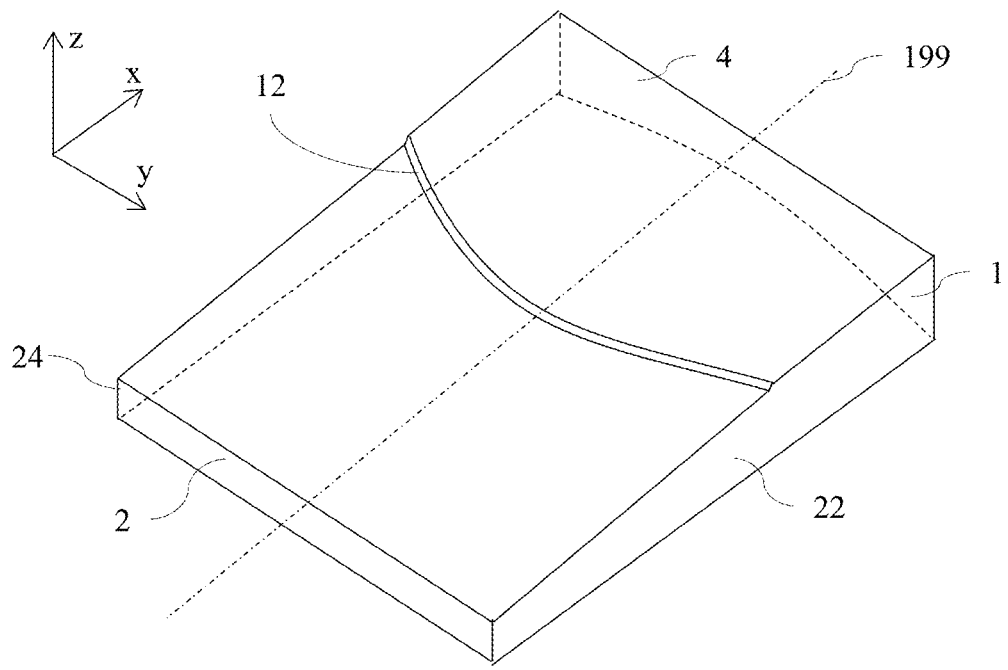
Figure 28:
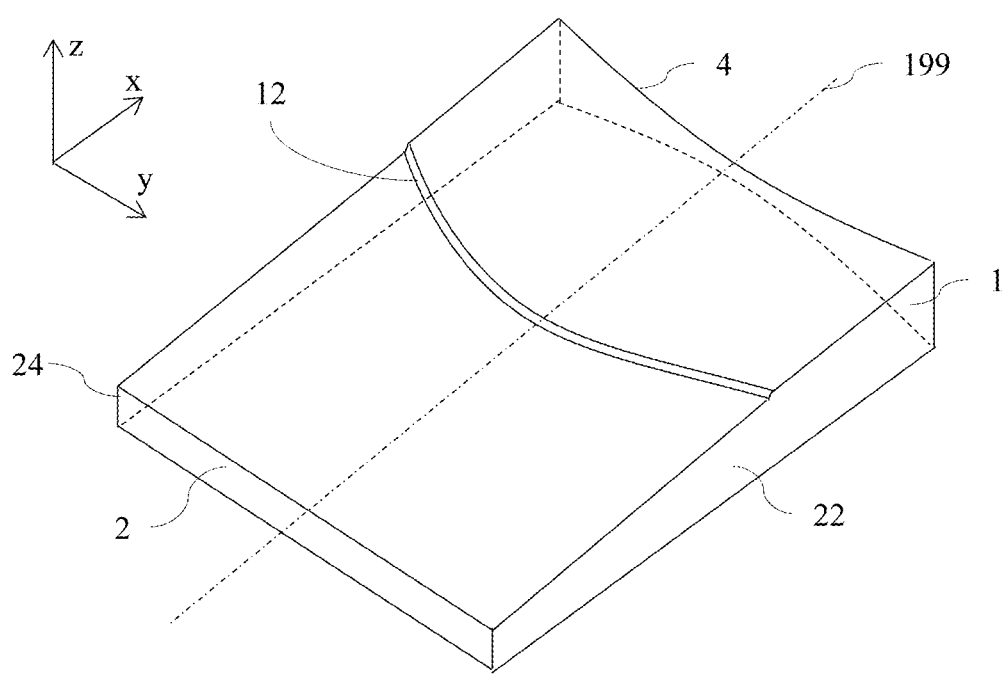

FIGS. 26-31 are schematic diagrams illustrating stepped imaging waveguides with different combinations of input and Fresnel reflector aperture shapes. From equation 2 it can be seen that relative efficiency also increases if the Fresnel reflector height is lower in the center of the end 4. Thus the height of the reflective end 4 between the first and second guide surfaces 6, 8 may have a profile that is lowest at the optical axis 199 of the Fresnel reflector and increases towards each side of the optical axis. Said profile of the height of the reflective end 4 compensates for reduction with lateral position 206 in the efficiency 212 of reflection of light by the Fresnel reflector. In FIG. 26 the edge of the reflective end at the first guide surface is straight and the edge of the input end at the second guide surface 8 is convex to provide said profile. In FIG. 27, the edge of the reflective end 4 at the first guide surface 6 is convex and the edge of the reflective end at the second guide surface 8 is straight to provide said profile. In FIG. 28 the edges of the reflective end 4 at the first guide surface 6 and at the second guide surface 8 are each convex to provide said profile. In FIGS. 26-28 the height of the input end 2 between the first and second guide surfaces has a profile across the lateral direction that is flat. Advantageously the height variation for a single surface may be reduced, increasing manufacturing yield.

Figure 29:
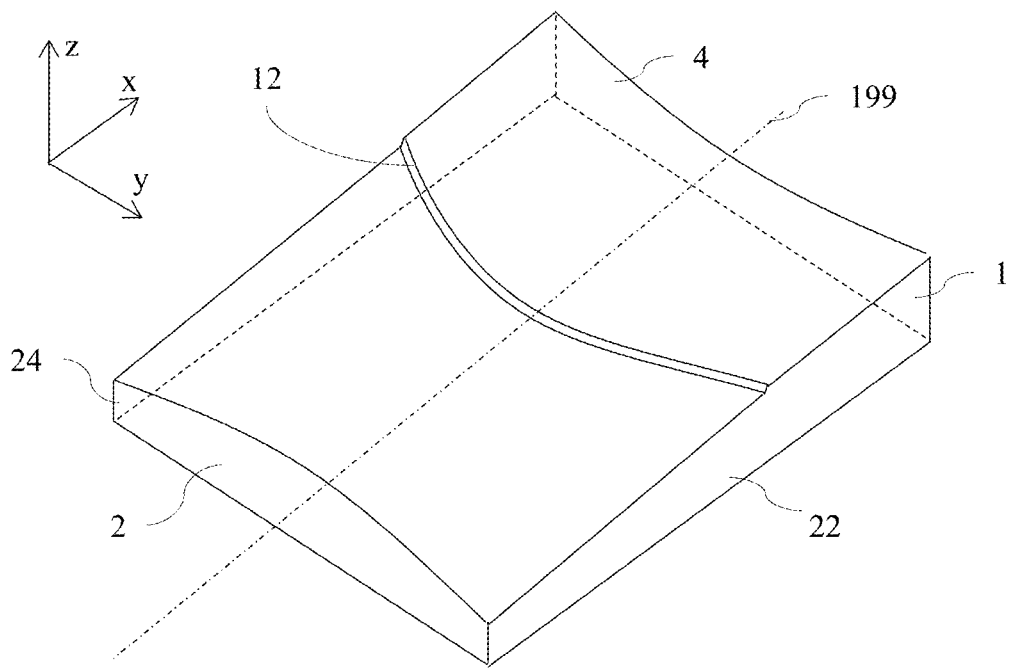
Figure 30:
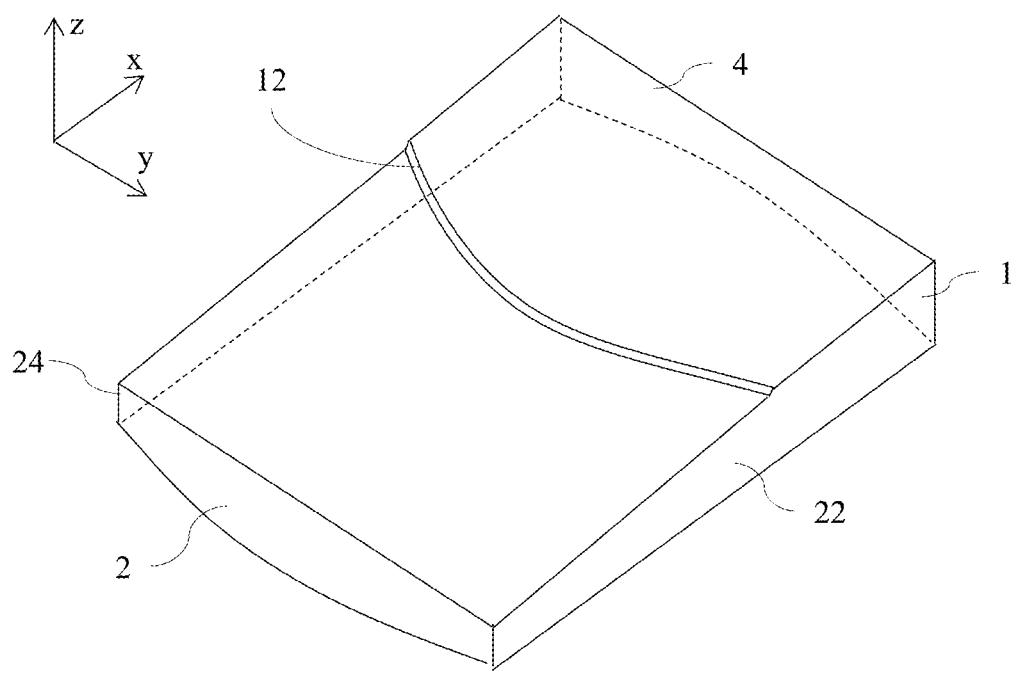
Figure 31:
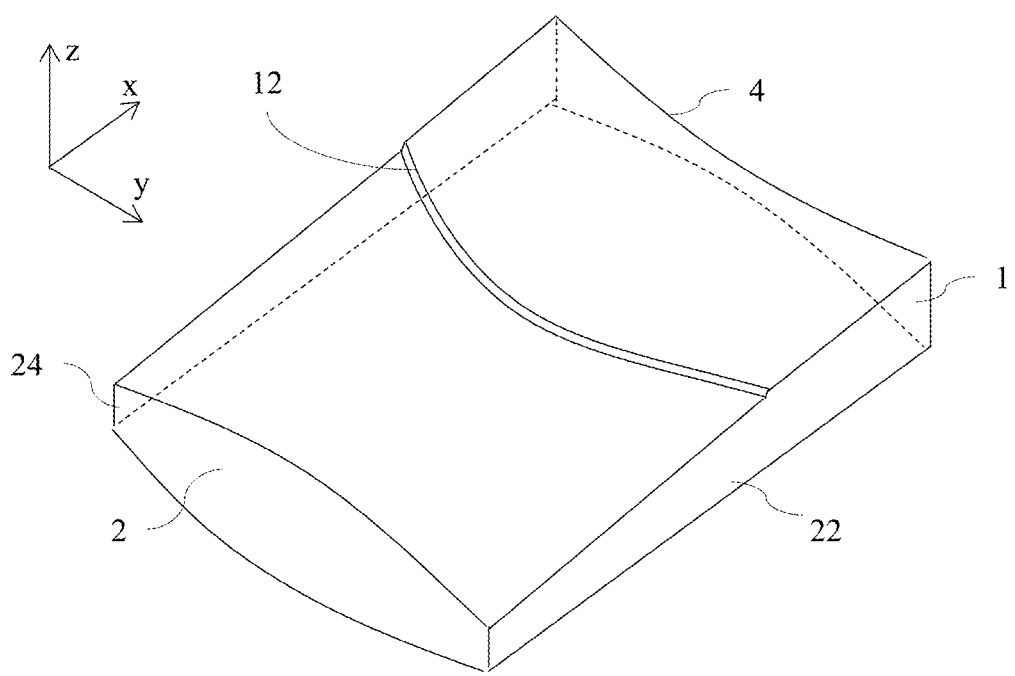

As shown in FIGS. 29-31, the height of the input end 2 between the first and second guide surfaces 6, 8 has a profile across the lateral direction that is flat or curved and the reflective end 4 between the first and second guide surfaces has a profile across the lateral direction that is flat or convex. In combination the profiles may compensate for reduction with lateral position in the efficiency of reflection of light by the Fresnel reflector. Thus in comparison to FIG. 20, more generally, said ratio 205 compensates for reduction with lateral position 206 in the efficiency of reflection of light by the Fresnel reflector. Advantageously tooling efficiency, manufacturing yield and device molding uniformity may be improved.

Figure 32:
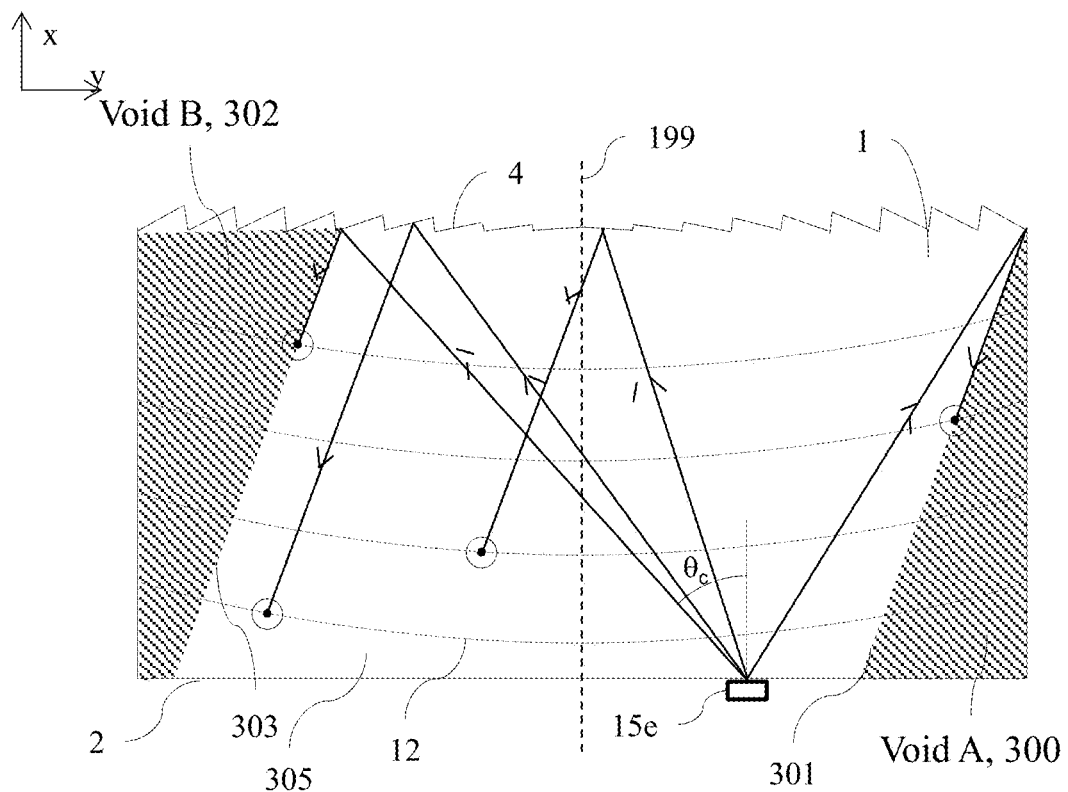
FIG. 32 is a schematic diagram illustrating in front view the origin of illumination void non-uniformities in a directional waveguide, in accordance with the present disclosure.

FIG. 32 is a schematic diagram illustrating in front view the origin of illumination void non-uniformities in a directional waveguide. As illustrated above for on-axis light sources of array 15, those close to the optical axis 199 of the Fresnel reflector, then uniformity can be controlled by means of compensation of Fresnel mirror efficiency roll-off. For off-axis sources, then additional void regions are provided. Void A, 300 is provided by light that is outside a cone angle subtended by the light source and adjacent edge of the Fresnel reflector. Boundary 301 separates void A from the main illumination region. Void B, 302 is provided by light rays that are outside the critical angle θc of the light entering the waveguide for a light source in air. Boundary 303 separates void B from the main illumination region. Both voids create undesirable non-uniformities for off-axis viewing positions.

Figure 33:
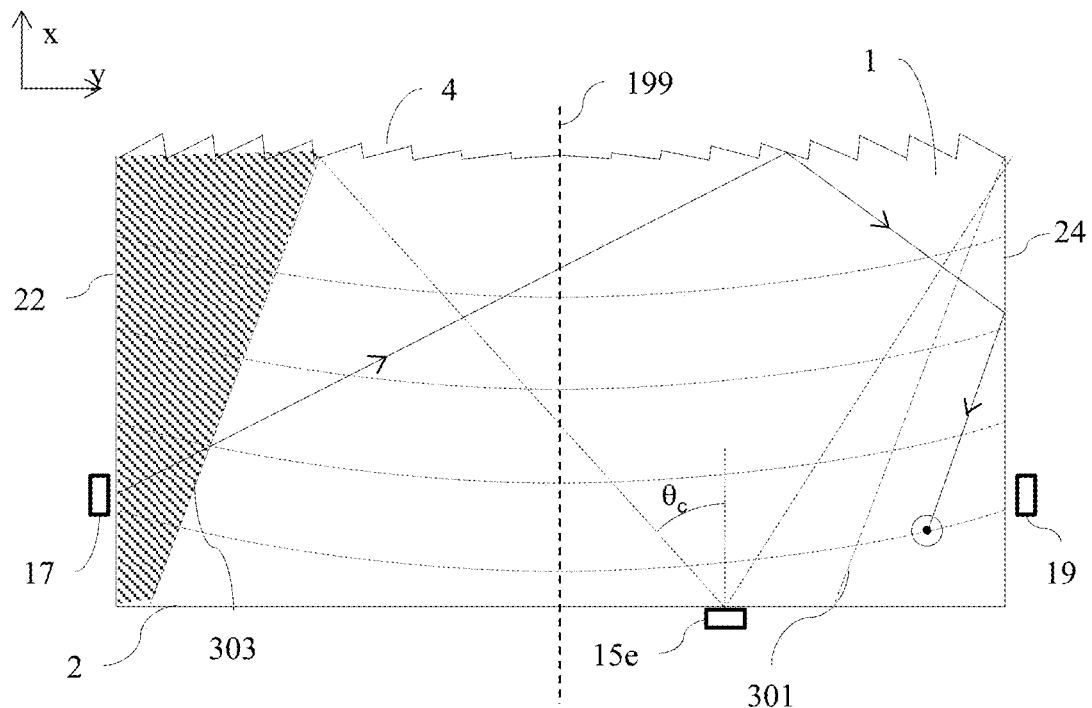
FIG. 33 is a schematic diagram illustrating in front view correction of illumination void non-uniformities in a directional waveguide, in accordance with the present disclosure.

FIGS. 35A-35B are schematic diagrams illustrating in front view correction of illumination void non-uniformities in a directional waveguide. As will be described, in FIG. 33, void A that is provided for example by input light source 15*e* on the right side of the optical axis 199 can be compensated by light source array 17 arranged on the left side 22 of the waveguide 1. Void B can be compensated by modification of the structure of the input end. Thus a directional backlight may comprise a waveguide 1 comprising an input end 2; an array 15 of input light sources arranged at different input positions in a lateral direction across the input end 2 of the waveguide 1 and arranged to input input light into the waveguide 1, the waveguide 1 further comprising first and second opposed, laterally extending guide surfaces 6,8 for guiding light along the waveguide 1, side surfaces 22, 24 extending between the first and second guide surfaces 6,8, and a reflective end 4 having positive optical power facing the input end 2 for reflecting the input light back along the waveguide 1, the second guide surface 8 being arranged to deflect the reflected input light through the first guide surface 6 as output light, and the waveguide 1 being arranged to direct the output light into optical windows 26*a-n* in output directions that are distributed in a lateral direction in dependence on the input position of the input light; and additional light sources 17*a-n* arranged to direct additional light into the waveguide 1 in a direction in which the additional light is reflected by the reflective end 4 onto the opposite side surface 24 and by the opposite side surface 24 into a segment of the waveguide 1 adjacent the opposite side surface 24 extending from a corner between the reflective surface 4 and the side surface 24.

Similarly the additional light sources 19*a-n* may be arranged to direct additional light into the waveguide 1 through one of the side surfaces 24 in a direction in which the additional light is reflected by the reflective end 4 onto the opposite side surface 222 and by the opposite side surface 22 into a segment of the waveguide 1 adjacent the opposite side surface 22 extending from a corner between the reflective surface 4 and the side surface 22.

Region 305 between lines 301, 303 is illuminated by light source 15. Advantageously void A, 300 may be filled in a controllable manner by adjustment of the flux from the light sources 17, for a wide range of viewing positions. Further the angular illumination profile of the output windows may be controlled to provide a wide angle mode of similar or better performance compared to conventional waveguides 1.

Figure 34:
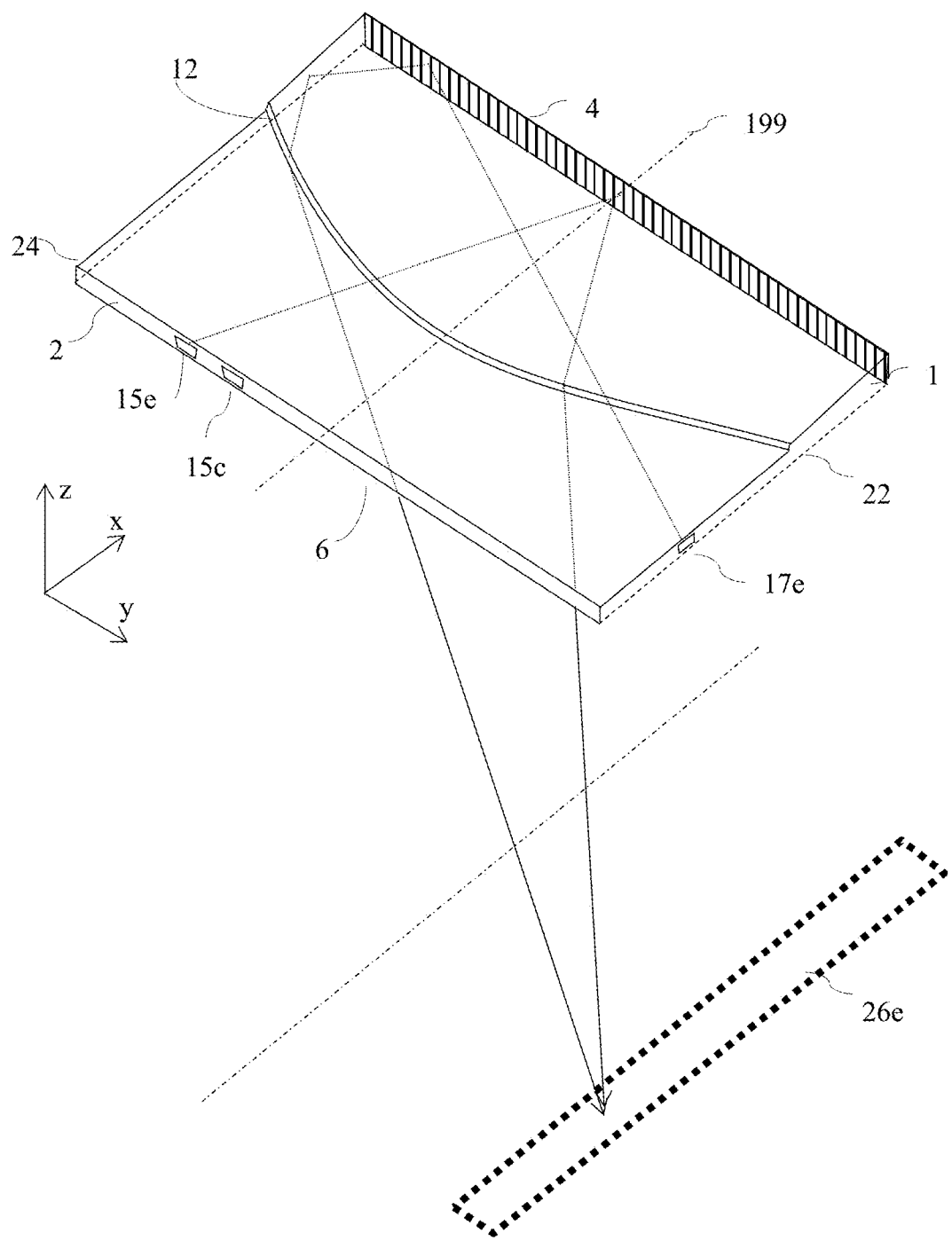
FIG. 34 is a schematic diagram illustrating in perspective view correction of illumination void non-uniformities in a directional waveguide, in accordance with the present disclosure.

As illustrated in FIG. 34 light source 15*e* may be arranged to provide optical window 26*e* from region 305 of the waveguide 1. Light source 15*e* may be arranged to the right of the optical axis 199 when viewed from the position of the optical window 26*e*. Further light source 17*e* may be arranged to substantially illuminate optical window 26*e* from void A regions 300 of the waveguide 1. Void correcting light source 17*e* is to the left of the optical axis 199 when viewed from the front. In practice, optical aberrations will create an overlap of optical windows 26*a-n* from sources 15*a-n* and sources 17*a-n*, 19*a-n* that is not identical but similar. Illumination of multiple sources provides a final uniform illuminated waveguide with desirable angular and spatial uniformity characteristics.

Figure 35:
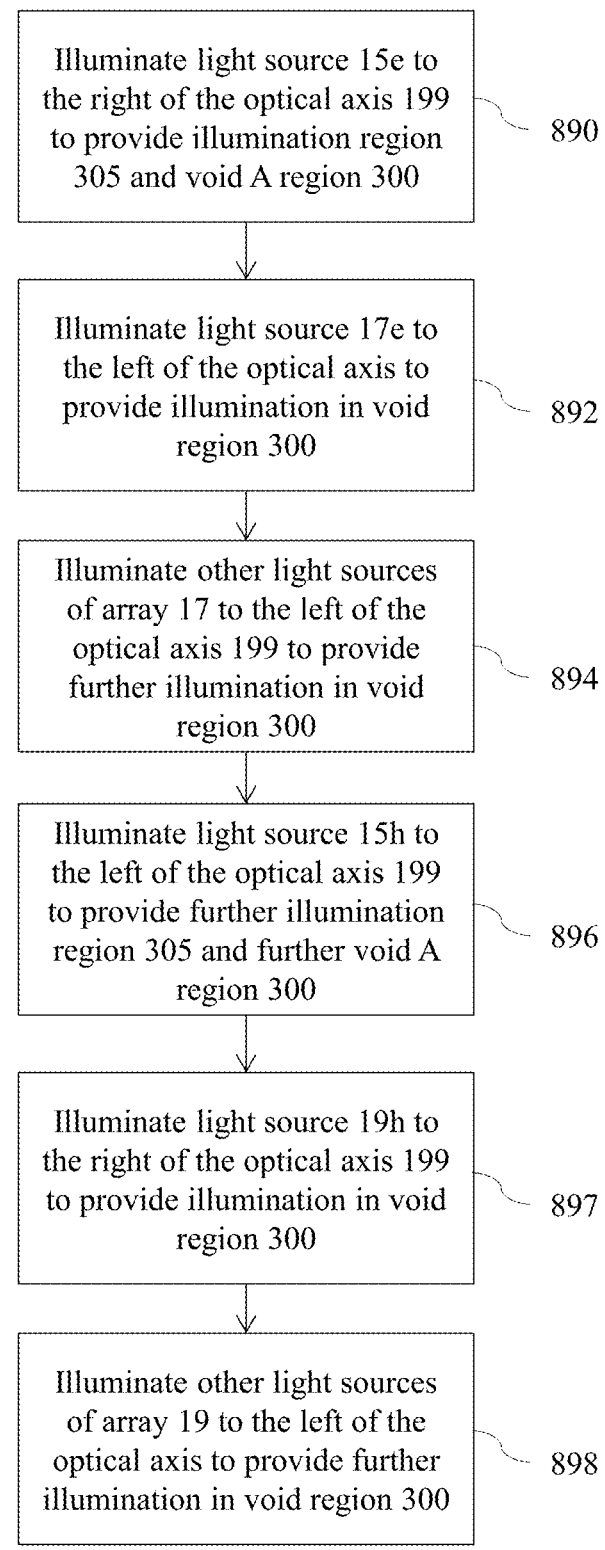
FIG. 35 is a schematic diagram illustrating a control method arranged to provide correction of void non-uniformities in a directional waveguide, in accordance with the present disclosure.

FIG. 35 is a schematic diagram illustrating a control method arranged to provide correction of void non-uniformities in a directional waveguide. The control system illustrated by steps 890, 892, 894, 896, 897, 898 is arranged to control input light sources 15*e* selected to direct output light into desired optical windows 26*a-n*, and is further arranged to control at least one additional light source 17*a-n*, 19*a-n* (or 815*a-n* as will be described with reference to FIG. 39A below) selected to provide additional light that is output from the directional backlight in substantially the same output directions as the desired optical windows 26*a-n*. Thus the control system is arranged, when a selected input light source is off-center of the array of input light surfaces, to control at least one additional light source that is on the opposite side of the directional backlight from the selected input light source. The control system may be used to determine look up tables for LED flux control in various modes of operation such as wide angle, privacy, 3D and power savings. Control system may further comprise LED array current control apparatus as described elsewhere herein, for example FIG. 45.

It would be desirable to reduce cost and complexity by minimizing the number of light sources 17, 19 on the sides 22, 24 of the waveguide 1.

Figure 36A:
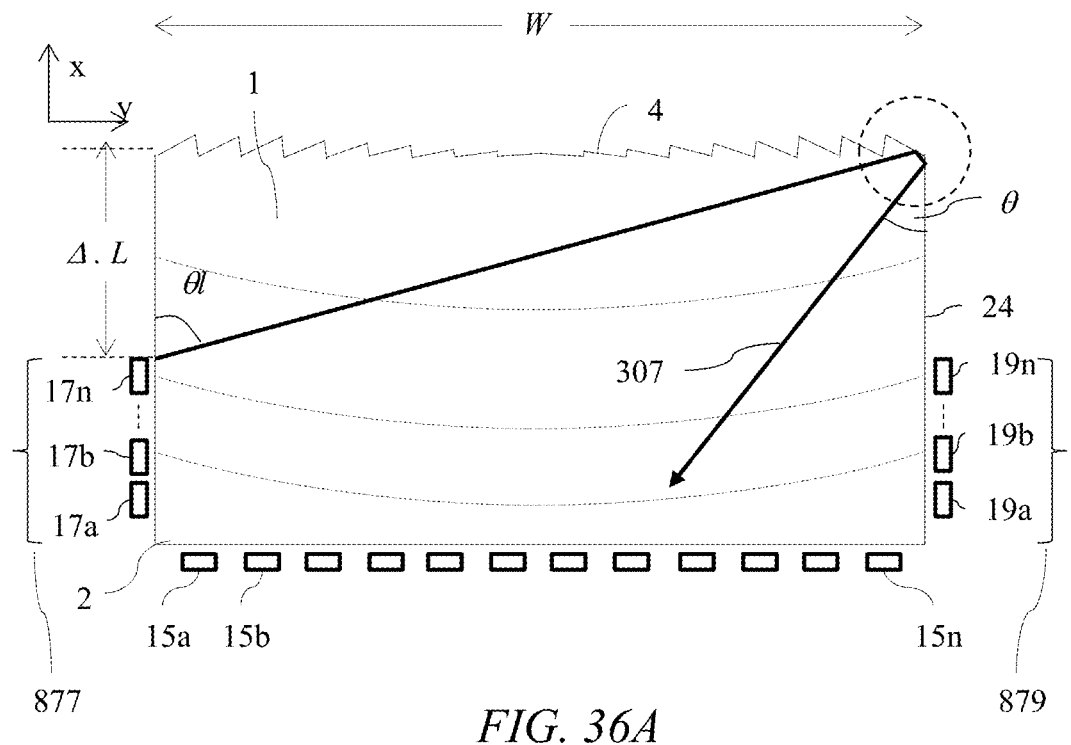
FIG. 36A and FIG. 36B are schematic diagrams illustrating in front view arrangements of LEDs arranged to achieve void A filling, in accordance with the present disclosure.
Figure 36B:
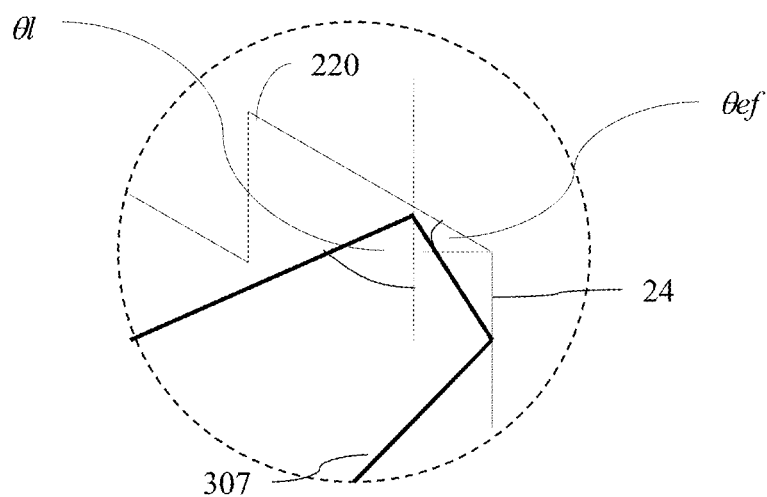

FIGS. 36A-36B are schematic diagrams illustrating in front view arrangements of LEDs arranged to achieve void A filling. FIG. 36B is a detail of the corner of FIG. 36A.

The additional light sources 17*a-n*, 19*a-n* may be disposed along at least a part 877, 879 of each side surface 22, 24 adjacent the input end 2, the additional light sources 17*a-n*, 19*a-n* being arranged to direct additional light into the waveguide 1 through one of the side surfaces 22, 24.

Typically it is desirable to provide void A, 300 filling for optical windows 26 that are up to approximately 45 degrees off-axis in a lateral direction. At much higher angles, general diffusion and stray light in the waveguide 1 and diffuser elements may be provided to achieve void A, 300 filling and window 26 provision. Such a window direction requires the uppermost light source 17*n* to create a ray 307 that has an angle θ to the side 24 that may be approximately 30 degrees inside the waveguide in the x-y plane. In an illustrative embodiment, a waveguide 1 with 16:9 aspect ratio may be provided with an edge facet 220 facet angle θef of approximately 20 degrees. The angle θl is given by:

$$\theta l = \theta + 2 \cdot \theta ef \qquad \text{eqn. 5}$$

To continue the illustrative embodiment θl may be 70 degrees. The relative size of the region of the side 22 that is free of light sources 17*a-n* may then be determined as $$\Delta = W/(L \cdot \tan(\theta l)) \qquad \text{eqn. 6}$$

Where W is the waveguide 1 width (in y direction) and L is its height (in x direction). Thus for the 16:9 arrangement of waveguide 1, Δ=65% and the light sources 17 are required for 35% of the height of the waveguide 1 from the input side. When θ=θc then the light exits the waveguide parallel to the surface 6. Thus the minimum Δ is approximately 25%.

Thus said part 877, 879 of each side surface along which the additional light sources are disposed is at least 20% of the side surface from the input end 2 and preferably at least 40% of the side surface. Said part 877, 879 of each side surface along which the additional light sources are disposed is at most 80% of the side surface from the input end 2 and preferably at most 60% of the side surface.

Advantageously void A may be filled and the number of light sources 17, 19 may be reduced, minimizing cost and optimizing uniformity. In operation, light sources 17, 19 are arranged to provide illumination for off-axis optical windows in wide angle operation. Advantageously, the flux provided by such LEDs may be minimized due to the relatively low illumination levels at high angles compared to the on-axis LEDs of array 15.

It would be desirable to provide filling of Void B, 332 to optimize uniformity in an efficient manner.

Figure 37A:
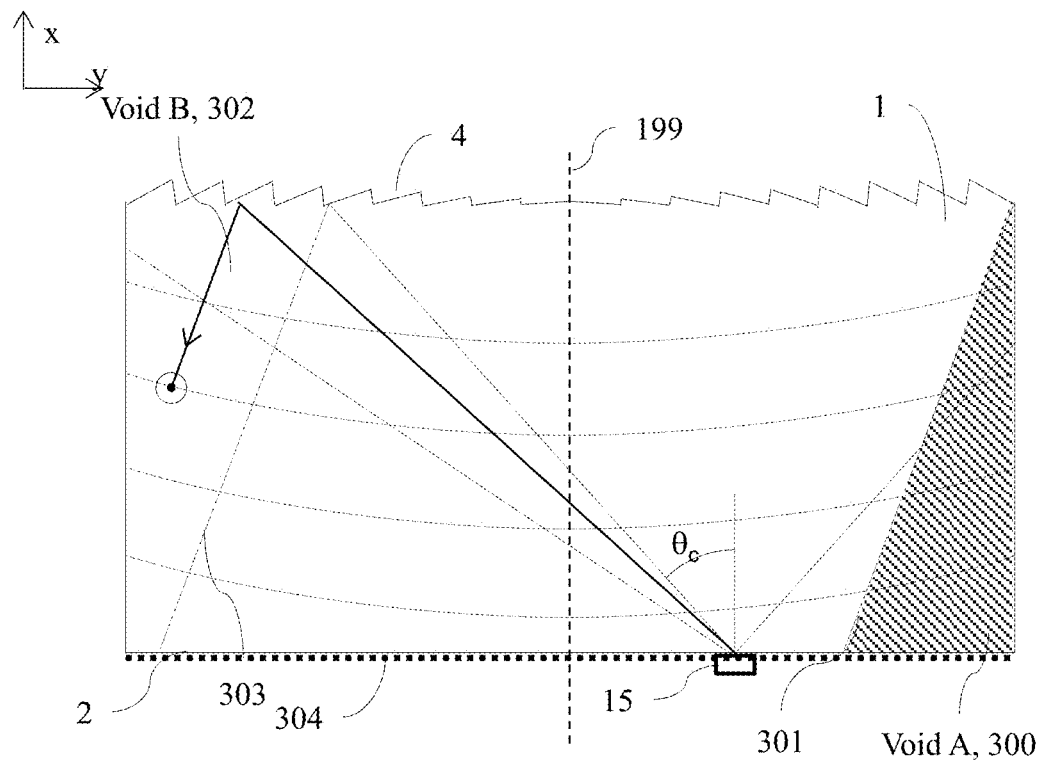
FIG. 37A, FIG. 37B, FIG. 37C, and FIG. 37D are schematic diagrams illustrating in front view illumination of an imaging waveguide using planar input surfaces, in accordance with the present disclosure.

FIGS. 37A-37D are schematic diagrams illustrating in front view illumination of an imaging waveguide using planar input surfaces. As shown in FIG. 37A, filling of void B, 302 may be achieved by injecting light into the waveguide 1 at angles that are greater than the critical angle θc for an input surface that is normal to the optical axis 199. Further the angular luminance profile of corresponding optical windows is desirably maintained.

Figure 37B:
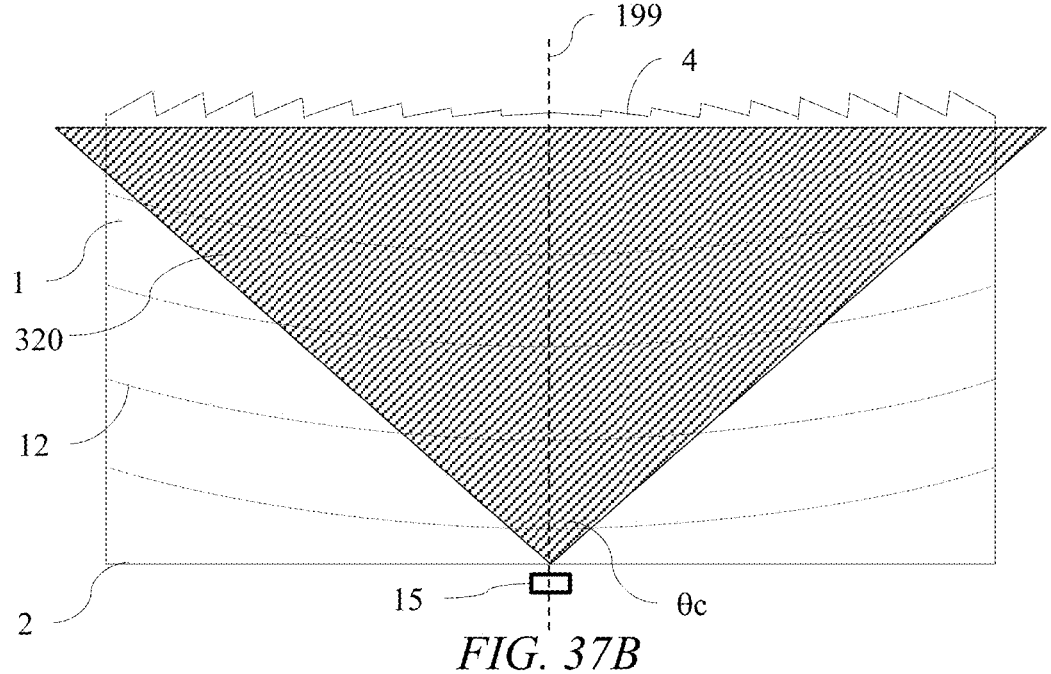

FIG. 37B illustrates the illumination of the reflective end 4 by a central light source 15 in air inputting light to a planar transmissive input surface at end 2. Thus cone 320 that may also be represented by polar illumination profile 324 is provided which may conveniently overfill a 16:9 aspect ratio display. However, as the source 15 is displaced laterally, the reflective end is under-filled on one side.

Figure 37C:
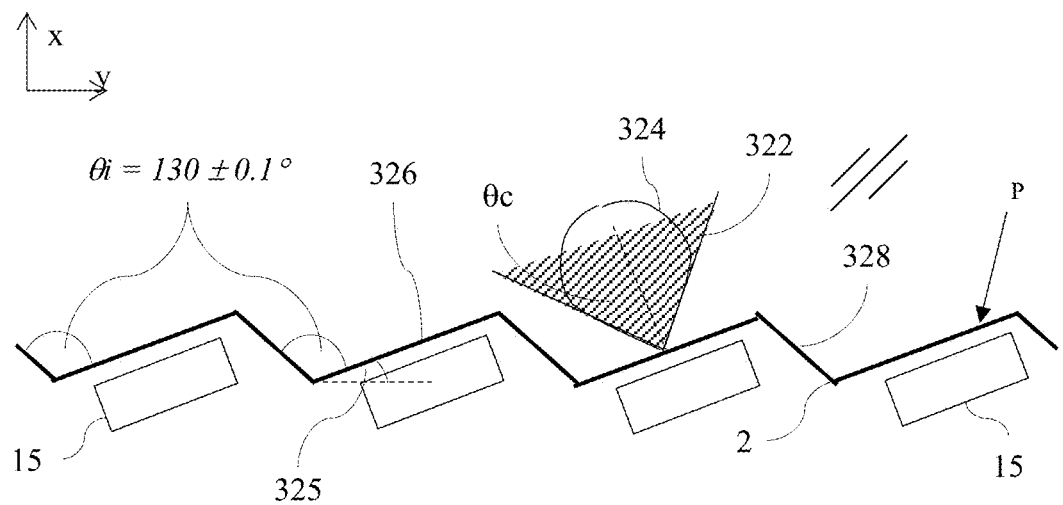
Figure 37D:
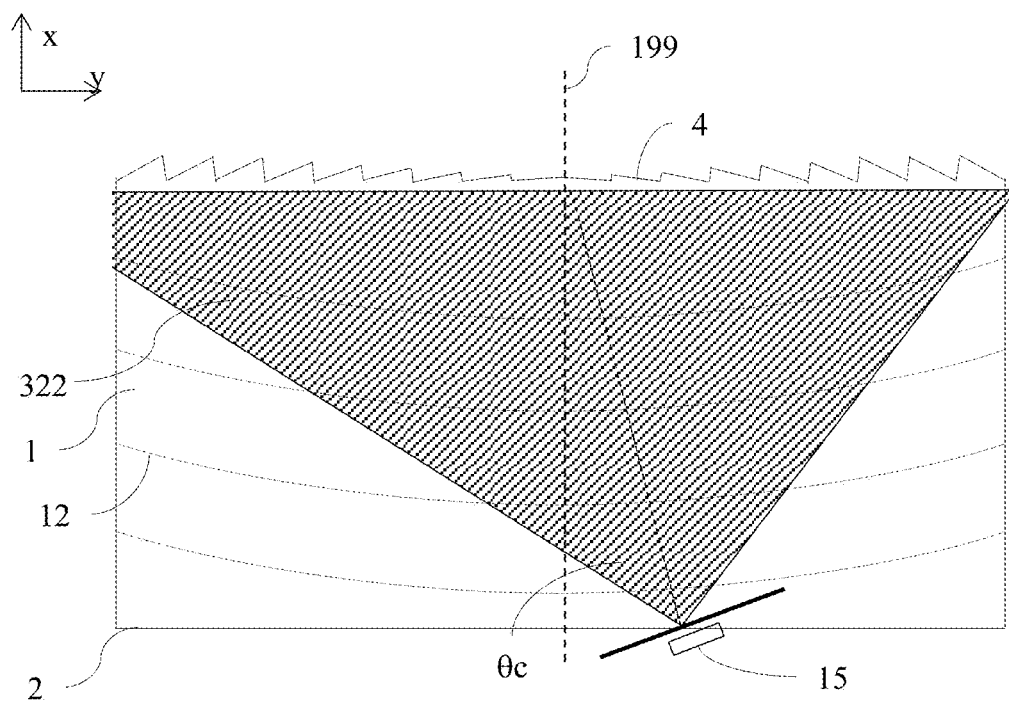

FIG. 37C illustrates an arrangement of input sources wherein primary input facets 326 and draft facets 328 are provided. Further, light sources 15 are rotated to be parallel to the facets 328. As illustrated in FIG. 37D, the resulting output in the waveguide 1 can be arranged to overfill the Fresnel reflector at end 4. The tilt angle 325 of facets 326 may be adjusted with respect to lateral position so as to maintain the pointing direction of the cone 322 to fill the Fresnel reflector.

The included angle θi between facets 326, 328 may be for example 130 degrees at positions across the width of the input side 2. Such an angle conveniently minimizes retroreflection of light into the waveguide, minimizing stray light artifacts in the uniformity of the output.

Advantageously, light can be provided to the opposite end of the Fresnel mirror with respect to the displacement of the light source, and Void B, 322 may be filled, increasing uniformity. It would be desirable to control the amount of light that is directed towards Void B, 322.

FIGS. 38-39 are schematic diagrams illustrating in front view arrangements of input side cross section comprising planar and structured surfaces arranged to achieve illumination void B filling for a wide angular range.

Figure 38A:
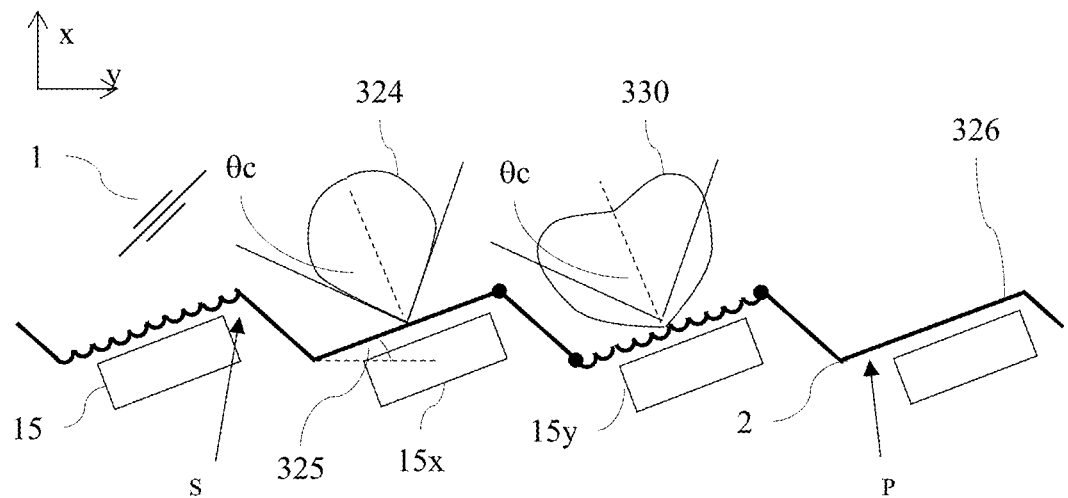
FIG. 38A and FIG. 38B are schematic diagrams illustrating in front view arrangements of input aperture cross section comprising planar and structured surfaces arranged to achieve void B filling for a wide angular range, in accordance with the present disclosure.

FIG. 38A illustrates that the input facets 326 may be provided with either planar (P) with polar profiles limited by the critical angle or structured (S) surfaces with polar profiles that may be greater than the critical angle. The P and S surfaces may be aligned with respective addressable light sources 15x and 15y. The angular profiles in a particular direction may be controlled by the surface profile, thus polar profiles 324, 330 may be provided. Thus for optical windows 26 in a particular angular direction, the amount or light directed may comprise a mixture of cones 324 and 330, enabling tuning of actual light distribution in said direction. The axis of said direction may be determined by the slope 325 of the P or S surface.

Figure 38B:
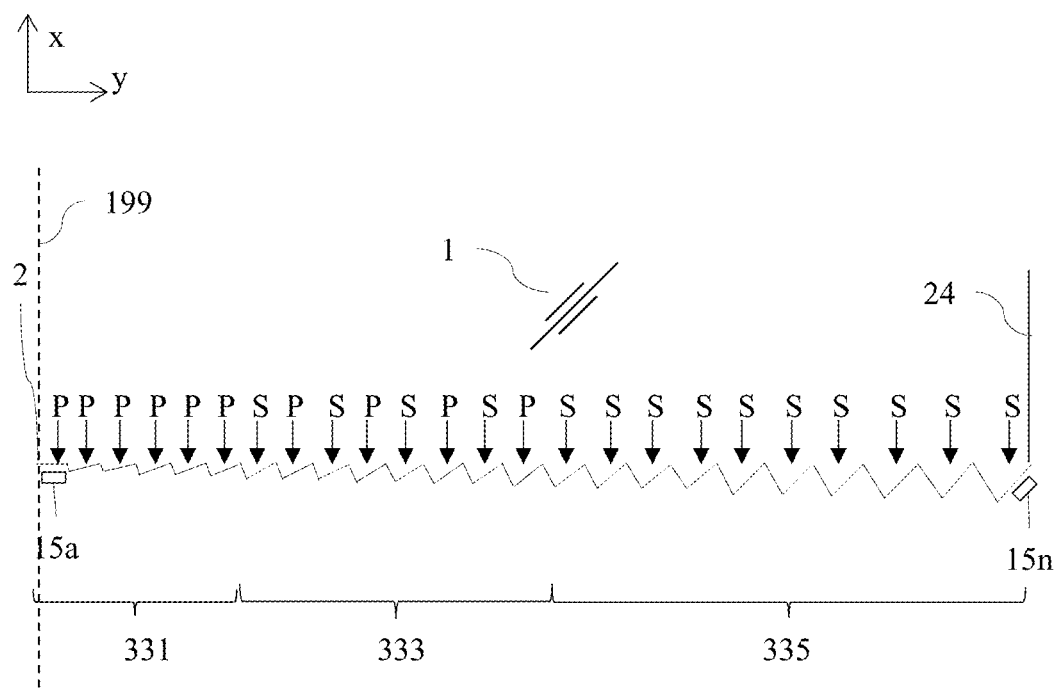

FIG. 38B illustrates one half of the input side 2 of a waveguide 1. The central facets in region 331, corresponding to central LEDs may be planar (P) type, thus achieving high efficiency of illumination of the reflective end 4. In the outer region 335, higher angular distributions of light may be desirable so that S type surfaces may be used. In intermediate region 333, some control of illumination may be desirable so that interlaced pairs of S and P surfaces, with aligned addressable light sources 15x, 15y may be provided to advantageously achieve control of uniformity at mid optical window 26 positions.

Advantageously the filling of Void B may be controlled for a wide range of optical window positions in the lateral direction. Both angular profile uniformity and image uniformity from a given angular direction may be achieved.

It would be desirable to provide off-axis filling of illumination voids with light sources that are arranged in a single lightbar with the primary light sources that are arranged to provide on-axis illumination.

Figure 39A:
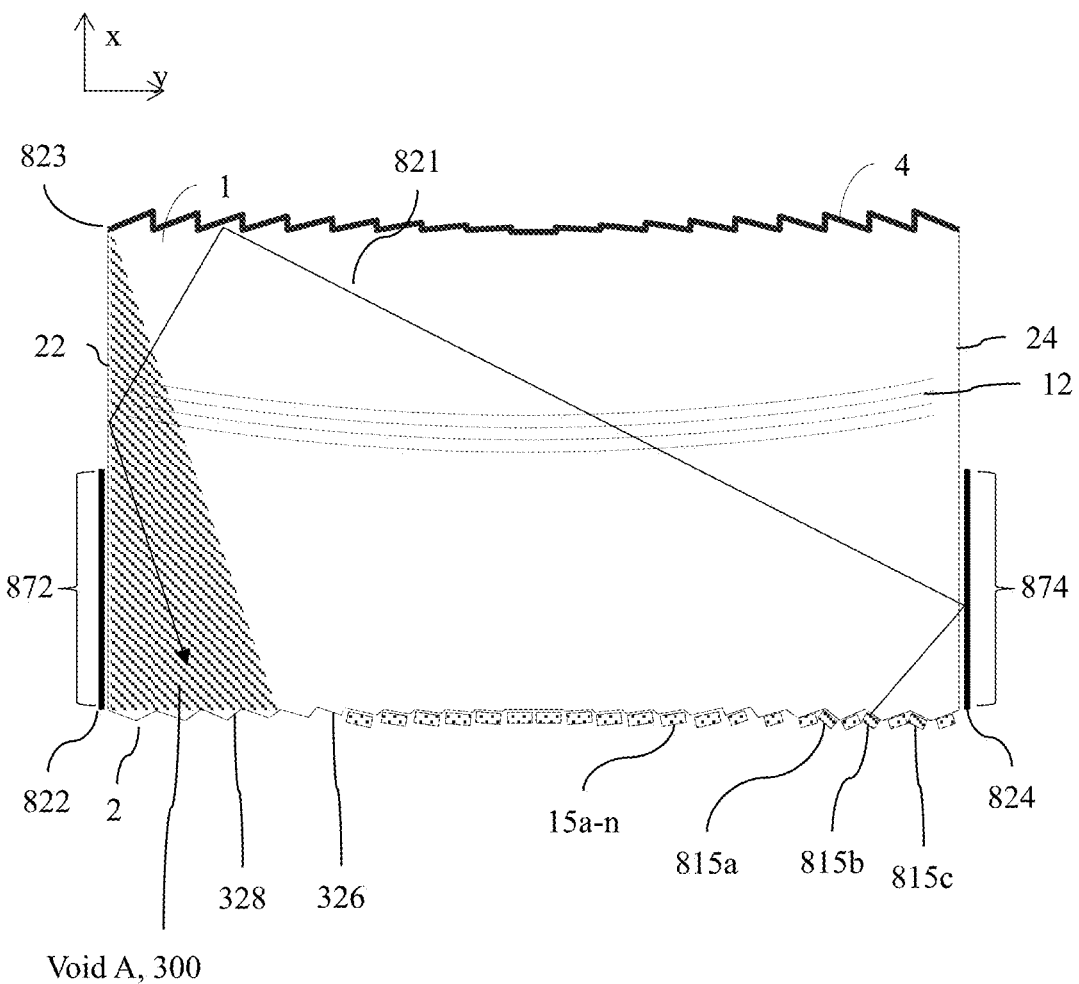
FIG. 39A is a schematic diagram illustrating in front view a directional waveguide and an array of light sources arranged to provide off-axis illumination of voids, in accordance with the present disclosure.

FIG. 39A is a schematic diagram illustrating in front view an array of light sources arranged to provide off-axis illumination of voids. The device further comprises reflector elements 822, 824 arranged along at least a part 872, 874 of each side surface 22, 24 respectively adjacent the input end 2. The additional light sources 815a-c are disposed along the input end 2 of the waveguide 1 on each side of the array 15 of input light sources 15a-n, and are arranged to direct additional light such as illustrated by ray 821 into the waveguide 1 through the input end 2 onto the reflector elements 822, 824. The reflector element 824 is arranged to reflect the additional light ray 821 towards the reflective end 4 so that the additional light ray 821 is reflected by the reflective end 4 onto the opposite side surface 22 and by the opposite side surface 22 into a segment of the waveguide 1 adjacent the opposite side surface 22 extending from a corner 823 between the reflective surface 4 and the side surface 22.

The reflector element 824 may be disposed along only said part 874 of each side surface 24, similarly the reflector element 822 may be disposed along only said part of each side surface 22. Said part 872, 874 of each side surface along which the reflector element is disposed is at least 20% of the side surface and preferably at least 40% of the side surface. Said part 872, 874 of each side surface 22, 24 along which the reflector element 822, 824 is disposed is at most 80% of the side surface and preferably at most 60% of the side surface.

The input end 2 may have facets 328 against which the additional light sources 815a-n are disposed, which facets 326 face the reflector element 822, 824.

Light sources 815a-c are arranged on draft facets 328 of the input side 2. For convenience of illustration, outer light sources are not shown on the left hand outer region of the input side but would be present on both sides.

In operation, light from sources 815a-c is directed through facets 328 towards side 24. Reflector 824, such as ESR™ from 3M corporation may be arranged adjacent to side 24 to reflect light from sources 815a-c towards reflective end 4. After reflection from end 4, light may be incident on side 22 and reflected to provide filling of illumination voids as described elsewhere herein. Alternatively the sides 22, 24 may be metallized.

Advantageously light sources 815a-c may be arranged on the same lightbar as sources 15a-n, reducing complexity and cost. Further, light sources 17a-n and 19a-n may be removed, reducing complexity and cost. Further illumination hotspots scatter in the waveguide 1 near the input region of light from light sources 17a-n and 19a-n may be reduced, improving uniformity.

Figure 39B:
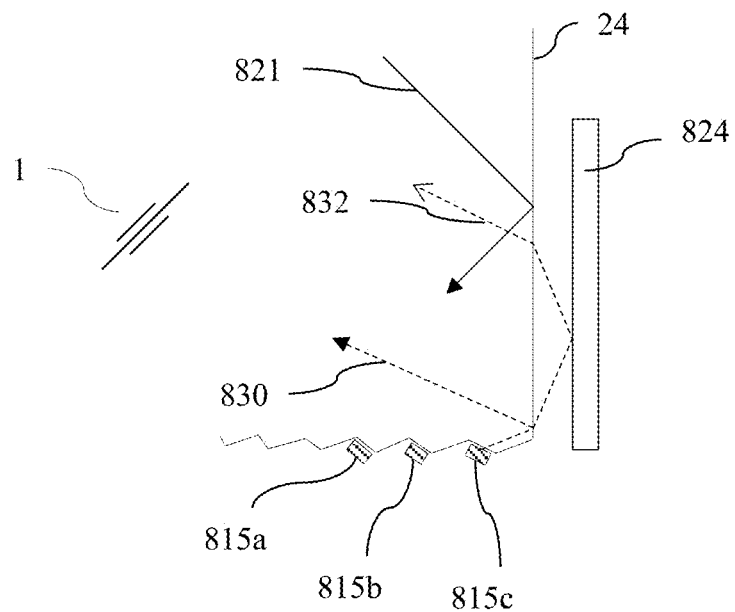
FIG. 39B and FIG. 39C are schematic diagrams illustrating in front view one input corner of a directional waveguide and an array of light sources arranged to provide off-axis illumination of voids for planar and structured reflectors respectively, in accordance with the present disclosure.
Figure 39C:
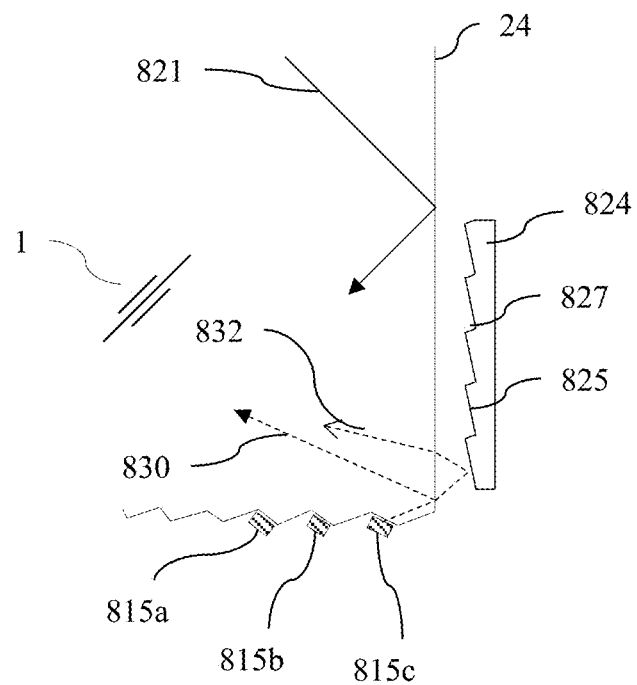

FIGS. 39B-C are a schematic diagram illustrating in front view one input corner of a directional waveguide 1 and an array of light sources 815a-c arranged to provide off-axis illumination of voids for planar and structured reflectors respectively. Said reflector element 822, 824 may comprise an array of facets that are arranged to reflect light in a different direction from light rays of the additional light that are reflected from the side surface.

In other words, reflector 824 may comprise a plane surface as shown in further detail in FIG. 39B or may alternatively comprise an array of microstructures such as plane facets 825 and draft facets 827 as shown in FIG. 39C. In operation, light rays 832 are reflected from the facets 825 in a direction that is different to light rays 830 that are reflected from the planar side 24. Advantageously tuning of void filling can be achieved, improving uniformity. Further light from central LEDs is not directed to voids that are visible from high angles, advantageously reducing off-axis cross talk in privacy mode of operation.

It would be desirable to reduce the number of connections to the LEDs of the array while maintaining control of angular and spatial uniformity across the waveguide output.

Figure 40:
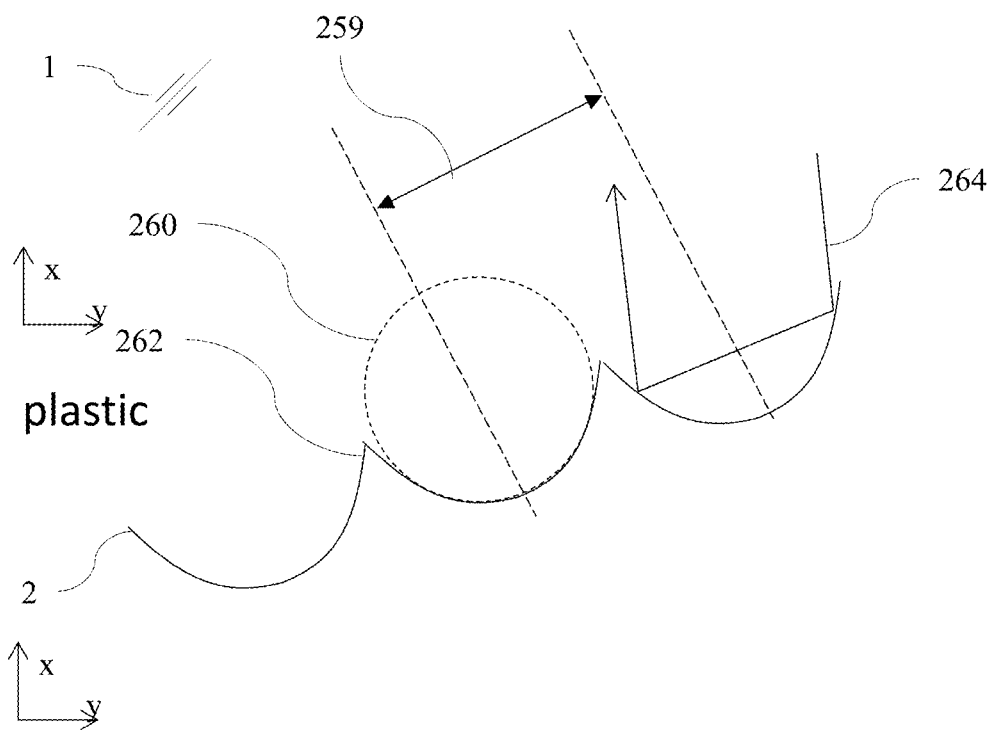
FIG. 40 and FIG. 41 are schematic diagrams illustrating in front view arrangements of input side microstructures arranged to provide structured illumination, in accordance with the present disclosure.
Figure 41:
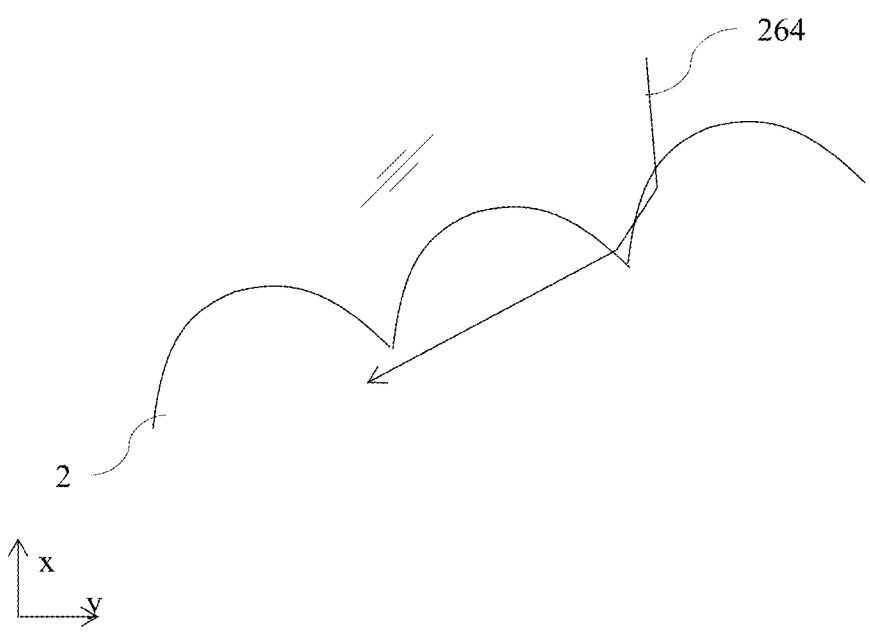

FIGS. 40-41 are schematic diagrams illustrating in front view arrangements of input side microstructures arranged to provide structured illumination.

As shown in FIG. 40 conveniently the type S surface may be provided by curved surfaces that may be convex structures of radius 260 typically 30 micrometers or less and tip 262 of radius less than 5 micrometers. Such a structure conveniently achieves a batwing type profile as will be described below. Transmitted angular profile of input light from a light source of array 15 (not shown) may be controlled by means of adjusting the pitch of placement of radius 260 during a tooling step. Further returning light after reflection from side 4 that is incident on the input side 2 may have reflectivity that can be controlled by means of adjusting the pitch 259 of placement of radius 260 that may be achieved during a tooling step. Advantageously the lateral uniformity, privacy level and visible image streaks may be controlled by means of adjusting said pitch 259.

In privacy operation, light rays 264 returning to the input side 2 may undesirably provide unwanted illumination at high angle optical windows. FIG. 41 illustrates curved surfaces that may be concave that provide different retroreflection properties for light rays 264.

It would be desirable to match the profiles in the near and far corners of the Fresnel reflector using the interlaced P and S type structures as described above.

Figure 42:
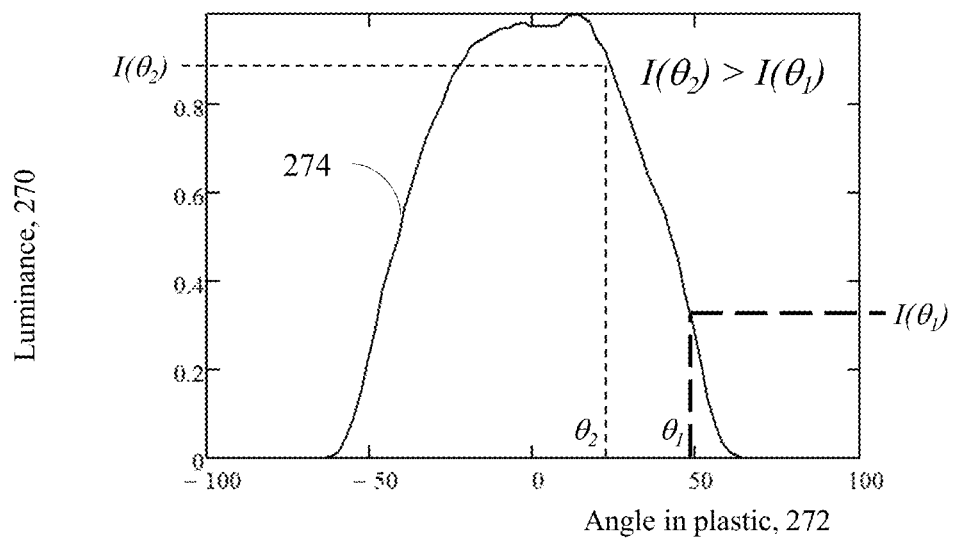
FIG. 42 is a schematic graph illustrating angular luminance distribution profile for light input in plastic for a planar input facet and Lambertian light source, in accordance with the present disclosure.
Figure 43:
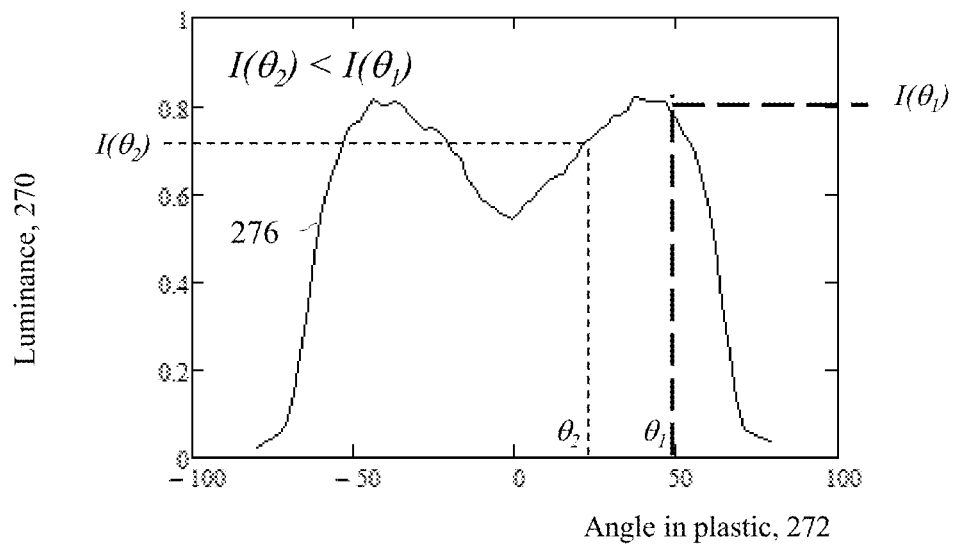
FIG. 43 is a schematic graph illustrating angular luminance distribution profile for light input in plastic for a structured input facet similar to that shown in FIG. 41 and Lambertian light source, in accordance with the present disclosure.

FIG. 42 is a schematic graph illustrating angular luminance distribution profile 274 for light input in plastic for a planar input P type facet and Lambertian light source, equivalent to polar profile 324 in FIG. 38A. FIG. 43 is a schematic graph illustrating angular luminance distribution profile 276 for light input in plastic for a structured S type input facet similar to that shown in FIG. 41A and Lambertian light source in air, providing a batwing type angular profile, equivalent to polar profile 330 in FIG. 38A. As the angle from an off-axis light source to the corners is different (shown as θ1 and θ2), then the corners will be illuminated for a particular optical window with different intensities, and spatial non-uniformity will be provided for an observer at the particular optical window position.

Figure 44:
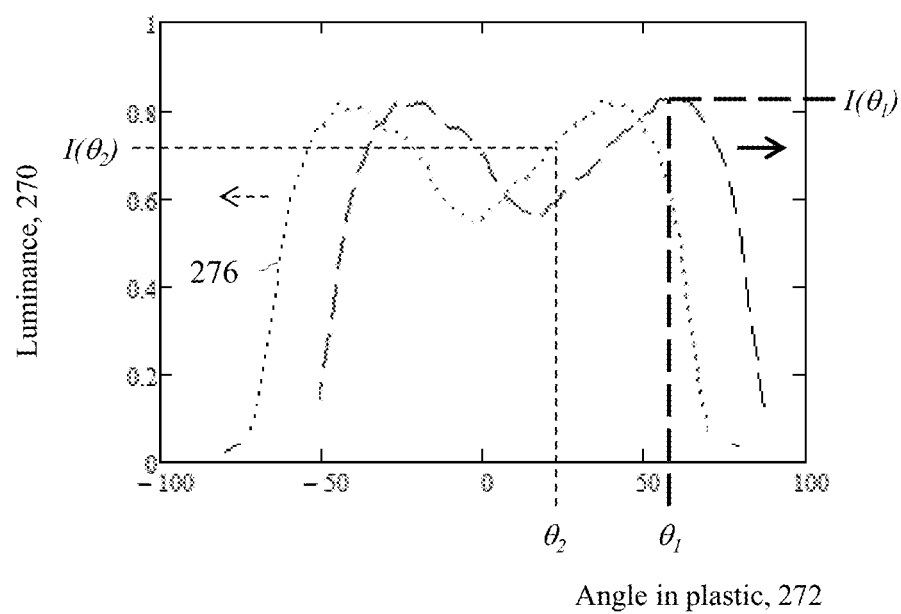
FIG. 44 is a schematic graph illustrating angular luminance distribution profile for light input in plastic for a tilted structured input facet similar to that shown in FIG. 41 and Lambertian light source, in accordance with the present disclosure.

FIG. 44 is a schematic graph illustrating angular luminance distribution profile for light input in plastic for a tilted structured input facet similar to that shown in FIG. 41C and Lambertian light source. The profiles 276 can be translated through LED rotation at the input, as shown in FIG. 38A and described graphically in FIG. 44.

Figure 45:
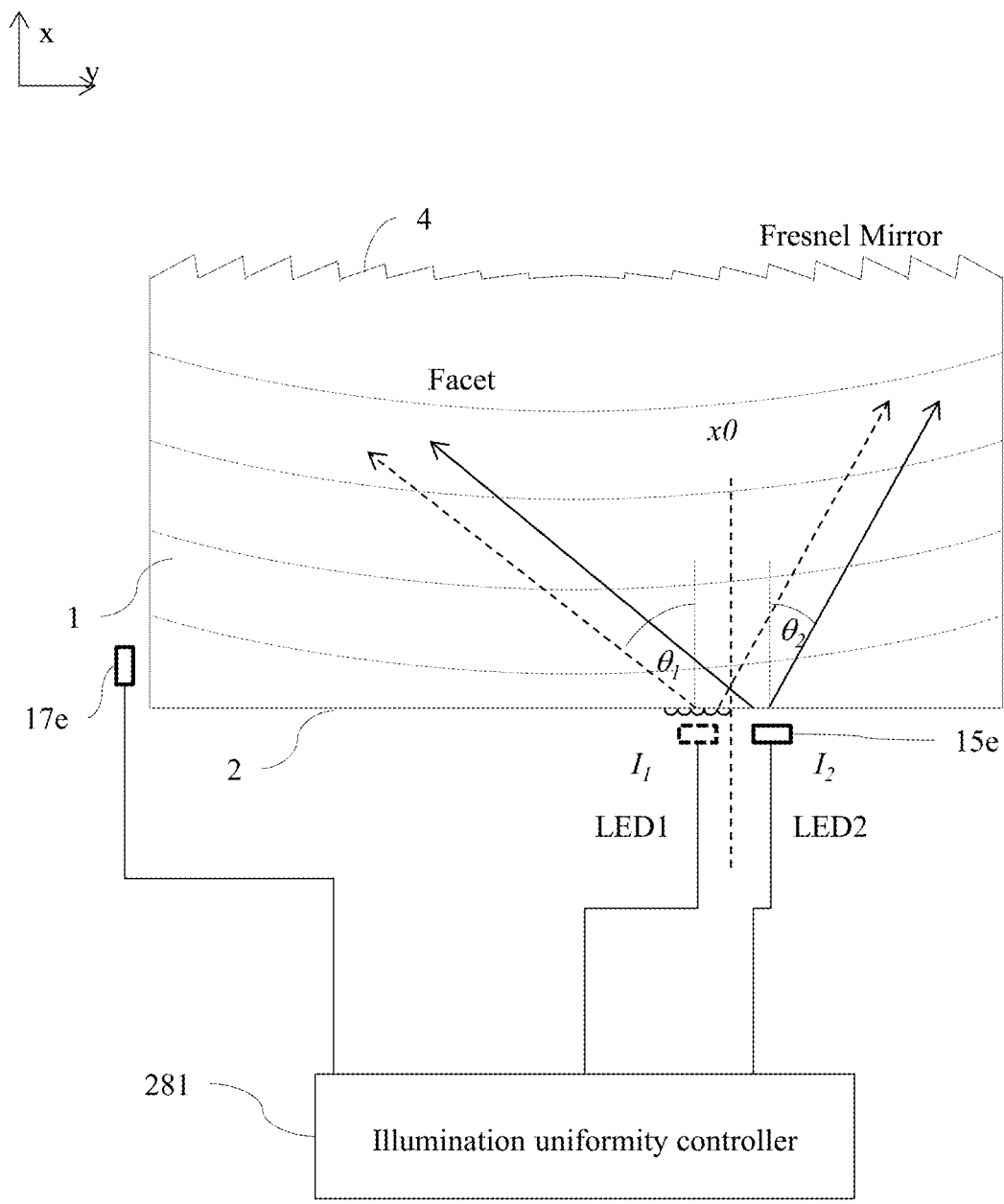
FIG. 45 is a schematic diagram illustrating control of luminance uniformity by means of LED control for adjacent LEDs, in accordance with the present disclosure.

FIG. 45 is a schematic diagram illustrating control of luminance uniformity by means of LED control for adjacent LEDs. Thus adjacent LEDs with luminous flux I1 and I2 can be controlled by illumination uniformity controller 281.

Figure 46A:
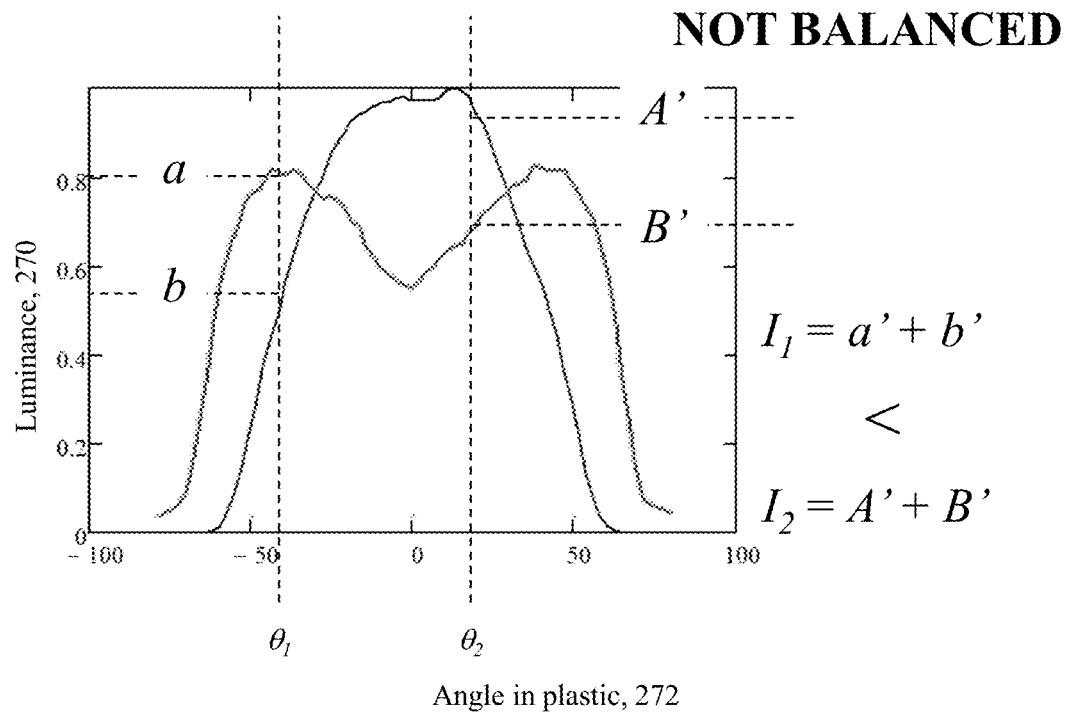
FIG. 46A and FIG. 46B are schematic graphs illustrating control of luminance uniformity by means of LED control for adjacent LEDs, in accordance with the present disclosure.
Figure 46B:
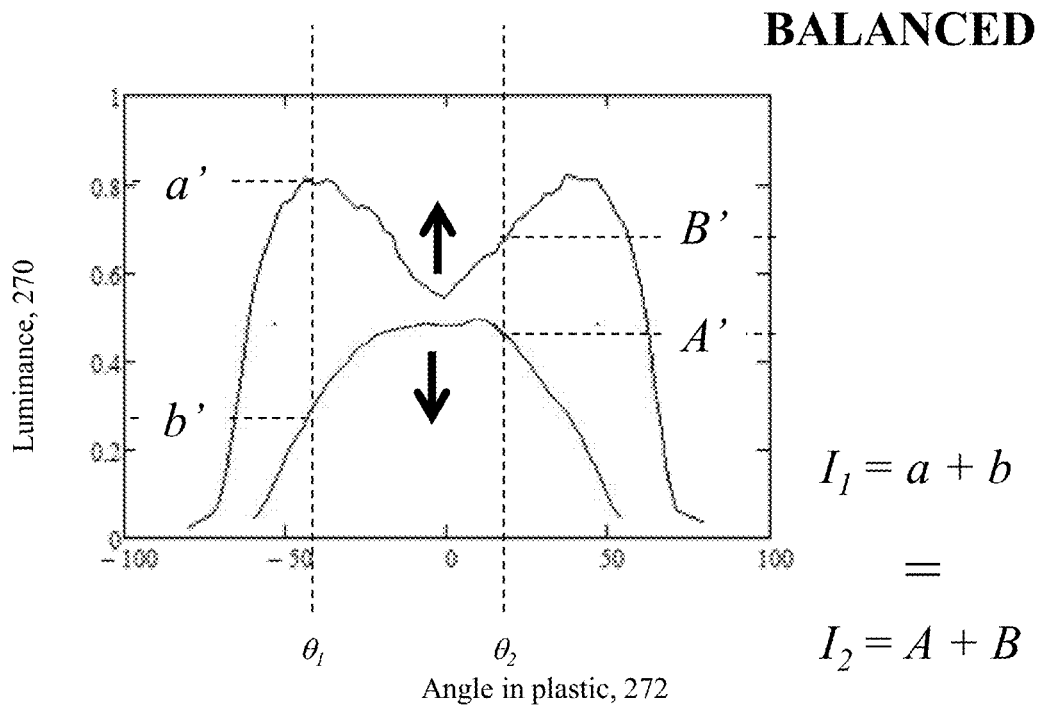

FIGS. 46A-46B are schematic graphs illustrating control of luminance uniformity by means of LED control for adjacent LEDs. FIG. 46A shows an unbalanced arrangement whereas FIG. 46B shows a balanced arrangement. Balancing can be achieved by adjusting the relative intensities of adjacent LEDs that provide different angular outputs.

It would be desirable to reduce the number of light sources on the input side 2 to reduced cost and physical size of the backlight unit while maintaining desirable uniformity by means of void filling.

Figure 47:
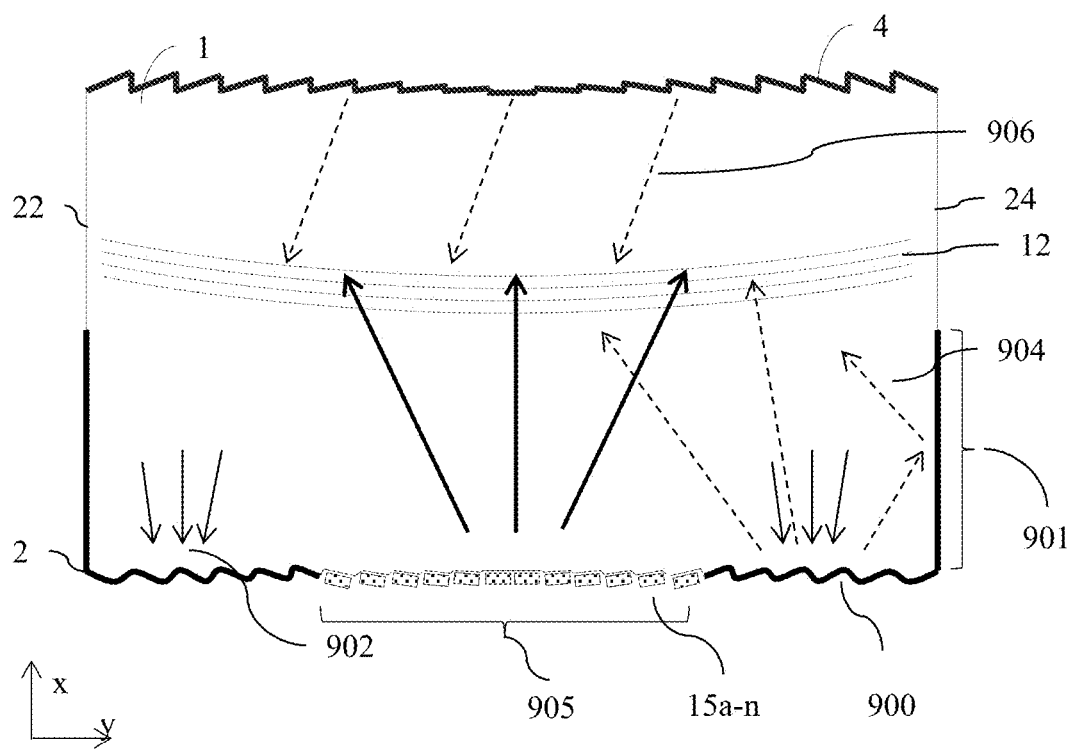
FIG. 47 is a schematic diagram illustrating uniformity control using a partially reflective input side, in accordance with the present disclosure.

FIG. 47 is a schematic diagram illustrating uniformity control using a partially reflective input side. Light source array 15a-n may be arranged in a first region 905 while the input side 2 may be reflective in region 900. Further portion 901 of the sides 22, 24 may be reflective. Thus light rays 902 that are incident on the input side 2 are reflected by the reflective regions 900 with a profile arranged to partially illuminate side regions 901 and re-reflect to the mirror end 4. Rays 906 may be provided that fill voids for off axis position and advantageously uniform illumination is provided for reduced cost and complexity/

Figure 48:
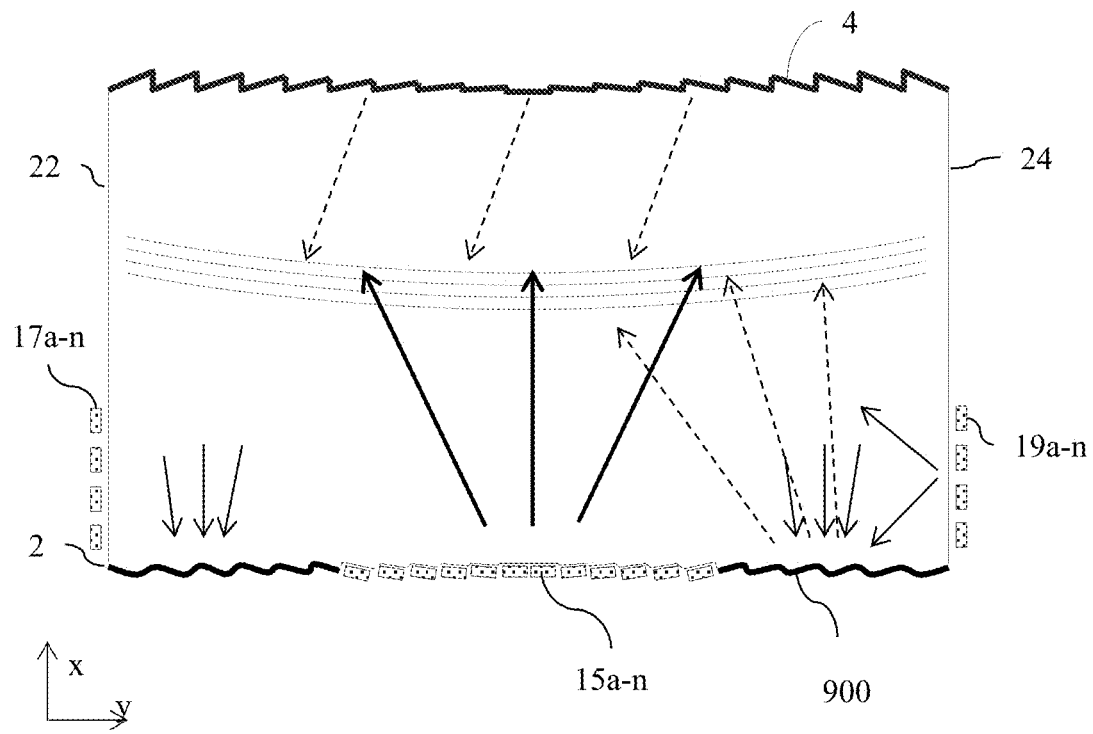
FIG. 48 is a schematic diagram illustrating uniformity control using a partially reflective input side and side LEDs, in accordance with the present disclosure.

FIG. 48 is a schematic diagram illustrating uniformity control using a partially reflective input side and side LEDs. Increased illumination output can be achieved in void regions using a combination of reflective input side 2 and side mounted light source arrays 17a-n, 19a-n. Advantageously improved uniformity control can be achieved compared to the embodiment of FIG. 47.

The input facets 326, 328 provide angular redirection of input light to increase high lateral uniformity. During thermal cycling, the dimensions of the waveguide 1 may alter, and so lights sources 15a-n may vary in relative location with respect to the waveguide 1 in x and y directions, reducing efficiency and creating hotspots. It would be desirable to reduce degradations of uniformity due to thermal cycling, while maintaining lateral uniformity and minimizing reflection of light in privacy operation for off-axis positions on the input side 2.

Figure 49A:
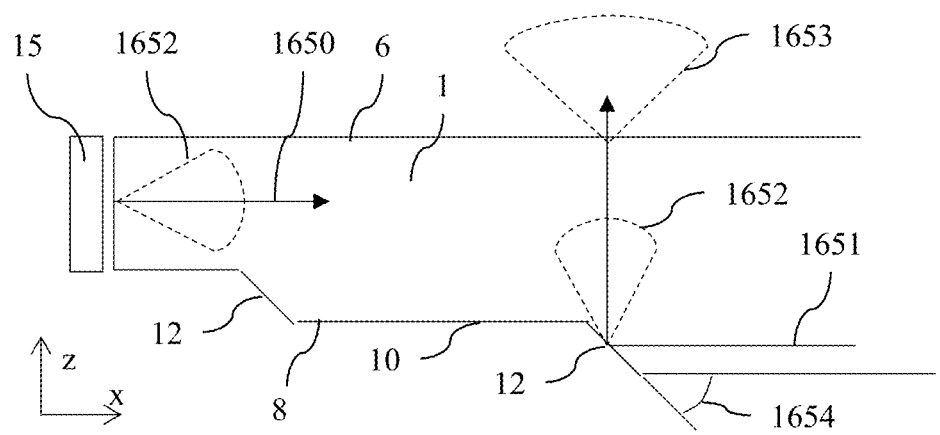
FIG. 49A is a schematic diagram illustrating a side view of a directional waveguide comprising extraction facets with a 45° facet angle and vertical input facet angle, in accordance with the present disclosure.
Figure 49B:
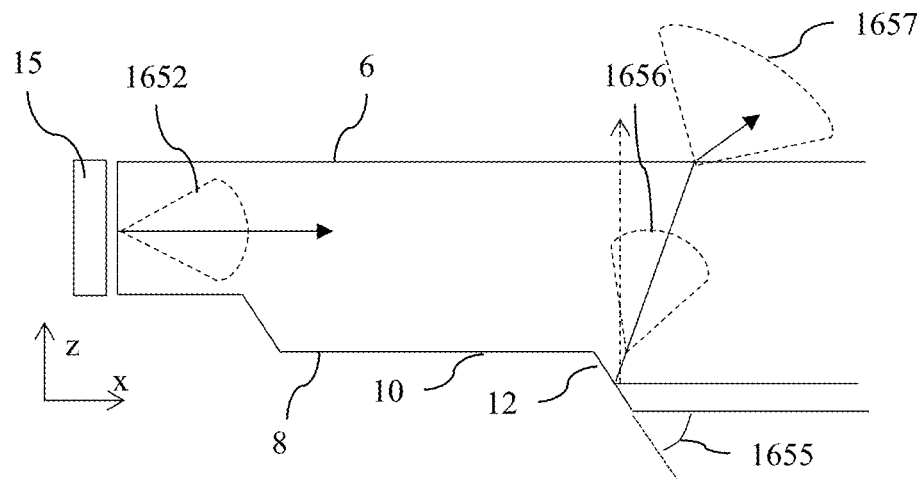
FIG. 49B is a schematic diagram illustrating a side view of a directional waveguide comprising extraction facets with a facet angle greater than 45° and vertical input facet angle, in accordance with the present disclosure.

FIG. 49A is a schematic diagram illustrating a side view of a directional waveguide comprising extraction facets with a 45° facet angle and vertical input facet angle and FIG. 49B is a schematic diagram illustrating a side view of a directional waveguide comprising extraction facets with a facet angle greater than 45° and vertical input facet angle. Input side 2 is substantially normal to sides 6, 8. Light source 15 directs rays 1650 comprising a central beam with cone 1652 into the waveguide 1. After reflection from the reflective end 4, light ray 1651 may be extracted by facet 12 at angle 1654 of 45° with cone angle 1652. The diffusion cone angle 1653 in the x-z plane of the waveguide 1 may be determined by the cone angle 1652, profile of the facet 12 and tilt angle 1654 of the facet 12. As described in U.S. patent application Ser. No. 14/186,862, filed Feb. 21, 2014, entitled "Directional backlight" (U.S. Patent Publication No. 2014/0240828) and incorporated herein by reference in its entirety, the tilt angle 1654 of the facet 12 may cooperate with the tilt angle of a prismatic rear reflector (not shown).

In operation, the angle 1654 may be for example 55° to best cooperate with the angle of the rear reflector (not shown). Thus the luminance may be decreased with respect to the surface normal direction and cone 1657 may be directed away from the surface normal direction, reducing the luminance in the normal direction.

It may be desirable to increase the overall vertical diffusion angle and luminance in the normal direction angle, that is the width and distribution of the light cone 1653.

Figure 49C:
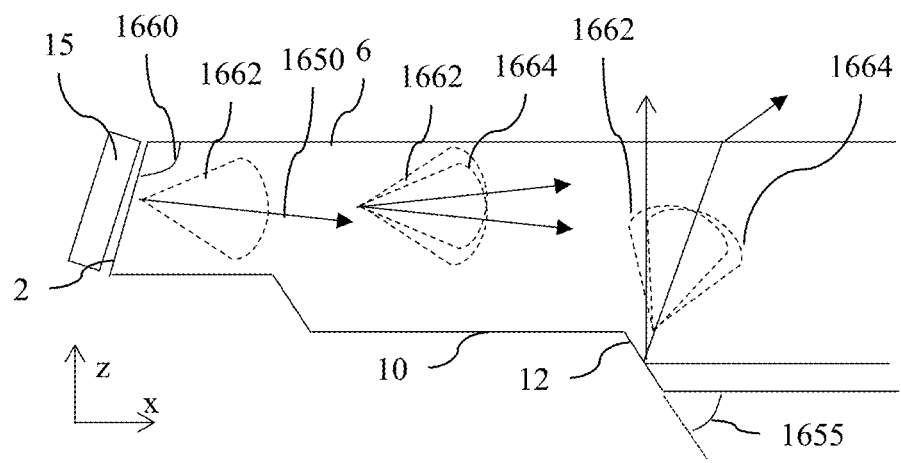
FIG. 49C is a schematic diagram illustrating a side view of a directional waveguide comprising extraction facets with a facet angle greater than 45° and tilted input facet angle, in accordance with the present disclosure.

FIG. 49C is a schematic diagram illustrating a side view of a directional waveguide comprising extraction facets with a facet angle greater than 45° and tilted input facet angle. Input side 2 may be inclined at angle 1660 to side 6. In operation light ray 1650 and cone 1662 are inclined to the central beam direction (ray 1650 in FIG. 49A). After reflection from side 6 and regions 10, cones 1662, 1664 are provided, thus increasing the size of the light cone in the waveguide 1. Thus the facet 12 may have angle 1655 that is greater than 45°. Thus the cone that propagates in air has increased size, and the luminance normal to the surface is increased. Further, the rear reflector may be arranged to provide a complimentary reflection in the x-z plane. Advantageously the uniformity in the direction orthogonal to the lateral direction is increased and the luminance normal to the output side 6 is increased.

Figure 50A:
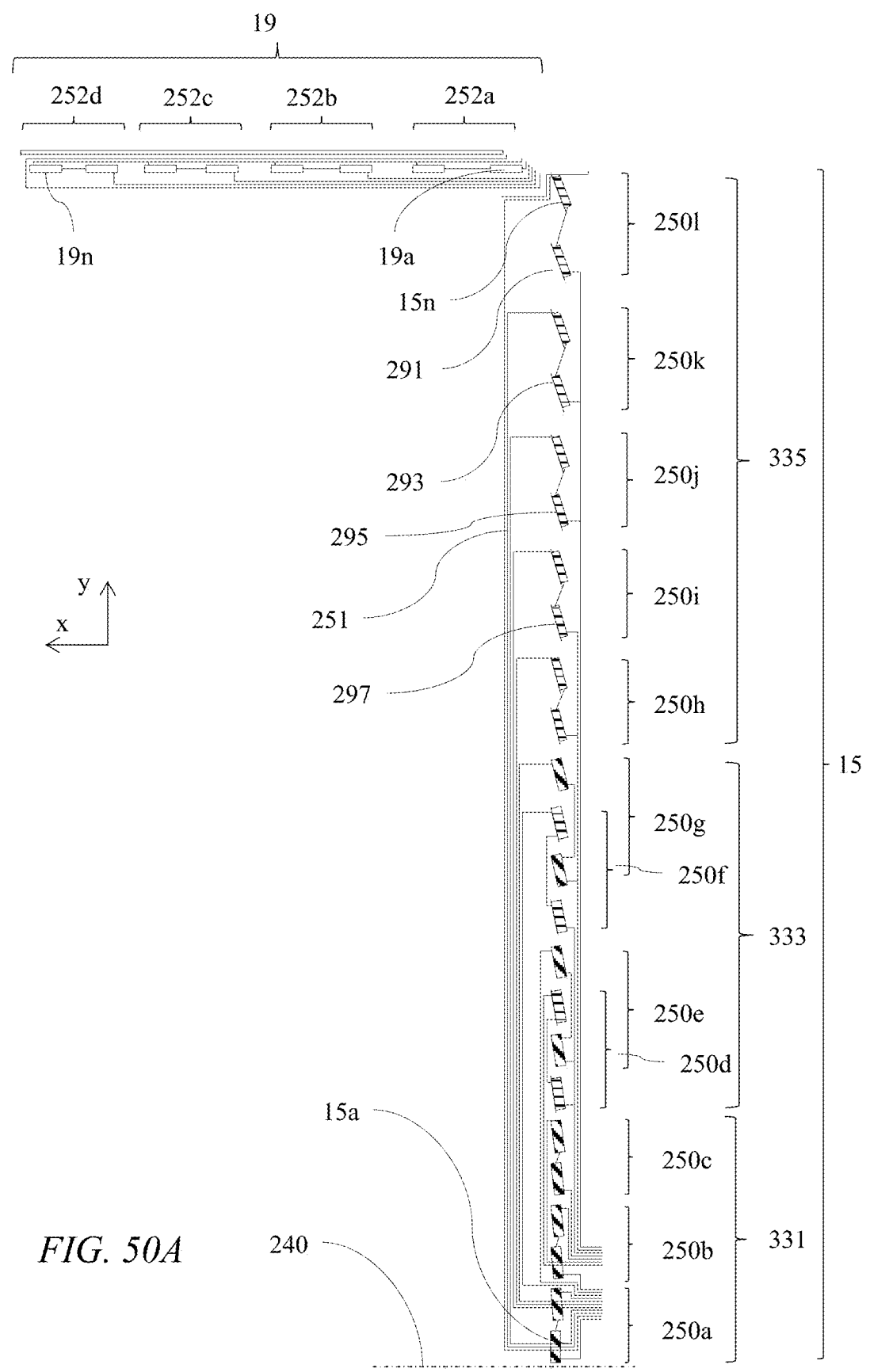
FIG. 50A, FIG. 50B, FIG. 50C, FIG. 50D, and FIG. 50E are schematic diagrams illustrating arrangements of LED connections to achieve correction of luminance uniformity, in accordance with the present disclosure.

FIG. 50A is a schematic diagram illustrating in front view arrangements of LED for use in cooperation with the waveguide input of FIG. 38B arranged to achieve void B filling. Light source arrays 15, 19 connected by means of electrodes 251 may be provided by LEDs that are arranged in multiple groups comprising pairs 250a-250c in region 331, pairs 250d-250g in region 333 and pairs 250h-250l in region 335. Similarly light source array 19 may comprise LEDs 19a-19n arranged in pairs 252a-252d that extend approximately ⅓ of the height of the waveguide 1 from in the input side.

The separation of the LEDs 15a-n and 19a-n may advantageously be non-uniform. The diffusion properties of elements in the backlight may be angularly dependent, thus higher separations may be provided at higher angular input positions. Further, higher lumens per millimeters can desirably be provided in the central region of the waveguide 1.

Advantageously the number of LEDs and the number of addressable channels of the control system may be reduced, reducing cost while maintaining angular and spatial uniformity performance.

Figure 50B:
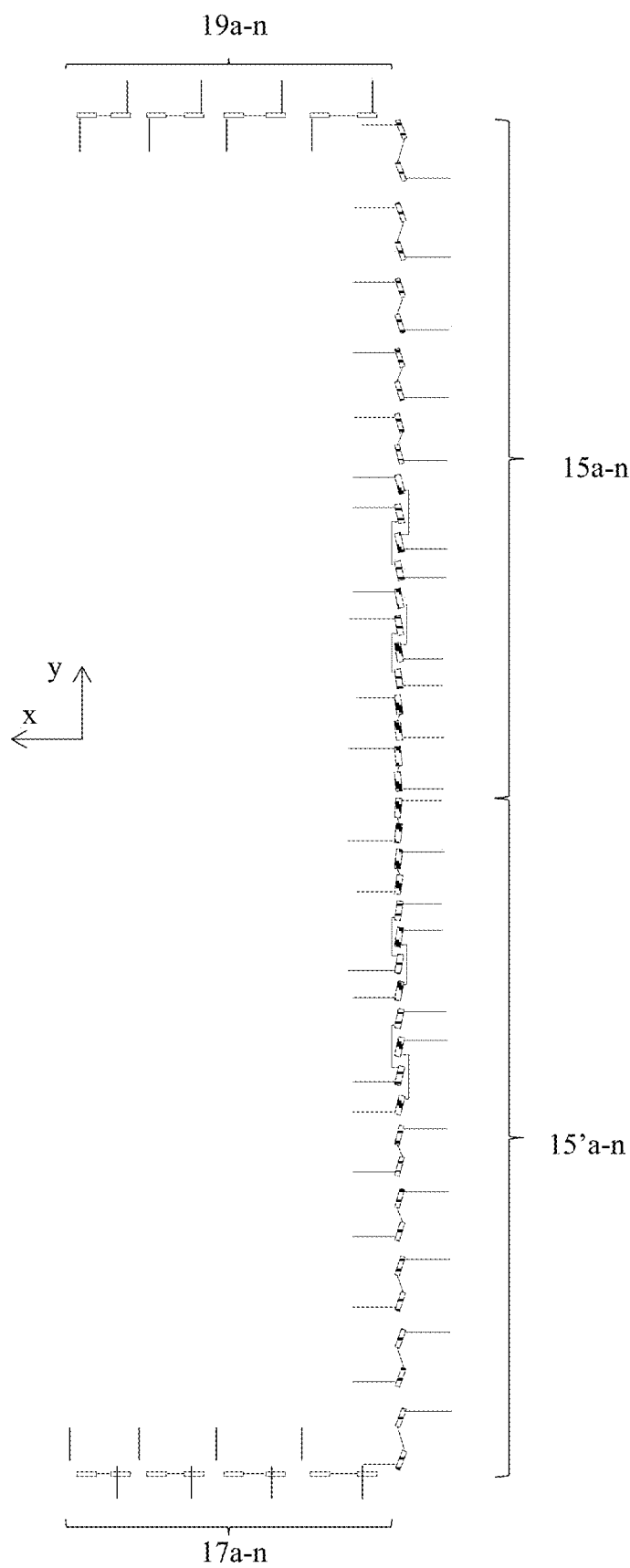

FIG. 50B is a schematic diagram illustrating an arrangement of LED connections to achieve correction of luminance uniformity. FIG. 50B illustrates an arrangement similar to FIG. 50A wherein the complete array of 64 LEDs is shown, using 32 connections with LEDs arranged in pairs. Advantageously the number of connections is reduced compared to individual LED control.

Figure 50C:
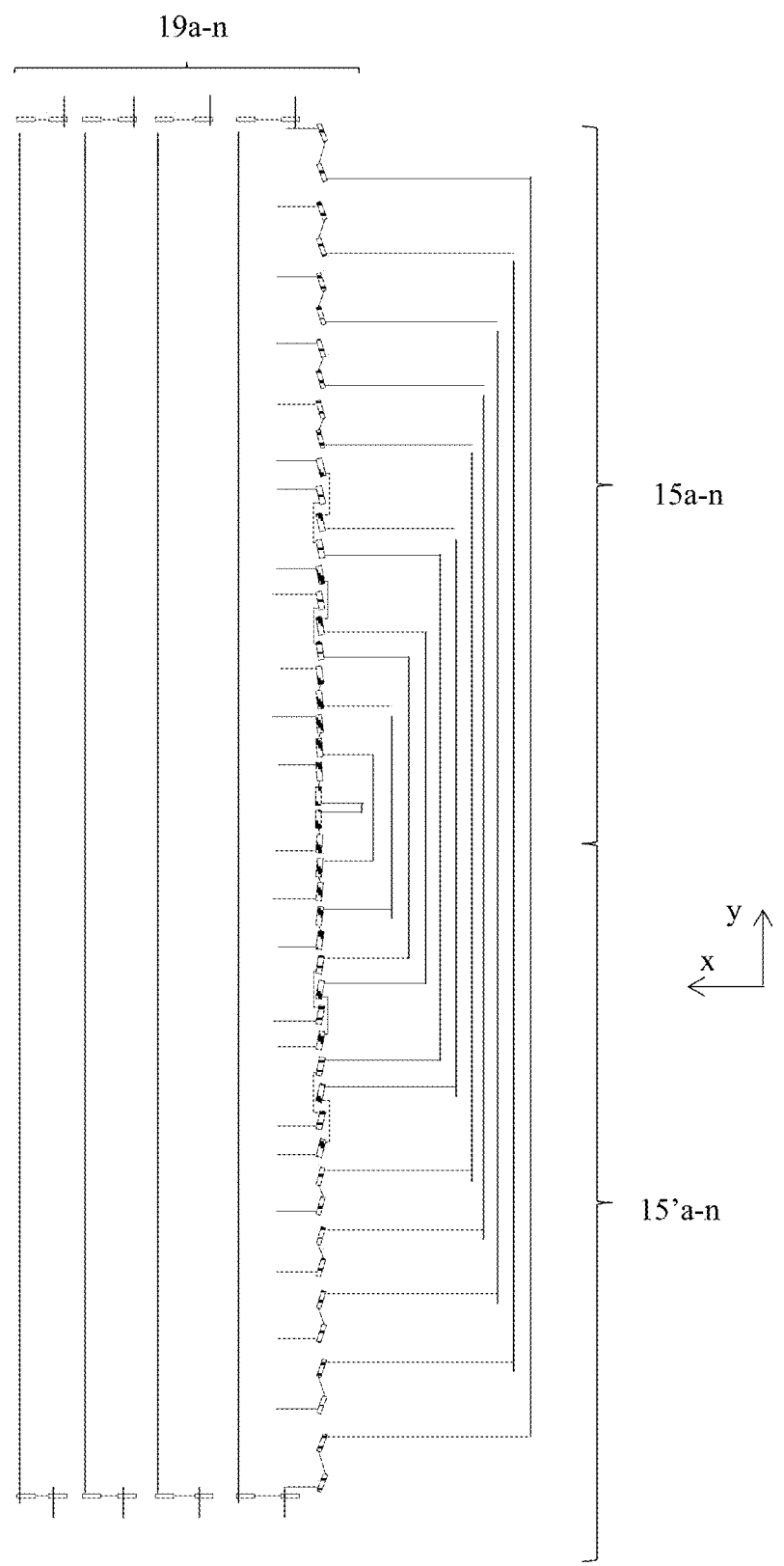

FIG. 50C is a schematic diagram illustrating an arrangement of LED connections to further reduce the number of connections. By means of providing matching symmetric strings of 4 LEDs such an arrangement takes advantage of the lateral symmetry of the waveguide 1.

Advantageously such an arrangement reduces the number of connections from 64 to 16, advantageously reducing size and cost of the control circuit.

Light in the waveguide that is reflected from LED elements after reflection from the Fresnel reflector undesirably can increase the level of stray light and reduce the stray light performance of the display. It would be desirable to reduce stray light levels in privacy mode of operation.

Figure 50D:
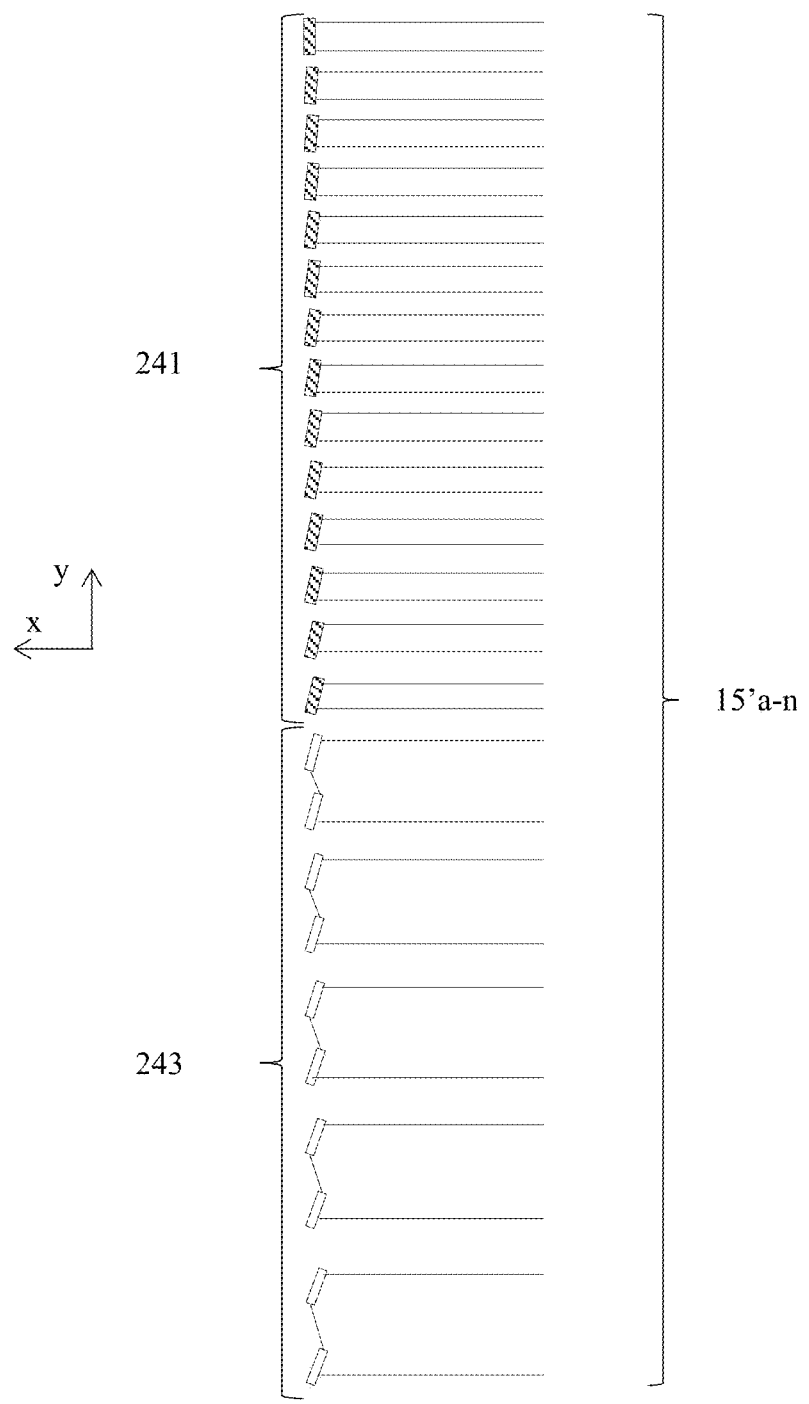

FIG. 50D is a schematic diagram illustrating an arrangement of LED connections to further reduce the number of connections. In array 15'a-n first group 241 may comprise dual die LEDs, that is LEDs comprising two separate gallium nitride emitting dies, whereas group 243 may comprise single die LEDs. Thus the addressing voltage for each input is the same for the first and second groups 241, 243 but the total number of connections is reduced. Further, the light output at the edges of the array, for example in group 243 is typically more uniform and lower luminous flux than for group 241. Advantageously desirable luminous flux variation across the array can be achieved while reducing the total number of connections. Such an arrangement can be used in combination with the symmetric designs described elsewhere herein.

Figure 50E:
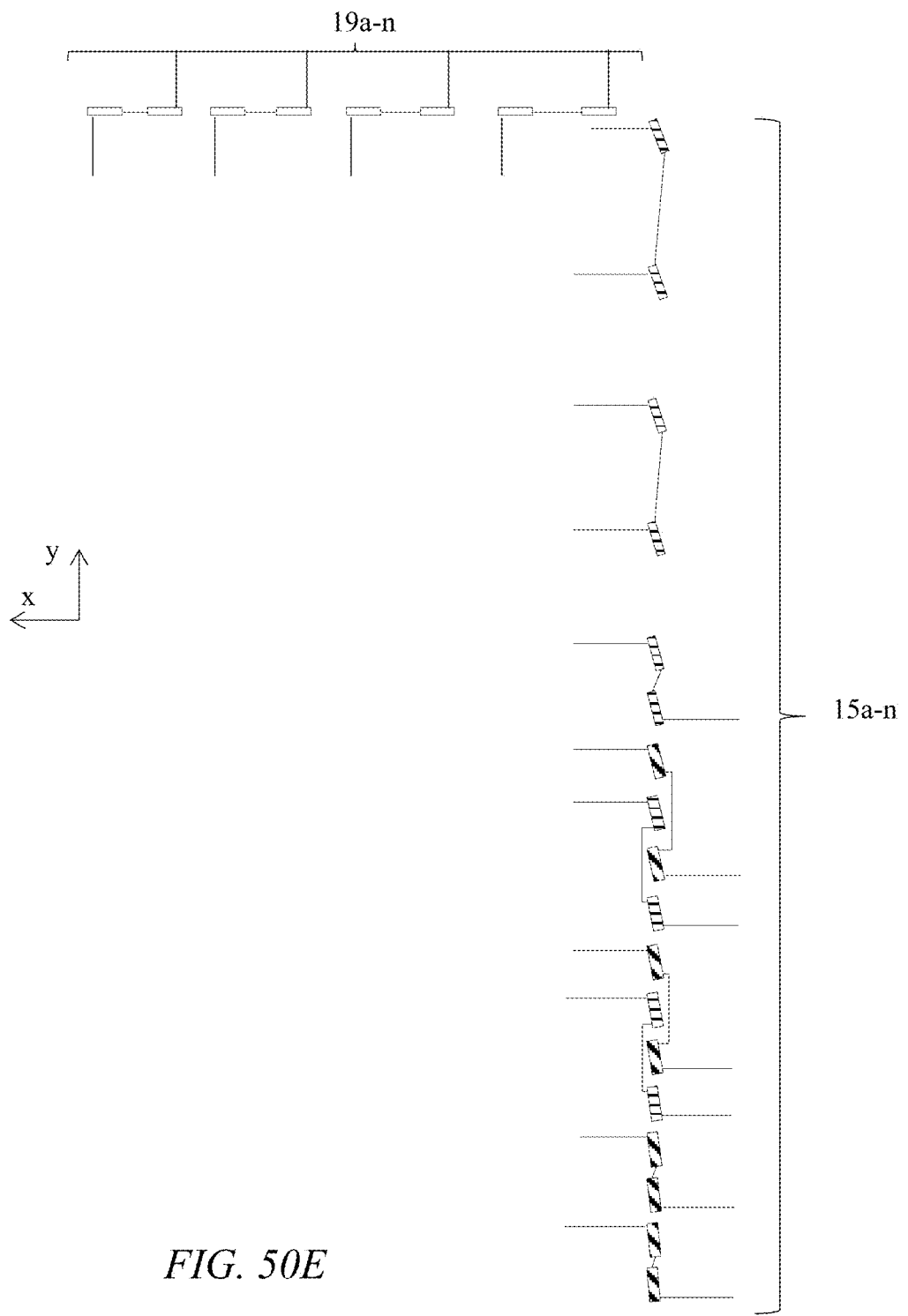

FIG. 50E is a schematic diagram illustrating a further arrangement of LED connections and input surfaces to further improve privacy performance by reducing the amount of stray light in off-axis positions. In comparison to FIG. 50A LEDs 291, 293, 295 are removed, thus reducing the stray light resulting from LED reflections. Further the optical surface in the region between the remaining LEDs can be arranged to transmit light or direct returning light to the sides 22, 24 to remove stray light artifacts. Such an arrangement advantageously improves privacy performance by reducing reflection from the input side.

A further origin of spatial non-uniformity arises from stray light scatter in the vicinity of the sides 2, 4, 22, 24 of the waveguide 1. Further the waveguide is desirably attached to the remainder of the backlight and spatial light modulator 48 to provide mechanical ruggedness.

Figure 51A:
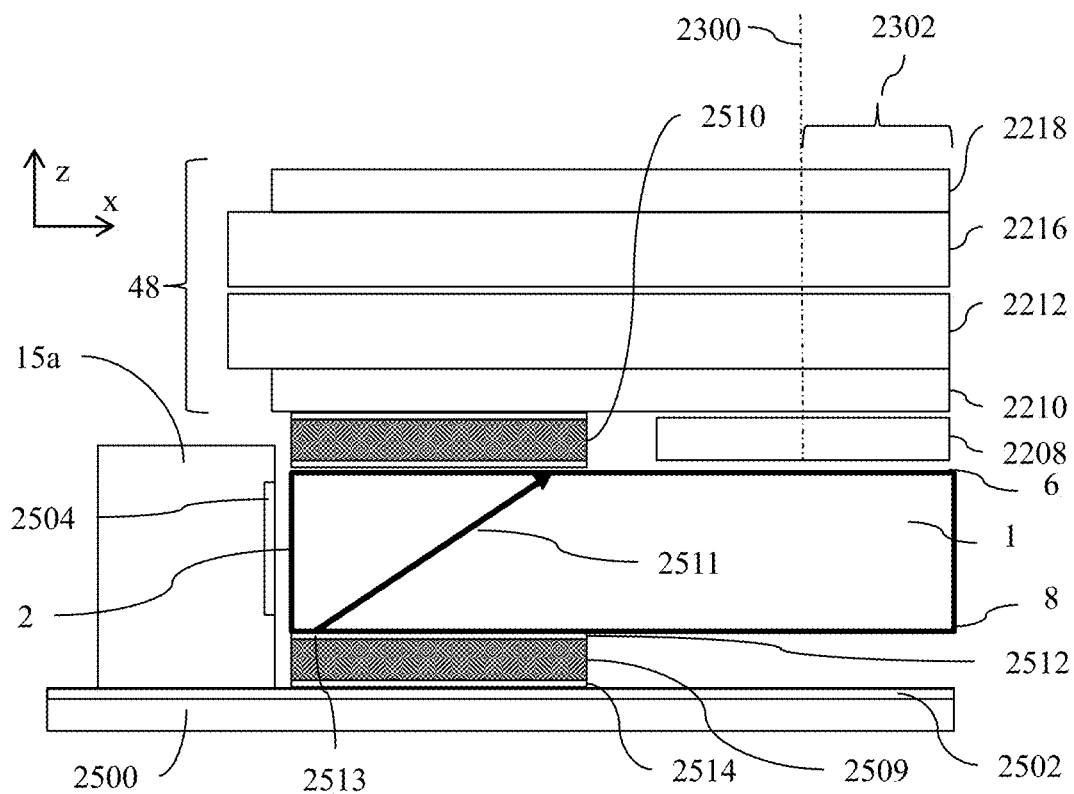
FIG. 51A is a schematic diagram illustrating in side view light blocking layers arranged across the upper and lower sides of a waveguide comprising black tape, in accordance with the present disclosure.

FIG. 51A is a schematic diagram illustrating in side view light blocking layers arranged across the upper and lower sides of a waveguide 1 comprising a light blocking layer that is black tape.

Figure 59A:
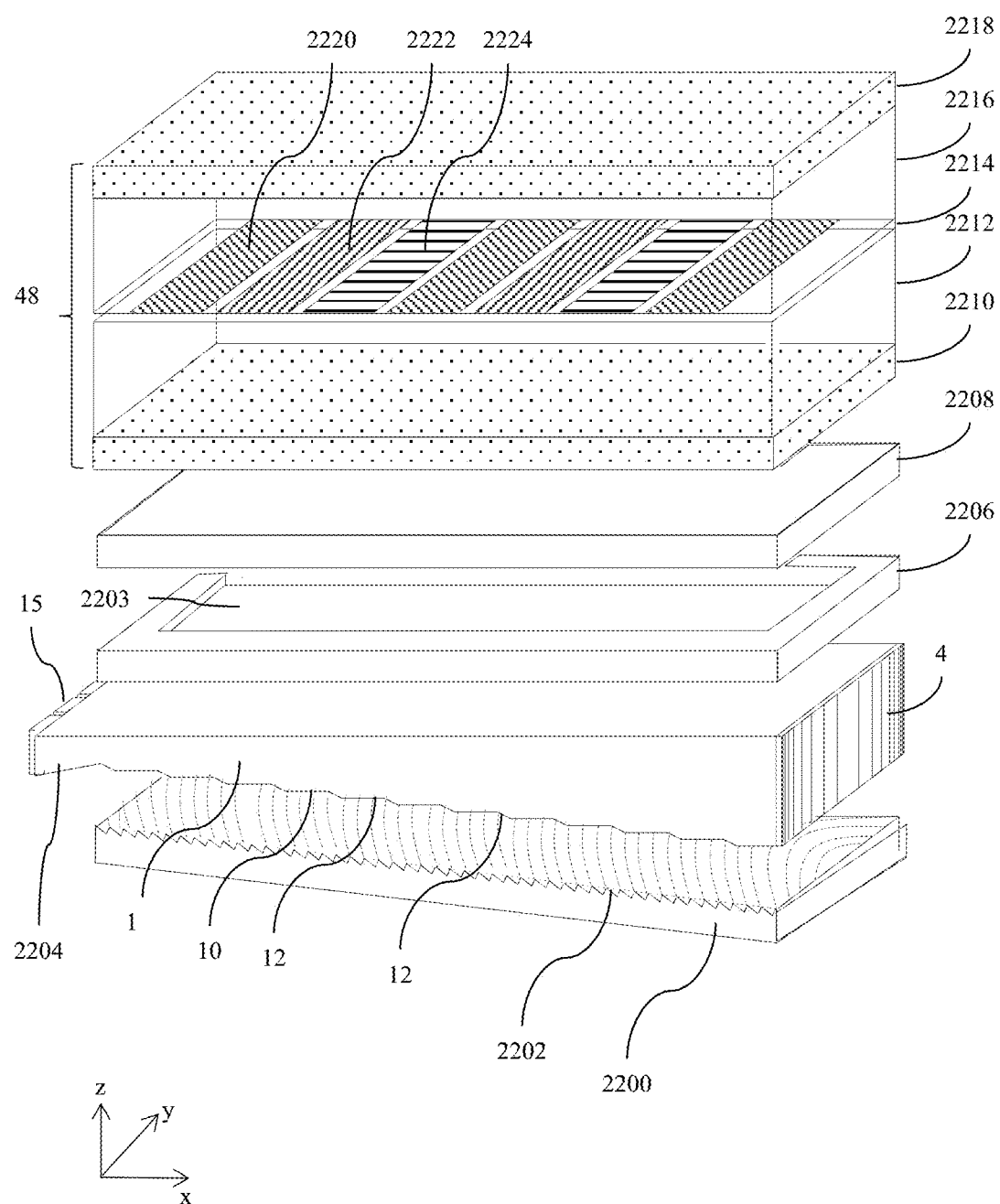
FIG. 59A is a schematic diagram illustrating in perspective view, the structure of a directional display device comprising an directional backlight arranged with a spatial light modulator, in accordance with the present disclosure.

As will be further described herein with reference to FIG. 59A, spatial light modulator 48 may comprise output polarizer 2218, substrates 2212, 2214 and input polarizer 2210. Diffusers, polarization rotation elements and/or reflective polarizers may be provided in optical stack 2208 that may be attached to polarizer 2210. Spatial light modulator 48 may have pixels formed in active area 2302 with active area boundary 2300.

LED 15 may be provided on a support substrate 2500 such as a flexible printed circuit board, FPC 2500 that may have a white, black or other colour upper layer 2502.

A directional waveguide may thus comprise an input end 2 for receiving input light at different input positions in a lateral direction across the input end 2; first and second opposed guide surfaces 6,8 for guiding input light 2511 along the waveguide 1; and a reflective end 4 for reflecting input light back along the waveguide 1, wherein the second guide surface 8 is arranged to deflect light reflected from the reflective end 4 through the first guide surface 6 as output light, and the waveguide 1 is arranged to direct the output light into respective optical windows 26 in output directions that are distributed laterally in dependence on the position of the input light.

In operation stray light from aperture 2504 of light source 15a of light source array 15 may create undesirable image streaks. Stray light may arise for example from manufacturing defects, parting lines, inadequate surface quality and light source misalignment to the input side 2.

Reflections from input side 2 of light that has reflected from reflective end 4 of waveguide 1 may further provide undesirable cross talk that degrades privacy and autostereoscopic performance. It would be desirable to reduce light streaks and stray light.

The directional waveguide may further comprising a light blocking layers 2510 disposed across the first and second opposed guide surfaces 6, 8 adjacent the input end 2 and arranged to absorb light 2511 incident thereon.

The light blocking layers 2510 may comprise an absorbing layer 2509 and an adhesive layer 2512 arranged to provide optical coupling between the waveguide 1 and absorbing layer 2509. The absorbing layer 2509 may be black tape for example so that the light blocking layer comprises tape attached to the first and second opposed guide surfaces 6, 8.

The light blocking layers 2510 may be arranged outside of the active area 2302 of the spatial light modulator 48 (the area 2302 of the spatial light modulator 48 where image pixels are arranged), between the boundary 2300 and in the input side 2. The light blocking layers 2510 may be arranged to absorb some of the light from the input side 2, enabling some light to pass without blocking.

Although in this example the light blocking layers 2510 are disposed across each of the first and second opposed guide surfaces 6, 8, as an alternative a light blocking layer 2510 may be disposed across only one of the first and second opposed guide surfaces 6, 8.

Thus a directional display device may comprise a directional backlight 1, 15 and a transmissive spatial light modulator 48 arranged to receive the output light from the waveguide 1 and to modulate it to display an image, the light blocking layer 2510 being arranged outside the active area 2302 of the spatial light modulator.

Scatter from regions 2513 near the input side may create light rays 2511 that can be extracted to cause image streaks 2. Such unwanted light may be absorbed in the absorbing layer 2510. Advantageously light streaks near the input can be reduced by absorbing layer 2510.

Further adhesive layer 2514 may be provided to achieve attachment of the waveguide 1 and light blocking layer to a printed circuit such as a flexible printed circuit (FPC) 2500. The absorbing layer 2510 may further provide attachment to FPC 2500 to improve mechanical stability of the assembled unit.

Said light blocking layer 2510 may be disposed on each or either of the first and second opposed guide surfaces 6, 8 adjacent the input end 2. The waveguide 1 can be attached to the polarizer 2210 to further improve mechanical stability.

Figure 51B:
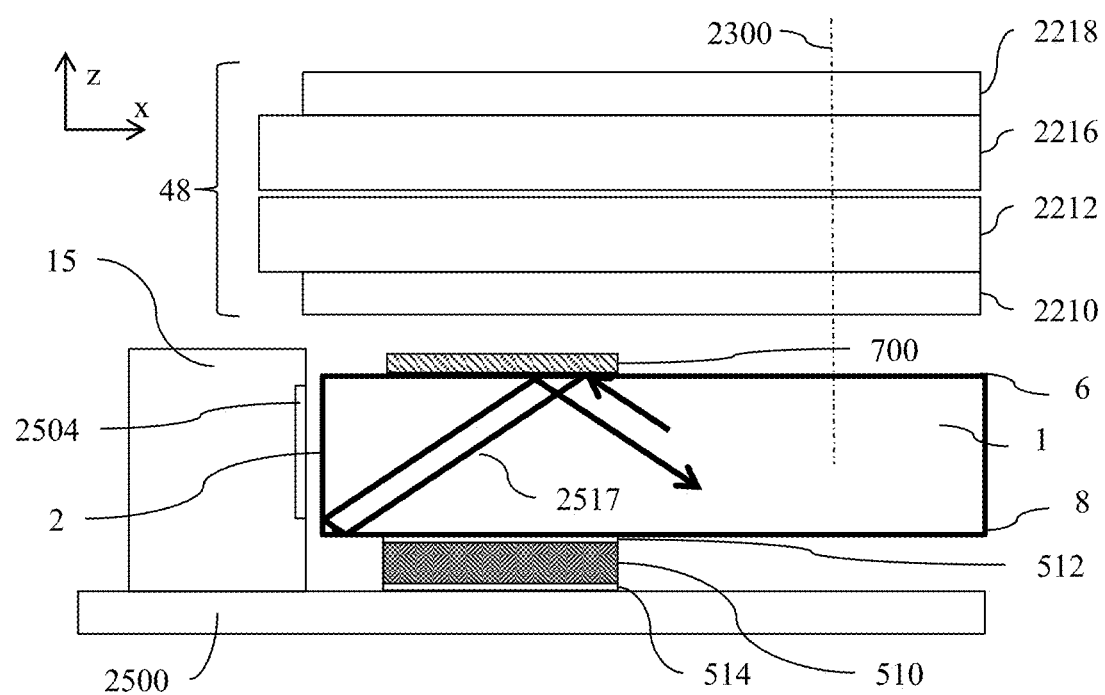
FIG. 51B is a schematic diagram illustrating in side view light blocking layers arranged across the upper and lower sides of a waveguide comprising black tape on a lower surface and paint on an upper surface, in accordance with the present disclosure.

FIG. 51B is a schematic diagram illustrating in side view light blocking layers arranged across the upper and lower sides of a waveguide comprising black tape on the lower side and paint layer 700 on the upper side. The light blocking layers thus comprise: an absorbing layer 2509 and an adhesive layer 2512 similar to the arrangement of FIG. 51A across the first guide surface 8; and paint 700 on the first guide surface 6. Such paint 700 may be a coating material such as dye or pigment in binder materials including inks that may be formed on one or both surfaces 6, 8 of the waveguide 1 by printing or coating for example.

Advantageously, assembly of the unit may be less complicated than the embodiment of FIG. 51A, improving yield and reducing assembly cost.

In addition to reducing stray light directly from the input end, the present embodiments also reduce unwanted light rays 2517 from reflective end 4 that may be further reflected by light source 15 or input side 2. Such rays 2517 provide undesirable cross talk and streak artefacts that may degrade autostereoscopic and privacy modes of operation. Such unwanted light may be partially absorbed in the light blocking layer 2510. Such light is incident on light blocking layer 2510 in both forwards and backwards directions (+x and −x directions), and so may be incident on the light blocking layer 2510 twice in comparison to the directly injected light from side 2 which sees the light blocking layer 2510 once. Thus cross talk is preferentially reduced in comparison to directly input input light.

Advantageously cross talk may be reduced, and improved off-axis image quality achieved for privacy mode and reduced left to right eye cross talk for autostereoscopic mode.

Figure 51C:
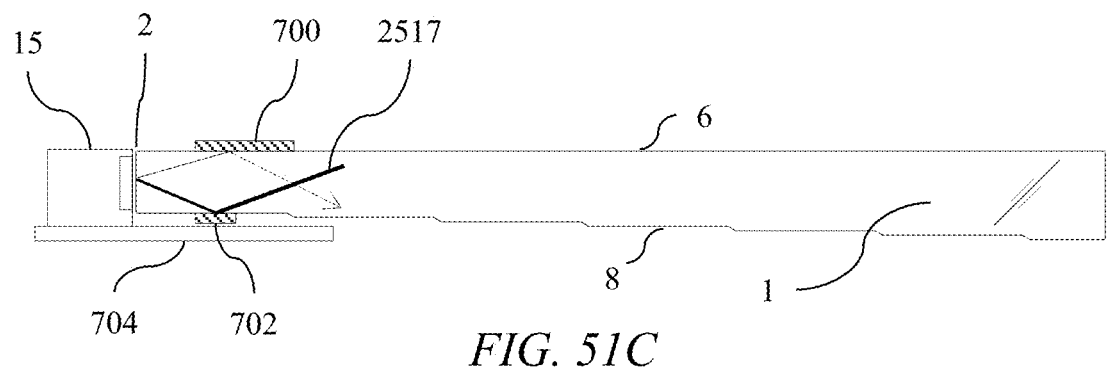
FIG. 51C is a schematic diagram illustrating in side view light blocking layers arranged across the upper and lower sides of a waveguide comprising absorbing paint on upper and lower surfaces, in accordance with the present disclosure.

FIG. 51C is a schematic diagram illustrating in side view light blocking layers arranged across the upper and lower sides of a waveguide comprising absorbing paint on upper and lower surfaces. The width of paint layers 700, 702 may be different to control the amount of light that is blocked.

Figure 51D:
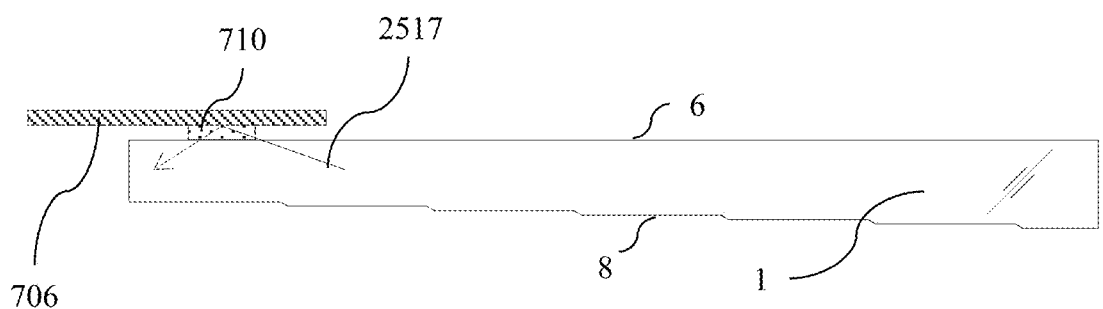
FIG. 51D is a schematic diagram illustrating in side view a light blocking layer arranged across the upper side of a waveguide comprising a transmitting adhesive and an absorbing layer, in accordance with the present disclosure.

FIG. 51D is a schematic diagram illustrating in side view a light blocking layer arranged on the upper side of a waveguide, that is across the first guide surface 6, and comprising a transmitting adhesive 710 and an mounting element which may be absorbing. The directional waveguide 1 may thus be mounted to a mounting element 706, the light blocking layer 2510 being provided on the mounting element 706 and optical coupling to the surface 6 by means of the adhesive 710. Advantageously, a wider variety of adhesives may be used in comparison to black tape or black adhesives, reducing cost and complexity. Further thickness may be reduced, as the thickness of a black tape is removed.

Figure 51E:
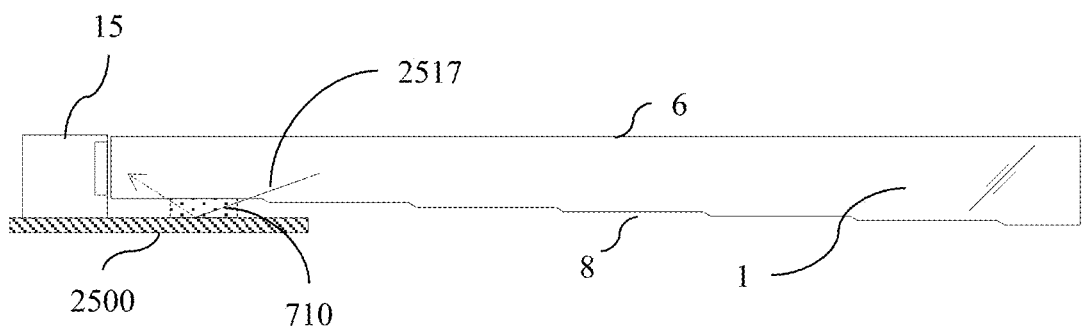
FIG. 51E is a schematic diagram illustrating in side view a light blocking layer arranged across the lower side of a waveguide comprising a transmitting adhesive and an absorbing layer that forms part of a printed circuit for a light emitting element, in accordance with the present disclosure.

FIG. 51E is a schematic diagram illustrating in side view a light blocking layer arranged on the lower side of a waveguide, that is across the second guide surface 8, and comprising a transmitting adhesive and an absorbing layer that forms part of a printed circuit for a light emitting element. Advantageously, in addition to reduced stray light, the FPC 2500 may be attached to the waveguide 1, improving mechanical alignment of the FPC 2500 and LEDs of the light source array 15 to the waveguide 1 and reducing light loss. Thus, in this arrangement, the FPC 2500 is a mounting element to which the waveguide 1 is mounted, similar to FIG. 51E.

Figure 51F:
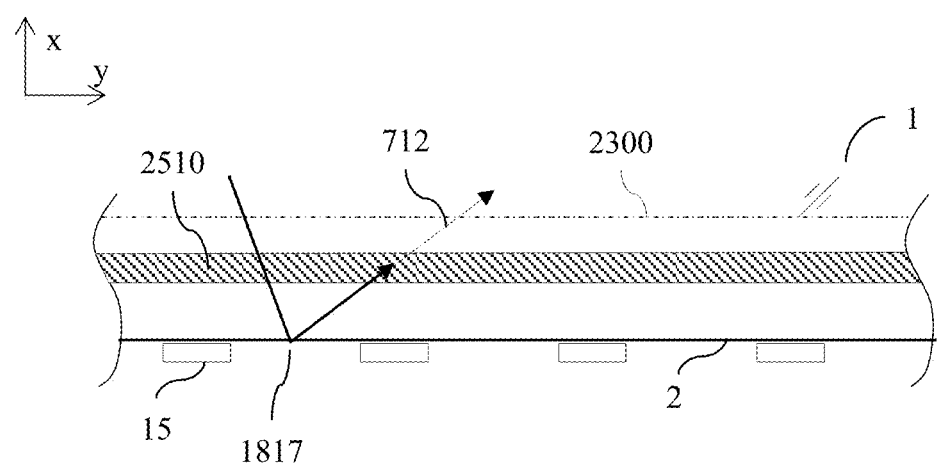
FIG. 51F is a schematic diagram illustrating in top view a light blocking layer arranged near to the input of a waveguide, in accordance with the present disclosure.

FIG. 51F is a schematic diagram illustrating in top view a light blocking layer arranged near to the input of a waveguide 44. The light blocking layer 2510 may take any of the forms described above with reference to FIGS. 51A-51E and extends along the entire extent of the input end 2. The light blocking layer 2510 may be arranged between the input end 2 and the active area boundary 2300.

If a light blocking layer is provided, for example as described above with reference to any of FIGS. 51A-51F, then light rays 511 may be absorbed rather than guided within waveguide land light loss may occur.

Black tape 2509 may be replaced by reflective tape so that stray light rays are prevented from directing to the observer through the spatial light modulator, but light rays are directed into the waveguide 1. The reflective tape may for example by ESR™ from 3M.

Figure 52:
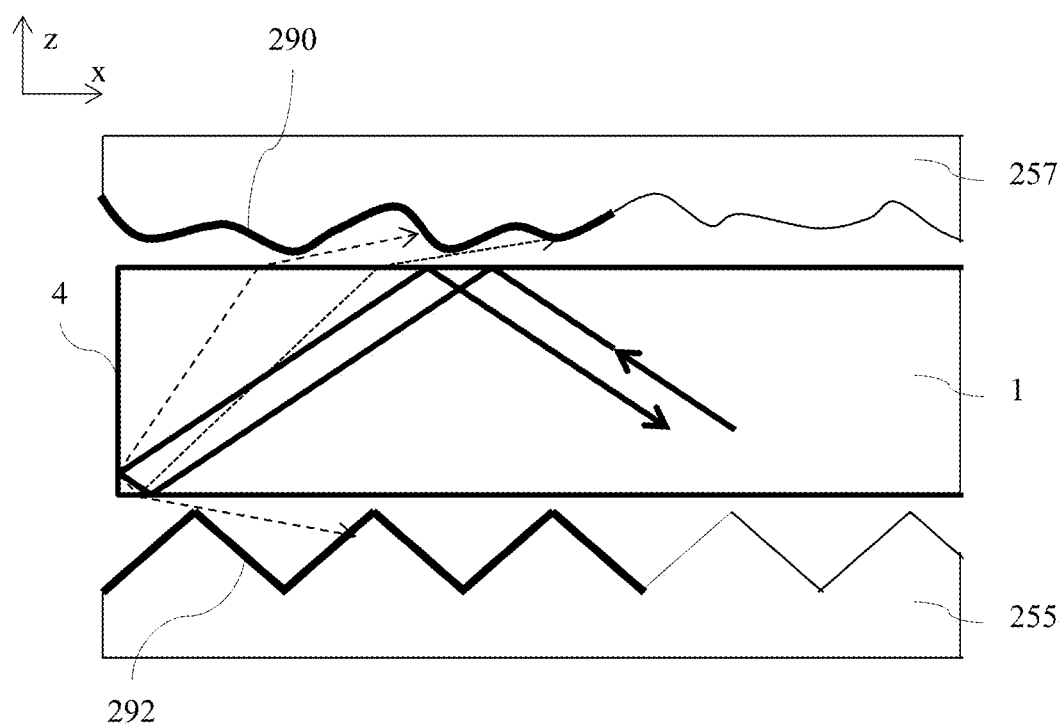
FIG. 52 and FIG. 53 are schematic diagrams illustrating further light blocking layers arranged to improve uniformity of light escaping from scatter in the regions of the edge of the waveguide, in accordance with the present disclosure.

FIG. 52 illustrates a further arrangement wherein a diffuser 257 and prismatic reflection film 255 may be coated with respective black layers 290 near to Fresnel reflector at end 4. Advantageously, such black layers may be substantially in contact with the waveguide 1 without substantial light loss, providing high efficiency light propagation while achieving adequate removal of appearance of stray light from the edges of the waveguide 1. Such black layers 290 may function as light blocking layers as described above.

Figure 53:
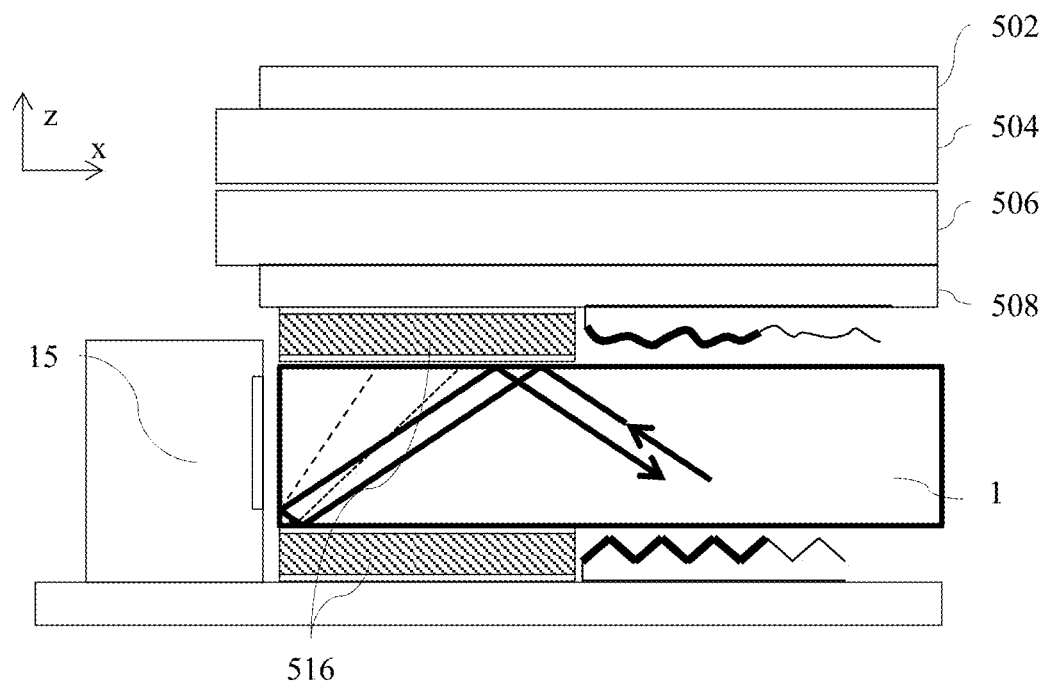

FIG. 53 illustrates a combined arrangement of FIGS. 51B and 52 at the input end.

Advantageously stray light may be controlled while maintaining efficiency of coupling into the waveguide 1.

It would be desirable to provide automatic control of image uniformity to compensate light source degradation mechanisms.

Figure 54A:
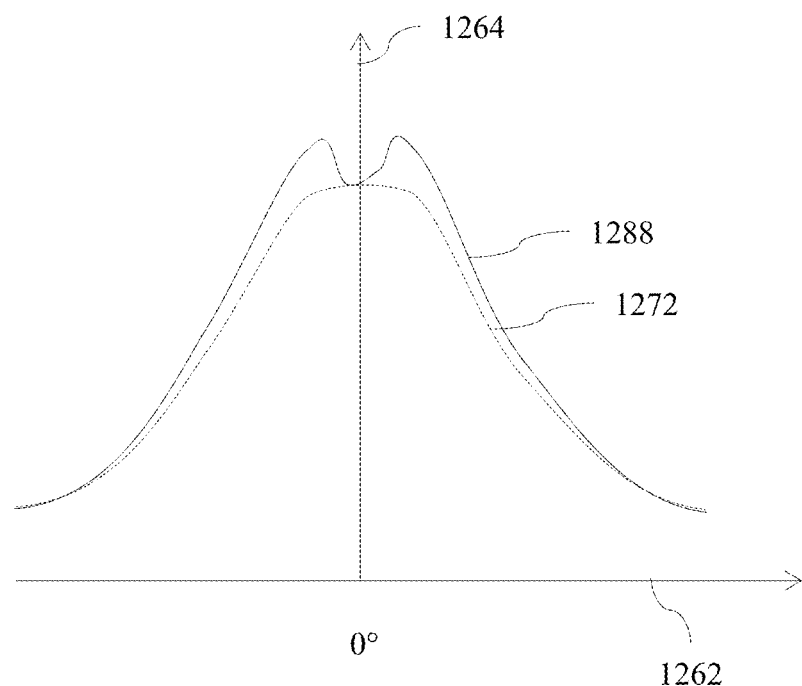
FIG. 54A is a schematic diagram illustrating a further graph of optical window luminous intensity against viewing position in the window plane of a waveguide, in accordance with the present disclosure.
Figure 54B:
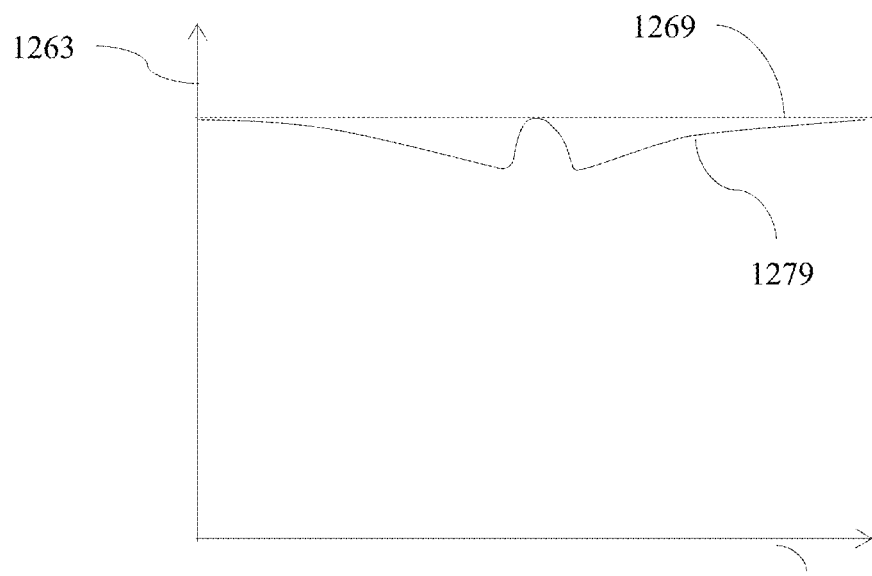
FIG. 54B is a schematic diagram illustrating a graph of luminous flux distribution for an array of light sources to compensate for light source degradation, in accordance with the present disclosure.

FIG. 54A is a schematic diagram illustrating a graph of optical window luminous intensity 1264 against viewing position 1262 in the window plane of a directional waveguide 1, corresponding to the angle of the output direction, and FIG. 54B is a schematic diagram illustrating a graph of luminous flux 1263 distribution for an array 15 of illuminator elements to compensate for light source degradation. Illuminator elements such as LEDs including gallium nitride blue emitters and yellow phosphors may undergo ageing wherein the scaled luminous fluxes and chromaticity may vary with usage. In particular, on-axis illuminator elements may be used more frequently or at higher average currents and thus junction temperatures than off-axis illuminator elements that may provide a non-uniform degradation in luminous emittance across the array 15. Such errors can be corrected as shown by distribution 1279 of scaled luminous fluxes from the respective illuminator elements in comparison to a reference level 1269. Advantageously, the luminance distribution of the display may be maintained throughout the device lifetime.

U.S. Patent Application Publication No. 2014/0009508, entitled "Controlling light sources of a directional backlight," filed May 17, 2013, which is herein incorporated by reference in its entirety, generally describes a luminance calibration apparatus and method wherein photodetectors are arranged at the input side 2 of directional waveguide 1, for example as part of the lightbar comprising the array 15 and electrical connections. It would be desirable to reduce the cost and complexity of the photodetector and control apparatus.

Figure 55A:
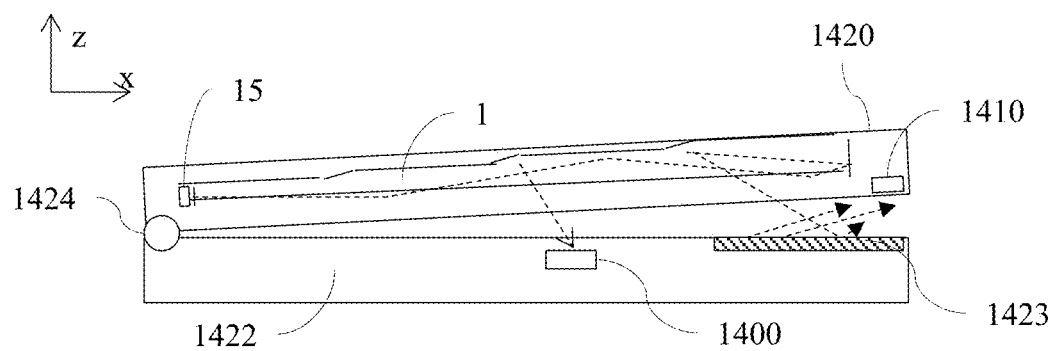
FIG. 55A is a schematic diagram illustrating in side view a display and integrated camera arranged to provide in-field LED array calibration, in accordance with the present disclosure.

FIG. 55A is a schematic diagram illustrating in side view a display and integrated camera arranged to provide in-field LED array calibration. Waveguide 1 may be arranged within a display unit within hingeup 1420 further comprising camera 1410. Hinge 1424 may be used to connect base unit 1422 which may comprise a keyboard, photodetector 1400 and reflective region 1423. Camera 1410 may be arranged to receive light from the waveguide 1, for example after reflection from region 1423.

Figure 55B:
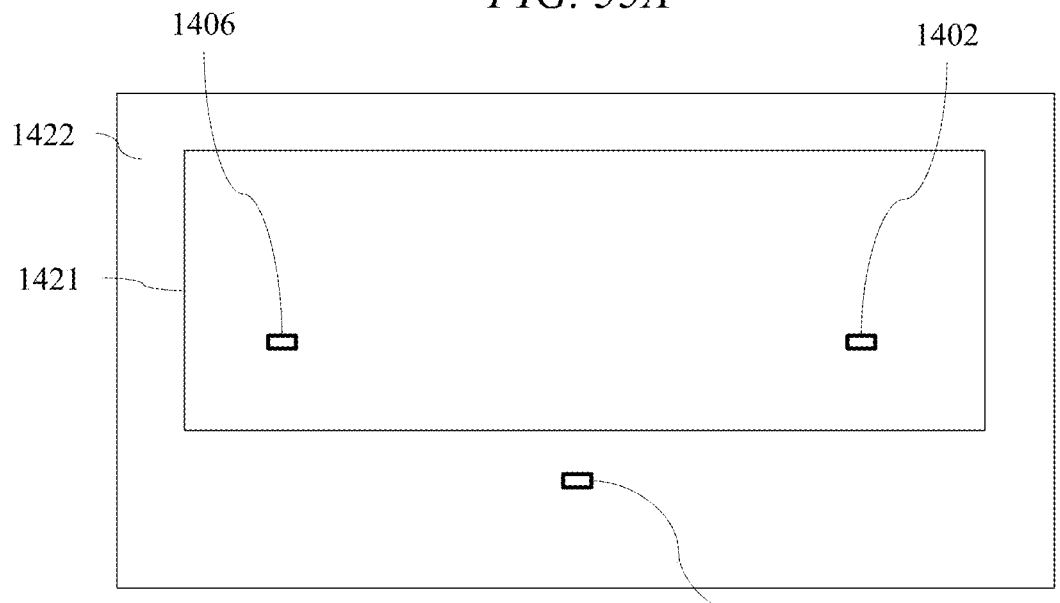
FIG. 55B and FIG. 55C are schematic diagrams illustrating in front view a waveguide and keyboard mounted detectors arranged to provide in-field LED calibration, in accordance with the present disclosure.
Figure 55C:
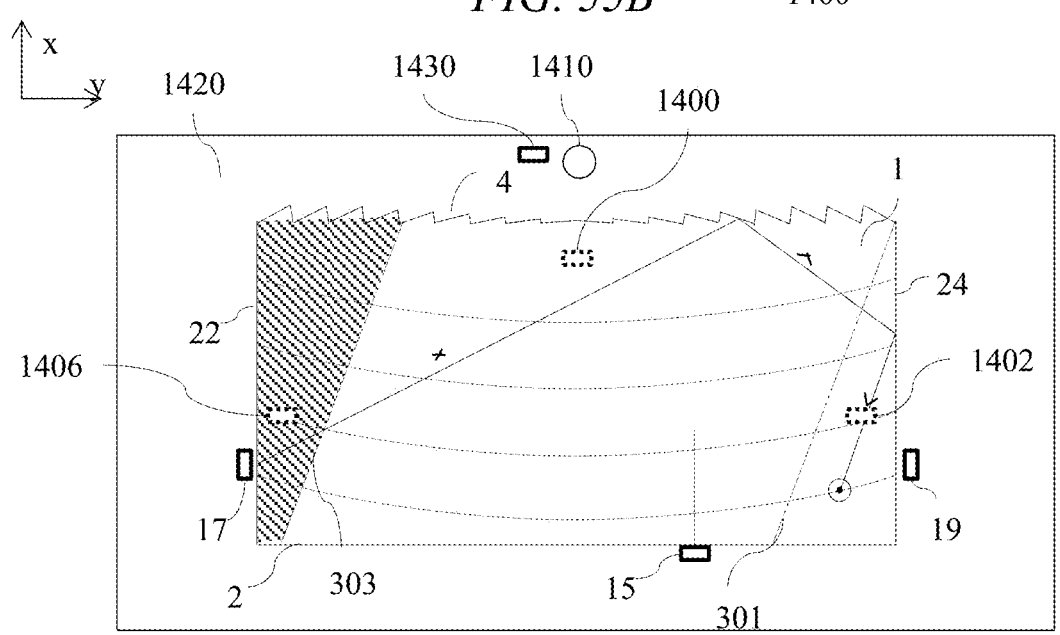

FIGS. 55B-55C are schematic diagrams illustrating in front view a waveguide and keyboard mounted detectors arranged to provide in-field LED calibration. FIG. 55B shows that photodetectors 1400, 1402, 1406 may be arranged in parts of the base unit 1422 including under keys of keyboard 1421 or other part of the base unit 1422, so that when the lid of the notebook is closed or substantially closed then light can be received from the waveguide unit. The photodetectors may be integrated with the illuminated keyboard control where provided. When the notebook is closed, FIG. 55C shows the relative position of detectors 1400, 1402, 1406 with respect to the waveguide 1 of the display in the hingeup unit 1420. Advantageously the detectors can measure the output of the display across various different areas of the waveguide. Voids A and B may otherwise mean that some parts of the waveguide do not illuminate a photodetector for certain light sources in the array 15. Further when the lid is not fully closed ambient light sensor 1430 or camera 1410 may observer reflected light from the keyboard or reflector 1423. Advantageously such light can be used to calibrate the light source array 15 to compensate for ageing or loss of single LEDs.

Figure 56:
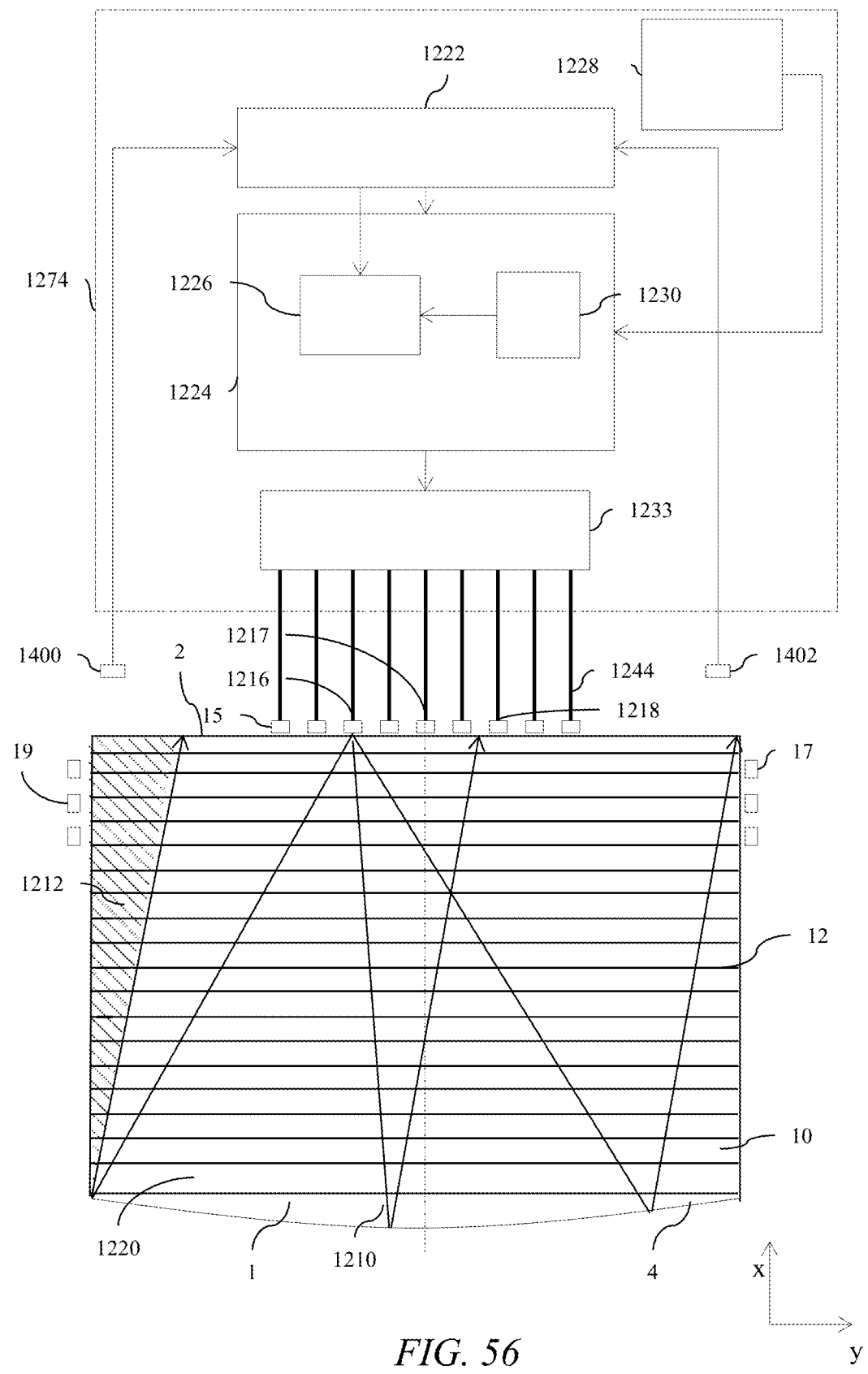
FIG. 56 is a schematic diagram illustrating a control system and front view of a directional backlight apparatus, in accordance with the present disclosure.

FIG. 56 is a schematic diagram illustrating a control system and front view of a directional backlight apparatus comprising a directional backlight as described above including a waveguide 1 and array 15 of illuminator elements. The directional backlight apparatus includes a control system, as described above, that implements a method of controlling the illuminator elements 15n making a calibration of the drive signals, as follows.

Light rays 1210 from illuminator element 1216 are directed to reflective end 4, reflected and directed back towards the input end 2. Some of the light from source 1216 will be extracted by means of light extraction features 12, while some of the light will be incident on at least a portion of the input end 2. Sensor elements that may include 1400, 1402 may be arranged as described above.

Measured signals from sensors 1400, 1402 may be passed to illumination controller 1274 which drives illuminator elements of array 15 using an illuminator element driver 1233 which may be a current driver with grey level control to drive lines 1244 to provide drive signals to the array of illuminator elements. The illumination controller 1274 calibrates the drive signals supplied to the illuminator elements 15n in response the measured signals representing the sensed light, as follows.

Array luminous flux distribution controller 1224 may include for example a stored reference grey level profile 1230 from front of screen measurements that may be provided at the time of manufacture. This enables the control system to output scaled luminous fluxes that have a predetermined distribution across the array of light sources, for example to vary the scaled luminous fluxes as described above.

Data from sensors 1400, 1402 may be supplied for example to calibration measurement system 1222 that may provide data to a look up table 1226 within the luminous flux distribution controller 1224. Further selection of luminous intensity distribution (for example to select between luminous intensity distributions 1266, 1272, 1274, 1276, 1294) may be provided by selection controller 1228. Selection controller may have user input or an automatic input that is determined by sensing of display viewing conditions. For example the number of viewers, the room brightness, display orientation, the image quality settings and/or the power savings mode settings may be used to vary the selected distribution.

In device manufacture, the output of the sensors 1400, 1402 in response to each of the light sources of the array 15 may be compared to the signal from a camera or detector placed in the window plane of the display. This achieves an initial calibration or referencing of the internal sensors with respect to light in the window plane. Such calibration may be stored in a look up table or similar.

In operation of a calibration mode, a single illuminator element of the array 15 is illuminated and sensors 1400, 1402 may measure a signal for the said illuminator element. The said illuminator element is extinguished and the next source of the array operated and a measurement taken. The output of the array of measurements is compared with a factory calibration so that the output luminous intensity for the given luminous flux distribution can be interpolated. The appropriate luminous flux distribution for the required luminous intensity distribution is then derived by the controller 1224 and the illuminator element controller 1233 appropriately configured to achieve the desired luminous flux distribution.

Advantageously the light from the whole array 15 may be measured by a combination of sensors 1400, 1402 and a desired luminous intensity distribution may be achieved.

The sensor system may be arranged with the waveguide 1 during the fabrication of the display for characterization purposes and removed after completion of product fabrication. Preferably the sensor system may be arranged with the waveguide 1 during normal operation. The in-field calibration phase may be applied during display switch-on. The spatial light modulator may be arranged with a black image during calibration to remove visibility to the user of the calibration phase. The calibration phase may be repeated on a daily, weekly or monthly basis for example to compensated for ageing artefacts as shown in FIGS. 54A-B.

Figure 57A:
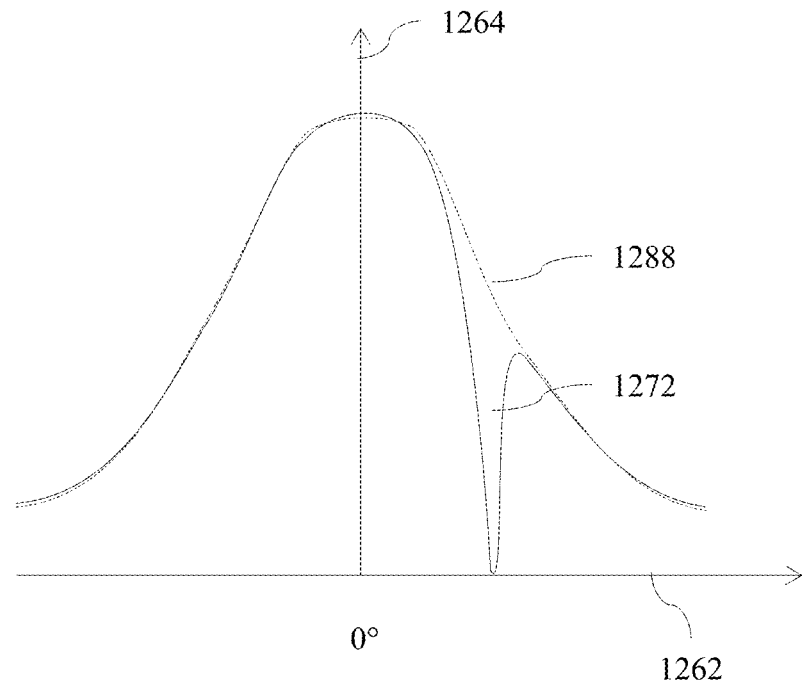
FIG. 57A is a schematic diagram illustrating a further graph of optical window luminous intensity against viewing position in the window plane of a waveguide comprising a luminous intensity defect, in accordance with the present disclosure.

FIG. 57A is a schematic diagram illustrating a further graph of optical window luminous intensity 1264 against viewing position 1262 in the window plane of a waveguide comprising a luminous intensity defect, when cycling through illumination of each LED. The diffusion properties of the optical system mean that such a plot may be different to the output when luminous intensity outputs from the light sources are combined in normal operation. Thus a single LED 15 of the array of light sources may have failed in region 1272 compared to the desired output 1288.

Figure 57B:
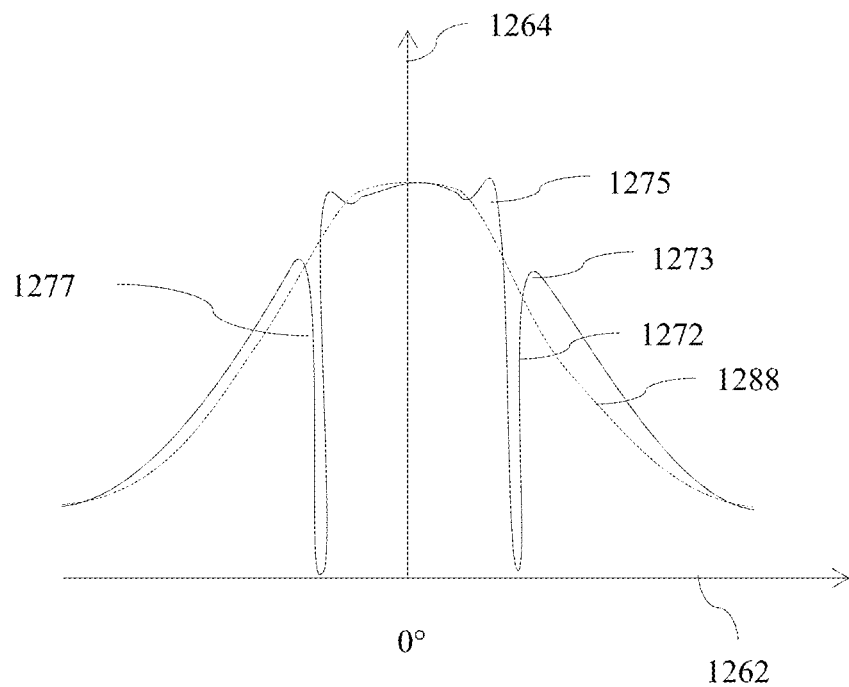
FIG. 57B is a schematic diagram illustrating a graph of optical window luminous intensity against viewing position in the window plane of a waveguide further illustrating a correction of the defect of FIG. 57A, in accordance with the present disclosure.

FIG. 57B is a schematic diagram illustrating a graph of optical window luminous intensity against viewing position in the window plane of a waveguide further illustrating a correction of the defect of FIG. 57A. Such an output may occur in the symmetric drive scheme of FIG. 50C for example. Thus the calibration system illustrated in FIG. 56 may detect the loss of angular output when a particular LED pair is illuminated. To compensate for the loss of a particular LED, the failed channel may be undriven creating a symmetric drop region 1277. To compensate for the drop, adjacent LEDs on both sides of the optical axis 199 may be illuminated with higher outputs 1273, 1275 such that after diffusion the desired output 1288 may be provided. Advantageously LED compensation may be achieved in symmetric drive systems.

It would be desirable to further reduce the cost and complexity of the LED ageing compensation system by eliminating the photodetection and control system.

Figure 58A:
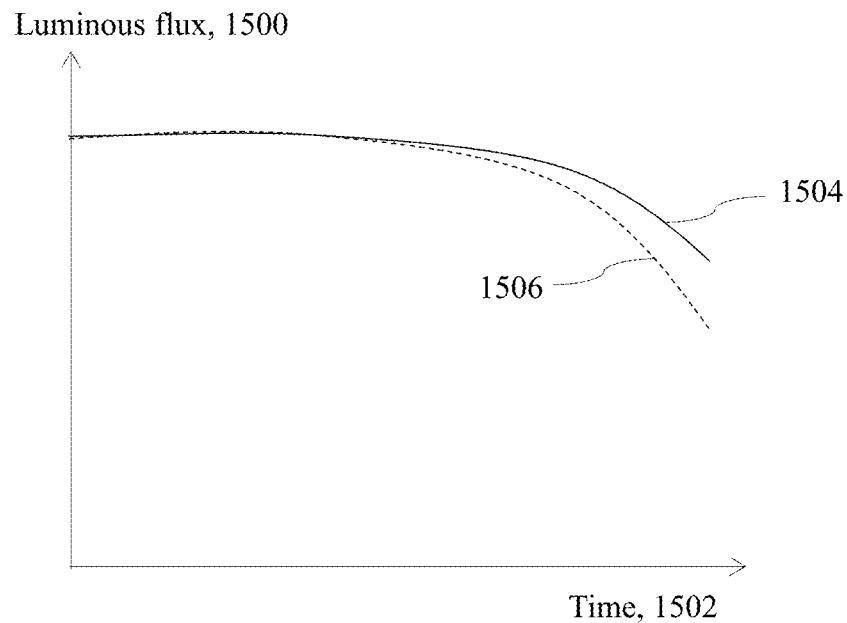
FIG. 58A is a schematic diagram illustrating a graph of nominal LED output against time, in accordance with the present disclosure.

FIG. 58A is a schematic diagram illustrating a graph of nominal LED output against time. Luminous flux 1500 of a nominal light source of the array 15 may degrade with time 1502 as shown by profiles 1504, 1506 for different drive conditions.

Figure 58B:
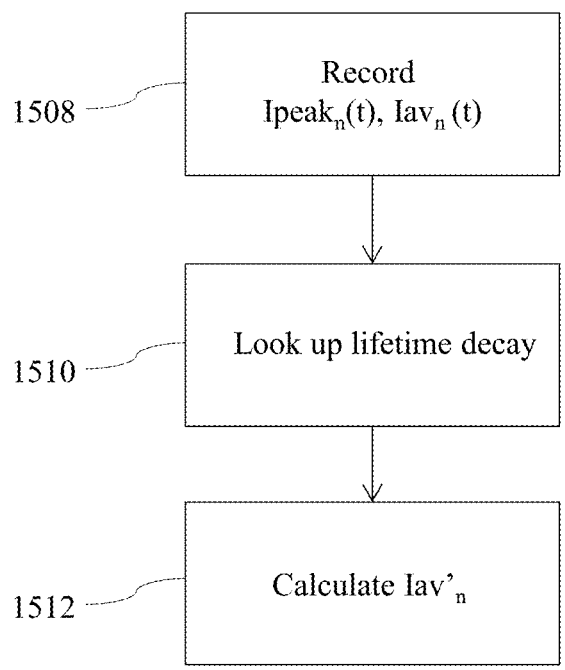
FIG. 58B is a schematic diagram illustrating a flowchart for compensation of LED ageing, in accordance with the present disclosure.

FIG. 58B is a schematic diagram illustrating a flowchart for compensation of LED ageing. In a first step 1508 for the nth LED, the peak current, $Ipeak_n(t)$ and average current, $Iav_n(t)$ may be recorded. In pulse width modulation schemes, the peak current may be significantly higher than the average current. In a second step the average expected luminance may be computed using data similar to FIG. 58A. In a third step 1512 the corrected current after PWM control $Iav_n$ may be computed and applied to the respective LED. Advantageously LED ageing effects may be compensated and cost and complexity reduced.

FIG. 59A is a schematic diagram illustrating in perspective view, the structure of a directional display device comprising a waveguide 1 arranged with a spatial light modulator 48. Reflective end 4 may be provided by a Fresnel mirror. Taper region 2204 may be arranged at the input to the waveguide 1 to increase input coupling efficiency from the light sources 15a-15n of the array of illuminator elements 15 and to increase illumination uniformity. Shading layer 2206 with aperture 2203 may be arranged to hide light scattering regions at the edge of the waveguide 1. Rear reflector 2200 may comprise facets 2202 that are curved and arranged to provide viewing windows 26 from groups of optical windows provided by imaging light sources of the array 15 to the window plane 106. Optical stack 2208 may comprise reflective polarizers, retarder layers and diffusers. Rear reflectors 2200 and optical stack 2208 are described further in U.S. patent application Ser. No. 14/186,862, filed Feb. 21, 2014, entitled "Directional backlight" (U.S. Patent Publication No. 2104/0240828) incorporated herein by reference in its entirety.

Spatial light modulator 48 may comprise a liquid crystal display that may comprise an input polarizer 2210, TFT glass substrate 2212, liquid crystal layer 2214, color filter glass substrate 2216 and output polarizer 2218. Red pixels 2220, green pixels 2222 and blue pixels 2224 may be arranged in an array at the liquid crystal layer 2214. White, yellow, additional green or other color pixels (not shown) may be further arranged in the liquid crystal layer to increase transmission efficiency, color gamut or perceived image resolution.

In the embodiment of FIG. 59A, injection of input light into the waveguide is along the long edge. The physical size of the LED packages of the array 15 and scatter from waveguide and other surfaces near the input end 2 limit the minimum bezel width that can be achieved. It would be desirable to reduce the width of the side bezel along the long edges of the waveguide.

FIGS. 59B-E are schematic diagrams illustrating in perspective, front, side and perspective views respectively, an optical valve comprising a light source 1317a arranged to achieve an on-axis optical window.

Figure 59B:
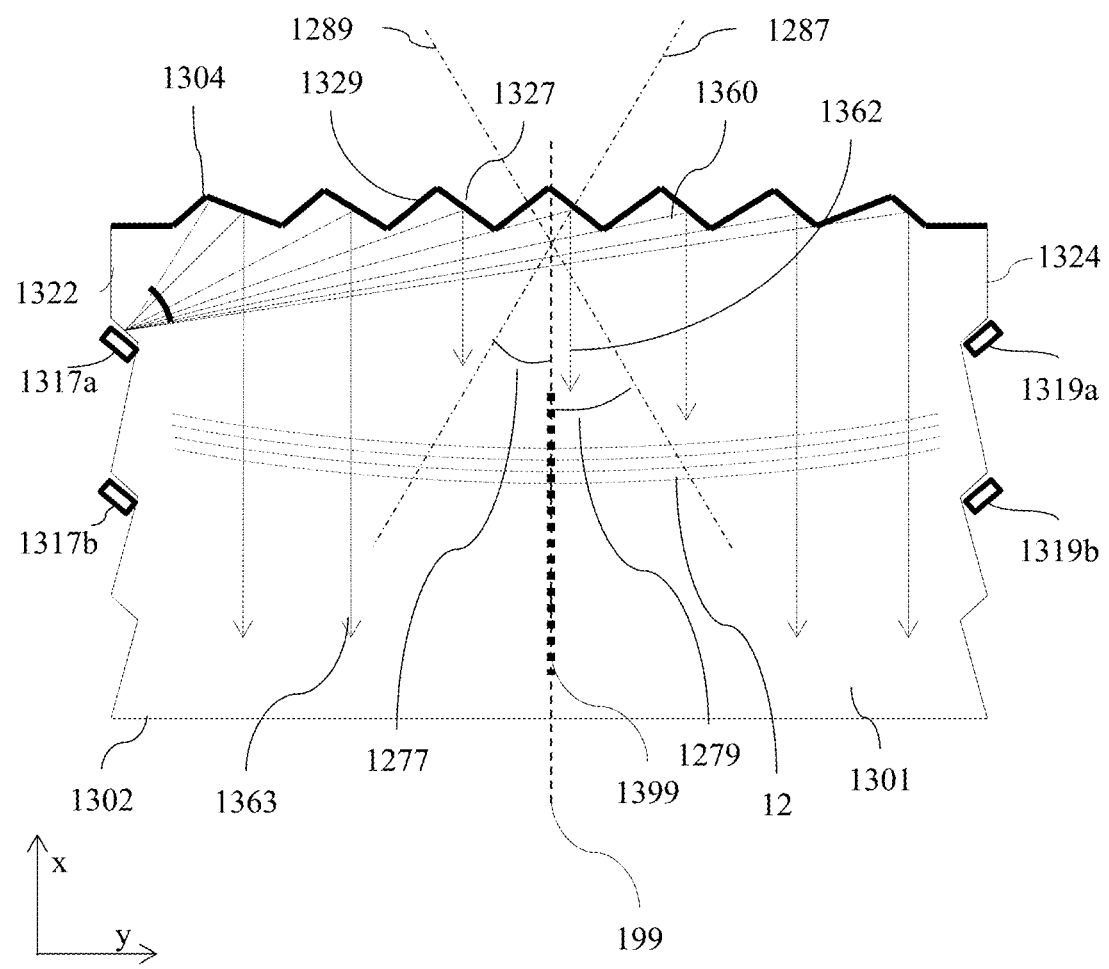
FIG. 59B is a schematic diagram illustrating in front view, an optical valve comprising a side light source arranged to achieve an on-axis optical window, in accordance with the present disclosure.
Figure 59C:
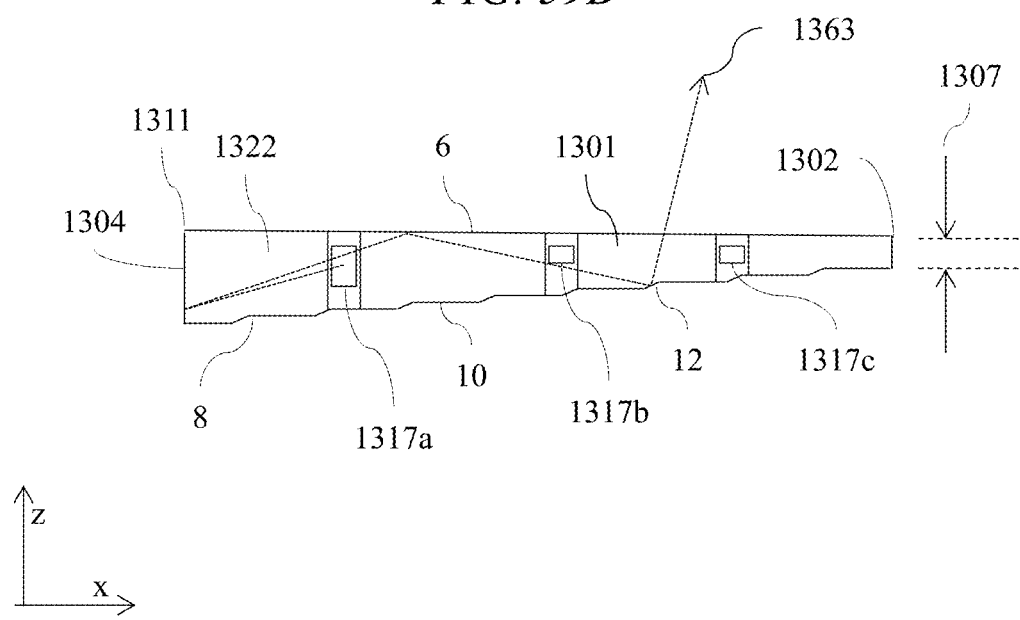
FIG. 59C is a schematic diagram illustrating in side view, an optical valve comprising a side light source arranged to achieve an on-axis optical window, in accordance with the present disclosure.
Figure 59D:
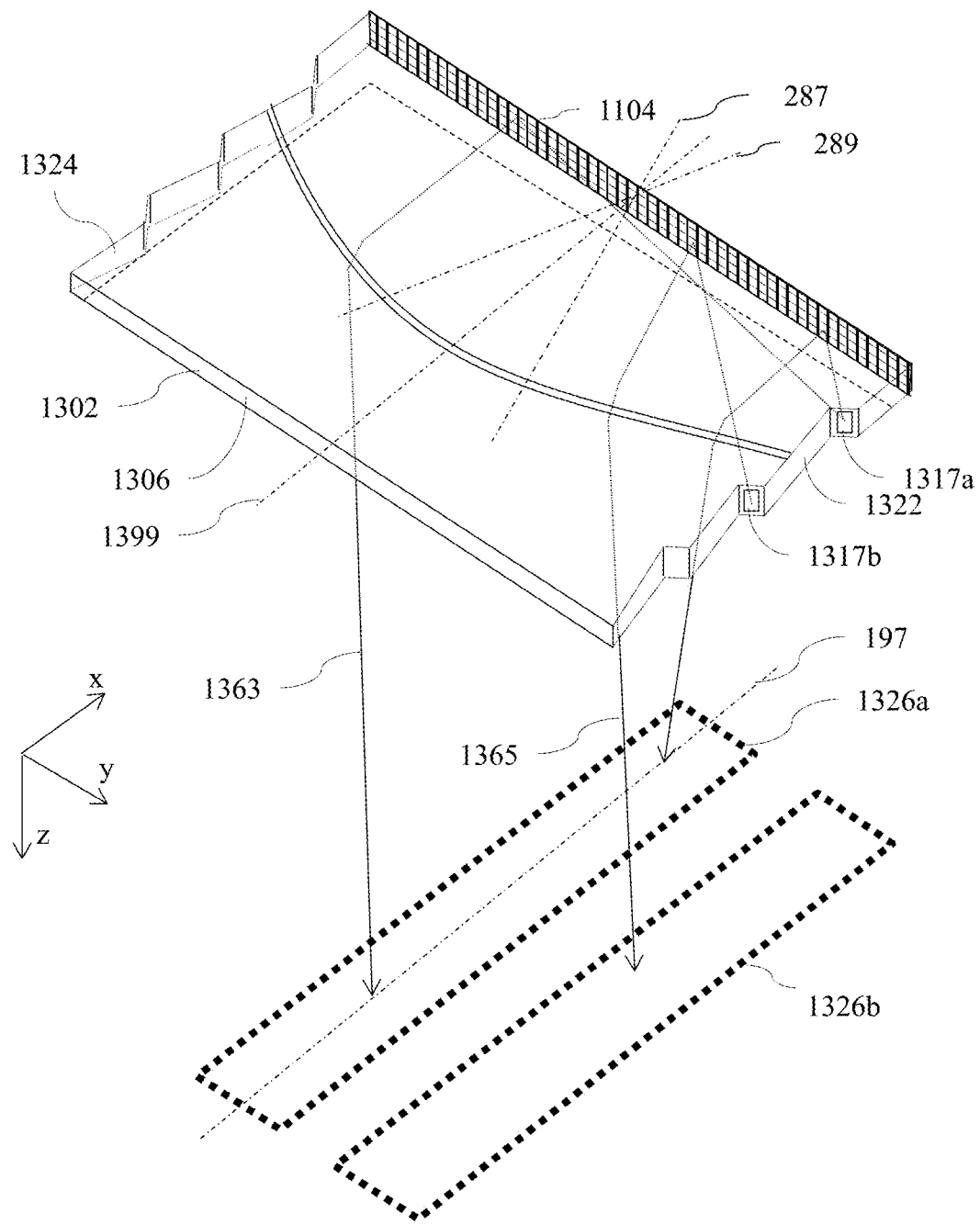
FIG. 59D is a schematic diagram illustrating in perspective view, the formation of first and second optical windows by edge and side light sources with a valve with arrangement similar to that shown in FIGS. 59B-C, in accordance with the present disclosure.
Figure 59E:
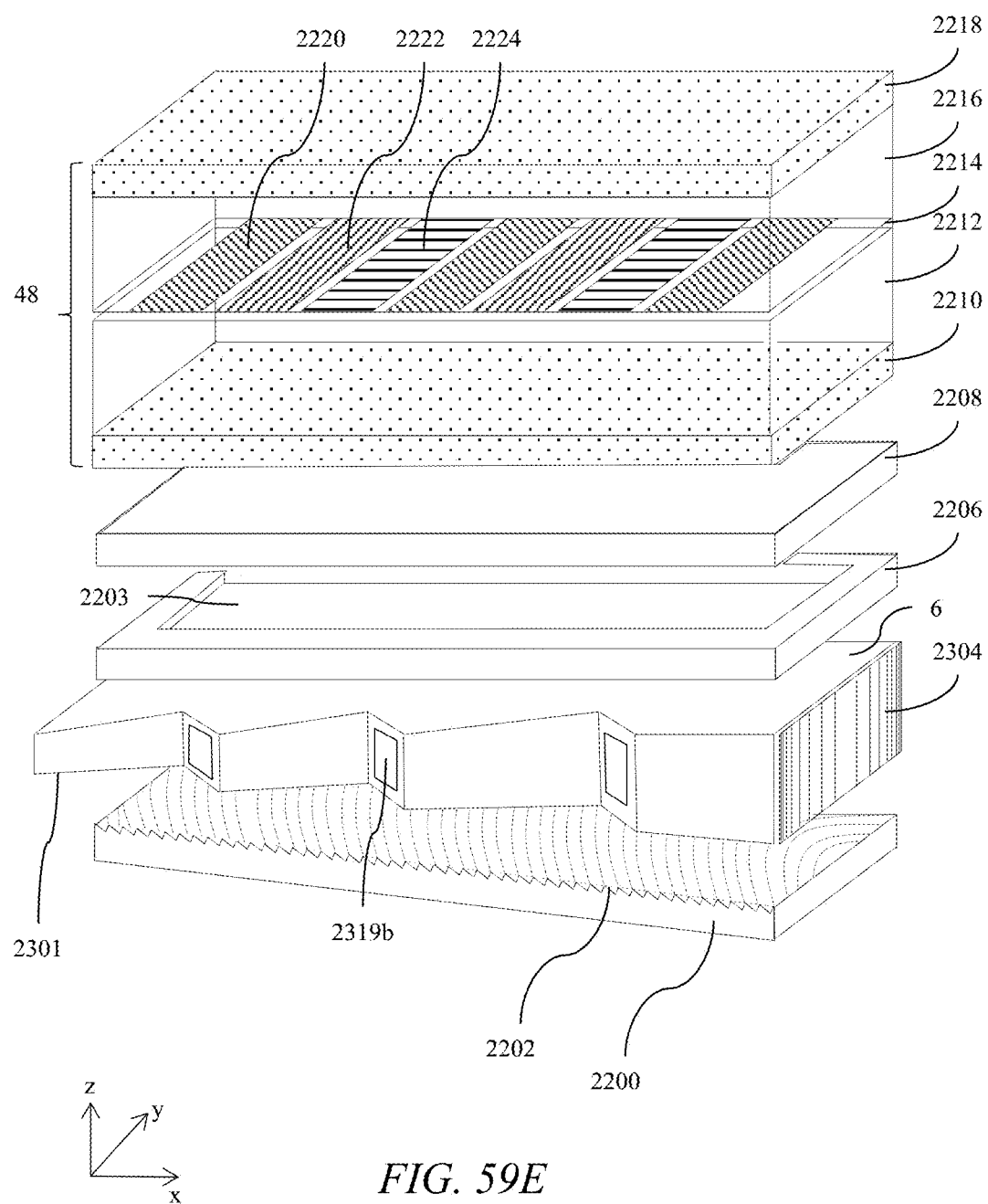
FIG. 59E is a schematic diagram illustrating in perspective view, the structure of a directional display device comprising a directional backlight comprising a side light source arranged with a spatial light modulator, in accordance with the present disclosure.

FIG. 59B illustrates in top view the propagation of light rays from light source arrays 1319a-n and 1317a-n arranged on the short side of a directional waveguide. FIG. 59C similarly illustrates in side view the propagation of rays from light source array 1317a-n. FIG. 59D illustrates in perspective view the formation of optical windows by light source array 1317a-n. FIG. 59E illustrates in perspective view a display apparatus comprising an optical stack comprising a waveguide as illustrated in FIGS. 59B-D.

As described in U.S. Provisional Patent Application No. 62/167,203, to which this application claims priority, a directional display device may comprise a waveguide 1301 that further comprises a reflective end 1304 that is elongated in a lateral direction (y-axis), the first and second guide surfaces 6,8 extending from laterally extending edges of the reflective end 1304, the waveguide 1301 further comprising side surfaces 1322, 1324 extending between the first and second guide surfaces 6,8, and wherein the light sources include an array 1317 of light sources 1317a-n arranged along a side surface 1322 to provide said input light through that side surface 1322, and the reflective end 1304, comprises first and second facets 1327, 1329 alternating with each other in the lateral direction, the first facets 1327 being reflective and forming reflective facets of a Fresnel reflector having positive optical power in the lateral direction, the second facets 1329 forming draft facets of the Fresnel reflector, the Fresnel reflector 1304 having an optical axis 1287 that is inclined towards the side surface 1322 in a direction in which the Fresnel reflector 1304 deflects input light from the array of light sources 1317 into the waveguide 1301. Thus angle 1277 is non-zero. Similarly the second facets 1329 may be reflective and form reflective facets of a Fresnel reflector having positive optical power in the lateral direction, the Fresnel reflector 1304 having an optical axis 1289 that is inclined towards the side surface 1324 in a direction in which the Fresnel reflector 1304 deflects input light from the array of light sources 1319 into the waveguide 1301.

Illustrative light ray 1363 from source 1317a may be arranged to provide optical window 1326a and light ray 1365 from source 1317b may be arranged to provide optical window 1326b. Other layers such as diffusers, prismatic reflection films, retarders and spatial light modulators may be arranged in series with the waveguide 1301 in a similar manner to that described for waveguide 1 in the arrangement of FIG. 59A for example.

Advantageously a thin backlight with low bezel size may be achieved. Such an arrangement has light sources that are not arranged on the long sides of the waveguide 1301 and thus may have small form factor. Further light sources 1317 and 1319 may be arranged with overlapping optical windows, and thus display luminance may be increased.

It would be further desirable to achieve uniform illumination of a waveguide with a narrow bezel along the edges of the waveguide in wide angle mode of operation. The embodiments described elsewhere herein may be applied to either the long side light source array input of FIG. 59A or the short side light source array input of FIGS. 59B-E. Advantageously uniform display appearance may be achieved in directional displays with a narrow long side bezel. Such displays may be used in mobile displays such as cell phones or tablets as well as laptops, TV and monitors.

The embodiments related to stepped waveguide directional backlights may be applied with changes as necessary to the wedge directional backlight as described herein.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

Also incorporated by reference herein in their entireties are U.S. Patent Publication Nos. 2013/0307831, 2013/0335821, and 2013/0307946.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A directional backlight comprising:

a waveguide comprising an input end;

an array of input light sources arranged at different input positions in a lateral direction across the input end of the waveguide and arranged to input input light into the waveguide, the waveguide further comprising first and second opposed, laterally extending guide surfaces for guiding light along the waveguide, side surfaces extending between the first and second guide surfaces, and a reflective end facing the input end for reflecting the input light back along the waveguide and having positive optical power laterally, the second guide surface being arranged to deflect the reflected input light through the first guide surface as output light, and the waveguide being arranged to direct the output light into optical windows in output directions that are distributed in a lateral direction in dependence on the input position of the input light; and additional light sources arranged to direct additional light into the waveguide in a direction in which the additional light is reflected by the reflective end onto the opposite side surface and by the opposite side surface into a segment of the waveguide adjacent the opposite side surface extending from a corner between the reflective surface and the side surface.

2. A directional backlight according to claim 1, wherein the additional light sources are disposed along at least a part of each side surface adjacent the input end, the additional light sources being arranged to direct additional light into the waveguide through one of the side surfaces.

3. A directional backlight according to claim 2, wherein the additional light sources are disposed along only said part of each side surface.

4. A directional backlight according to claim 2, wherein said part of each side surface along which the additional light sources are disposed is at least 20% of the side surface.

5. A directional backlight according to claim 2, wherein said part of each side surface along which the additional light sources are disposed is at most 80% of the side surface.

6. A directional backlight according to claim 1, wherein the waveguide further comprises a reflector element arranged along at least a part of each side surface adjacent the input end, the additional light sources are disposed along the input end of the waveguide on each side of the array of input light sources, and are arranged to direct additional light into the waveguide through the input end onto the reflector element, and the reflector element is arranged to reflect the additional light towards the reflective end so that the additional light is reflected by the reflective end onto the opposite side surface and by the opposite side surface into a segment of the waveguide adjacent the opposite side surface extending from a corner between the reflective surface and the side surface.

7. A directional backlight according to claim 6, wherein the reflector element is disposed along only said part of each side surface.

8. A directional backlight according to claim 6, wherein said part of each side surface along which the reflector element is disposed is at least 20% of the side surface.

9. A directional backlight according to claim 6, wherein said part of each side surface along which the reflector element is disposed is at most 80% of the side surface.

10. A directional backlight according to claim 6, wherein said reflector element comprises an array of facets that are arranged to reflect light in a different direction from light rays of the additional light that are reflected from the side surface.

11. A directional backlight according to claim 6, wherein the input end has facets against which the additional light sources are disposed, and wherein the facets face the reflector element.

12. A directional backlight according to claim 1, wherein the first guide surface is arranged to guide light by total internal reflection and the second guide surface comprises a plurality of light extraction features oriented to direct light guided along the waveguide in directions allowing exit through the first guide surface as the output light and intermediate regions between the light extraction features that are arranged to guide light along the waveguide.

13. A directional backlight according to claim 12, wherein the second guide surface has a stepped shape in which said light extraction features are facets between the intermediate regions.

14. A directional backlight according to claim 12, wherein the light extraction features have positive optical power in the lateral direction.

15. A directional backlight according to claim 1, wherein the reflective end is a Fresnel reflector comprising alternating reflective facets and draft facets, the reflective facets provide the Fresnel reflector with positive optical power.

16. A directional display device comprising:

a directional backlight according to claim 1; and a transmissive spatial light modulator arranged to receive the output light from the waveguide and to modulate it to display an image.

17. A directional display apparatus comprising:

a directional display device according to claim 16; and a control system arranged to control the light sources.

18. A directional display apparatus according to claim 17, wherein the control system is arranged to control input light sources selected to direct output light into desired optical windows, and is further arranged to control at least one additional light source selected to provide additional light that is output from the directional backlight in the same output directions as the desired optical windows.

19. A directional display apparatus according to claim 18, wherein the control system is arranged, when a selected input light source is off-center of the array of input light surfaces, to control at least one additional light source that is on the opposite side of the directional backlight from the selected input light source.

* * * * *